United States Patent [19]

Gruji et al.

[11] Patent Number: 5,379,210
[45] Date of Patent: Jan. 3, 1995

[54] NATURAL TRACKING CONTROLLER

[75] Inventors: Ljubomir T. Gruji, Villeneuve d'Ascq, France; William P. Mounfield, Jr., Baton Rouge, La.

[73] Assignee: M&M Software Products, Inc., Columbia, S.C.

[21] Appl. No.: 919,764

[22] Filed: Jul. 24, 1992

[51] Int. Cl.$^6$ ...................... G05B 13/02; G06F 15/46
[52] U.S. Cl. .................................. 364/148; 364/162; 364/165
[58] Field of Search .................... 364/148–151, 364/152, 164, 165, 160–163

[56] References Cited

U.S. PATENT DOCUMENTS

| | | | |
|---|---|---|---|
| 3,795,799 | 3/1974 | Courtiol | 364/148 |
| 4,197,576 | 4/1980 | Sanchez | 364/151 |
| 4,358,822 | 11/1982 | Sanchez | 364/151 |
| 5,119,287 | 6/1992 | Nakamura et al. | 364/148 |
| 5,144,549 | 9/1992 | Youcef-Toumi | 364/148 |

OTHER PUBLICATIONS

L. T. Grujic, "Tracking Control Obeying Prespecified Performance Index," Proc. 12th IMACS World Congress, Paris, France, Jul. 18–22, 1988, pp. 332–336.
B. Porter & A. Bradshaw, "Design of linear multivariable continuous-time high-gain output-feedback regulators," Int. J. Systems Sci., 1979, vol. 10, No. 2, pp. 113–121.
B. Porter & A. Bradshaw, "Design of linear multivariable continuous-time tracking systems incorporating high-gain error-actuated controllers," Int. J. Systems Sci., 1979, vol. 10, No. 4, pp. 461–469.
J. Penttinen and H. N. Koivo, "Miltivariable Tuning Regulators for Unknown Systems," Automatica, vol. 16, No. 4, Jul 1980, pp. 393–398.
L. T. Grujic, "Tracking Versus Stability: Theory," Proc. 12th IMACS World Congress, Paris, France, Jul. 18–22, 1988, pp. 319–327.
K. Youcef-Toumi and O. Ito, "A Time Delay Controller for Systems With Unknown Dynamics," ASME Journal of Dynamic Systems, Measurement, and Control, Mar. 1990, vol. 112, No. 1, pp. 133–142.
M. Tomizuka, T. C. Tsao, and K. K. Chew, "Analysis and Synthesis of Discrete-Time Repetitive Controllers," ASME Journal of Dynamic Systems, Measurement, and Control, Sep. 1989, vol. 111, No. 3, pp. 353–358.
K. Srinivasan and F. R. Shaw, "Analysis and Design of Repetitive Control Systems Using the Regeneration Spectrum," ASME Journal of Dynamic Systems, Measurement, and Control, Jun., 1991, vol. 113, No. 2, pp. 216–222.
K. Youcef-Toumi and J. Bobbett, "Stability of Uncertain Linear Systems with Time Delay," ASME Journal of Dynamic Systems, Measurement, and Control, Dec. 1991, vol. 113, No. 4, pp. 558–567.
K. Youcef-Toumi and S. T. Wu, "Input/Output Linearization Using Time Delay Control," ASME Journal of Dynamic Systems, Measurement, and Control, Mar. 1992, vol. 114, No. 1, pp. 10–19.

(List continued on next page.)

Primary Examiner—Stephen M. Baker
Assistant Examiner—Thomas E. Brown
Attorney, Agent, or Firm—John H. Runnels

[57] ABSTRACT

Novel controllers have been discovered which permit control of the outputs of a system with minimal knowledge of the system's internal dynamics, and with no knowledge of the values of disturbances on the system, or of the effects of the disturbances on the system. Very rapid convergence of the actual outputs to selected desired outputs is possible. The systems controlled may have multiple inputs and multiple outputs; may be linear or nonlinear; may be expressed in input-output form, state space form, or mixed form; and may be implemented with analog circuit elements, digital circuit elements; or a hybrid of both analog and digital circuit elements. Both general and special cases of such controllers are disclosed.

22 Claims, 29 Drawing Sheets

OTHER PUBLICATIONS

Mounfield, et al., "High-Gain PI natural control for exponential tracking of linear single-output systems with state-space description," Theórie de la commande, vol. 26, No. 2, pp. 125–146 (1992).

Grujic, et al., "Natural Tracking PID Process Control for Exponential Tracking," AIChE Journal, vol. 38, No. 4, pp. 555–562 (1992).

Mounfield, et al., "High-Gain Natural Tracking Control of Time-Invariant Systems Described by IO Differential Equations," Proceedings of the 30th Conference on Decision and Control, pp. 2447–2452 (1991).

Grujic, et al., "Natural Tracking Control of Time Invariant Linear Systems Described by IO Differential Equations," Proceedings of the 30th Conference on Decision and Control, pp. 2441–2446, (1991).

Mounfield, et al., "High-Gain Natural Tracking Control of Linear Systems," Proceedings of the 13th IMACS World Congress on Computation and Applied Mathematics, vol. 3, pp. 1271–1272 (1991).

Grujic, et al., "Natural Tracking Control of Linear Systems," Proceedings of the 13th IMACS World Congress on Computation and Applied Mathematics, vol. 3, pp. 1269–1270 (1991).

NATURAL TRACKING CONTROLLER

This invention pertains to control systems, particularly to controllers which can operate with relatively minimal knowledge of the structure or function of the system being controlled.

Control theory is a branch of engineering dealing with the control of the behavior or output of a system. For example, the controlled system might be an electric motor, an automobile brake, an automobile suspension system, an autopilot for an airplane, an amplifier, a robot, a refrigerator, a petroleum refinery, a polyethylene plant, a nuclear reactor, etc.

The system responds to its own internal dynamics, to various external disturbances (which may be random), and to inputs from a controller. The purpose of the controller is to modify the behavior or output of the system. Take, for example, the system to be a boiler. The inputs feeding the system are the flow of water to be boiled, and the flow of natural gas to fuel the burner. Disturbances include fluctuations in ambient temperature, and random gusts of air blowing over the burner. The desired output is steam at a predetermined flow rate and pressure. The controller, in response to appropriate measurements, might adjust the flow of water or natural gas to the boiler to compensate for fluctuations (internal or external), to achieve the desired output at the predetermined flow rate and pressure.

The general objective of a control system is to minimize the effects of external disturbances and internal variations while satisfying some performance criterion. The difference between the desired output and the actual output of the system is called the "tracking error." With perfect tracking, the tracking error is always equal to zero, i.e. the output of the system exactly follows or "tracks" the desired output, at all times, regardless the desired output and regardless of external disturbances.

We have developed apparatus, methods, and conditions for the effective engineering implementation of natural tracking control for both linear and nonlinear systems. Natural tracking control has been achieved for analog (continuous-time), digital (discrete-time), or hybrid (continuous-time measurements combined with discrete-time processing) implementations. These controllers may be synthesized without using information about the system's state and internal dynamics, or about the effects of disturbances, hence the name "natural" tracking control.

The methods of this invention force a system to exhibit high-quality tracking of a desired output $y_d$ while the system is subject to disturbances d, whose values and effects on the system may be completely unknown. The high-quality tracking property is expressed in terms of the output error e, its derivatives, and/or its integral—independently of the characteristics of the system. The tracking property is denoted by T(.)

The control action u(t) is defined in terms of:
(a) the previously realized control at time $t-\epsilon$ for very small $\epsilon$; u is fed back to the controller input via positive feedback after a time delay $\epsilon$, with gain $\mu$ (0,+1];

(b) the mathematical description of the tracking property T(.);
(c) a well-defined tracking gain matrix V, or tracking gain matrix function V(.), which relates the signals in the controller output to the output error signals at the input channels of the controller. The matrices describing the internal dynamics, and the transmission of disturbances to the system can be completely unknown.
(d) for linear systems, only the input-output characteristics of the system are ultimately required, denoted by the transfer matrix function $G_u(s)$.
(e) many high-quality tracking properties are possible, such as elementwise exponential tracking, stablewise tracking with finite settling time, with or without finite reachability time (terms which are defined below).

High quality tracking was defined in an ideal case in L. T. Grujic, "Tracking Control Obeying Prespecified Performance Index," Proc. 12th IMACS World Congress, Paris France, Jul. 18–22, 1988, pp. 332–336, but no means of implementation were given.

Even where a system is time-invariant, stable, and linear, it need not necessarily exhibit tracking, due to the form of the input variables to the control system used (the desired outputs and/or the disturbances). The problem of guaranteeing a pre-specified quality of exponential or other tracking for any set of (differentiable and bounded) inputs is not trivial. The problem becomes more complex where the control is to be synthesized without knowledge of the system's internal dynamics, and is to be implemented without measuring disturbances or the state of the system.

One method of describing systems is through a state-space representation, a mathematical description of the system's behavior as a function of internal variables, or states. Certain matrices, the so-called control matrix B and output matrix C, are frequently used in such representations. The product of these two matrices, CB, should be nonsingular in order for some subset of systems to track. B. Porter and A. Bradshaw, "Design of linear multivariable continuous-time high-gain output-feedback regulators," *Int. J. Systems Sci.*, 1979. Vol. 10, No. 2, pp. 113–121; B. Porter and A. Bradshaw, "Design of linear multivariable continuous-time tracking systems incorporating high-gain error-actuated controllers", *Int. J. Systems Sci.*, 1979, Vol. 10, No. 4, pp. 461–469. However, no prior work has extended this condition to linear system descriptions other than the state space description (i.e., input-output or more general descriptions), nor has any prior work suggested the use of the product CB in a controller.

J. Penttinen and H. N. Koivi, "Multivariable Tuning Regulators for Unknown Systems," *Automatica*, Vol. 16, No. 4, July 1980, pp. 393–398 describe a low-gain method to tune particular controllers for multivariable, stable, time-invariant, linear systems (multiple-input, multiple-output systems). Penttinen and Koivo applied $(CB)^T[(CB)(CB)^T]^{-1}$ and $(-CA^{-1}B)^T[(-CA^{-1}B)(-CA^{-1}B)]^{-1}$ to portions of certain controllers. There is no suggestion of any means to achieve a desired tracking property of a system with time-varying, a priori unknown desired outputs, or rejection of unknown, time-varying disturbances.

The definition of the control parameter u in terms of the control itself (positive local feedback), the output error, and its derivative for a pre-specified tracking algorithm and quality was introduced in L. T. Grujic, "Tracking Versus Stability: Theory," Proc. 12th IMACS World Congress, Paris, France, Jul. 18–22, 1988, pp. 319–327. K. Youcef-Toumi and O. Ito, "A Time Delay Controller for Systems With Unknown Dynamics," *ASME Journal of Dynamic Systems, Measurement, and Control*, March 1990, Vol. 112, No. 1, pp. 133–142 also used this parameter, for digital control only. In Youcef-Toumi and Ito, all state variables were assumed to be accessible and measurable. The first derivative of the state vector was also assumed to be measurable, and was used to generate the control.

M. Tomizuka, T. C. Tsao, and K. K. Chew, "Analysis and Synthesis of Discrete-Time Repetitive Controllers," *ASME Journal of Dynamic Systems, Measurement, and Control*, September 1989, Vol. 111, No. 3, pp. 353–358; and K. Srinivasan and F. R. Shaw, "Analysis and Design of Repetitive Control Systems Using the Regeneration Spectrum," *ASME Journal of Dynamic Systems, Measurement, and Control*, June 1991, Vol. 113, No. 2, pp. 216–222 discussed a case restricted to known periodic signals where a finite delay in a digital "repetitive" controller equals the period of known allowable periodic input signals. Srinivasan and Shaw noted that a general solution to the design of a repetitive-like control was difficult and elusive. In time-delay controllers, such as those of K. Youcef-Toumi and J. Bobbett. "Stability of Uncertain Linear Systems with Time Delay," *ASME Journal of Dynamic Systems, Measurement, and Control*, December 1991, Vol. 113, No. 4, pp. 558–567, and K. Youcef-Toumi and S. T. Wu, "Input/Output Linearization Using Time Delay Controllers," *ASME Journal of Dynamic Systems, Measurement, and Control*, March 1992, Vol. 114, No. 1, pp. 10–19, the internal dynamics of the systems (rather than the outputs) were controlled; in addition, it was assumed that the higher derivatives of the output could be measured or estimated.

None of the above works (except for L. T. Grujic, "Tracking Versus Stability: Theory," Proc. 12th IMACS World Congress, Paris, France, Jul. 18–22, 1988, pp. 319–327) describes tracking (output control) of any multiple-input, multiple-output system. The methods of the present invention differ substantially from that earlier work by L. T. Grujic.

TABLE OF CONTENTS

Figure 1:
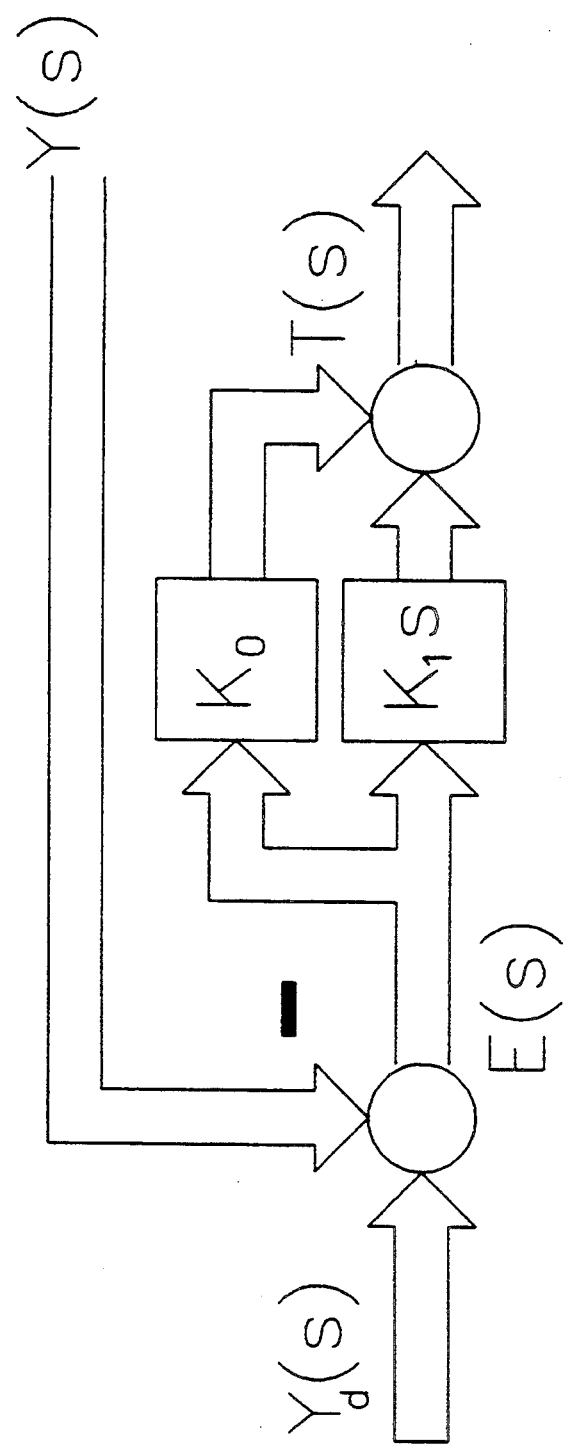
FIG. 1 illustrates a linear differential equation form of a tracking property.

For convenience, this specification is broken down into several sections, for which a table of contents follows. For convenience, a combined listing of parameters used in the specification, and their definitions appear in section 3.0.

0 Tracking Error for Systems 0.1 Tracking Error Definition
0.2 Tracking Versus Stability
1 Tracking Properties: Time Invariant Systems
  1.1 Linear Differential Equation Form of Tracking Property
  1.2 Nonlinear Differential Equation Form of Tracking Property
  1.3 Hybrid Sample-Data Equation Form of Tracking Property
  1.4 Sample-Data Equation Form of Tracking Property
2 System Description: Time Invariant Systems
  2.1 Linear Input-Output Differential Equation Form
    2.1.1 Systems Description
    2.1.2 Tracking Control Algorithms
    2.1.3 Natural Tracking Control: Ideal Case, Linear Input-Output Systems
    2.1.4 Natural Tracking Control: Real Case, Linear Input-Output Systems
    2.1.5 High-Gain Natural Tracking Control, Linear Input-Output Systems
    2.1.6 Real High-Gain Natural Tracking Control
  2.2 Linear State-Space Equation Form
    2.2.1 Systems Description
    2.2.2 Tracking Control Algorithms
    2.2.3 Natural Tracking Control: Ideal Case
    2.2.4 Natural Tracking Control: Real Case
    2.2.5 High-Gain Natural Tracking Control
    2.2.6 Real High-Gain Natural Tracking Control
  2.3 Linear General (Mixed, Combined) Equation Form
    2.3.1 Systems Description
    2.3.2 Tracking Control Algorithms
    2.3.3 Natural Tracking Control: Ideal Case
    2.3.4 Natural Tracking Control: Real Case
    2.3.5 High-Gain Natural Tracking Control
    2.3.6 Real High-Gain Natural Tracking Control
  2.4 Transfer Function Form of Linear, Time-Invariant, Minimum and Non-Minimum Phase Systems
    2.4.1 System Description
    2.4.2 Tracking Control Methods
    2.4.3 Natural Tracking Control: Ideal Case
    2.4.4 Natural Tracking Control: Real Case
    2.4.5 High-Gain Natural Tracking Control
    2.4.6 Real High-Gain Natural Tracking Control
  2.6 Nonlinear Input-Output Systems
    2.5.1 Systems Description
    2.5.2 Tracking Control Algorithms
    2.5.3 Natural Tracking Control: Ideal Case
    2.5.4 Natural Tracking Control: Real Case
    2.5.5 High-Gain Natural Tracking Control
    2.5.6 Real High-Gain Natural Tracking Control
  2.6 Nonlinear State-Space Systems
    2.6.1 Systems Description
    2.6.2 Tracking Control Algorithms
    2.6.3 Natural Tracking Control: Ideal Case
    2.6.4 Natural Tracking Control: Real Case
    2.6.5 High-Gain Natural Tracking Control
    2.6.6 Real High-Gain Natural Tracking Control
  2.7 Nonlinear General Systems Description
    2.7.1 Systems Description
    2.7.2 Tracking Control Algorithms
    2.7.3 Natural Tracking Control: Ideal Case
    2.7.4 Natural Tracking Control: Real Case
    2.7.5 High-Gain Natural Tracking Control
    2.7.6 Real High-Gain Natural Tracking Control
3 Definitions
4 Miscellaneous

0 TRACKING ERROR FOR SYSTEMS

0.1 TRACKING ERROR DEFINITION

The tracking error of a system e(t) is defined as the difference between a desired trajectory or command $y_d(t)$ and the actual output of a system y(t). The tracking error e(t) may stand for a single scalar variable or for a vector of n-variables as $e(t)=[e_1(t), e_2(t), \ldots e_n(t)]^T$ or $e \in \Re$ where $[\ ]^T$ refers to the transpose of the vector and $\Re^n$ is the n-dimensional space of real numbers. The definition of the tracking error is then $$e(t)=y_d(t)-y(t). \tag{0}$$

It is desirable for a system to follow its commanded output in a predictable manner, and desirable that the tracking error be reduced to zero (e(t)=0) in finite time if the initial error was not zero, or that it remain zero if the initial error $e_0=e(0)$ was zero: $e_0=0$. "Natural" tracking control holds these tracking characteristics as its objective, while using little or no knowledge of the internal dynamics or states of the system to be controlled. Notice that we shall use e(t) for $e(t;e_0)$, where $e(0;e_0) \equiv e_0$.

0.2 TRACKING VERSUS STABILITY

Tracking and tracking error refer to the output of the system, and do not, in general, refer to the internal stability of the system's "state." A system's internal state, which may be defined for example by differential equations, may not be "observable" in the output. Even the type and number of parameters determining the internal state may be unknown. It is possible in some mathematical models for a system's internal state to be non-damped and/or unbounded (i.e. oscillating or increasing without bound) while the system's output remains bounded, so that the tracking error converges to zero. If the main objective is to track the desired output, then we may allow the internal system, which is perhaps unknown, to be very dynamic, with possibly large fluctuations in the internal states. For many systems (e.g., technical, economic, biological) this may be realistic, as the internal dynamics may be unknown.

The goal of this invention is to achieve tracking under the action of any disturbance d from a family $S_d$ of permitted disturbances, for any desired output $y_d$ from a family $S_y$ of accepted desired outputs. This means that for every combination (d, $y_d$) $\in S_d \times S_y$ there is a control vector function u in the set $S_u$ of realizable controls, such that the desired tracking occurs.

Therefore, it is meaningful and perhaps necessary to determine just what knowledge is required to control a system when the internal state of the system may not be known, the disturbances may be unknown, and the desired outputs may be unknown a priori. Determining the requirements for tracking (the "trackability" requirement) and for the control algorithms (the "natural tracking control") are central to this goal. However, desirable tracking properties, i.e. how the tracking error e(t) will converge to zero, must first be defined.

1 TRACKING PROPERTIES: TIME INVARIANT SYSTEMS

1.1 LINEAR DIFFERENTIAL EQUATION FORM OF TRACKING PROPERTY

A requested linear tracking property is defined by the functional T in equation (1):

$$T\left(e, e^{(1)}, \ldots, e^{(\gamma)}, \int_0^t e(\tau)d\tau\right) = 0, \gamma \in (1, 2, \ldots, h). \quad (1)$$

T may be a function of the tracking error e(t), its first derivative $$\frac{de(t)}{dt} \equiv e^{(1)}(t),$$

or first derivatives up to the highest $$\frac{d^\gamma e(t)}{dt^\gamma} \equiv e^{(\gamma)}(t), \gamma \in (1, 2, \ldots, h),$$

the integral $$\int_0^t e(\tau)d\tau,$$

or other linear or nonlinear functions as discussed in section 1.2 below.

Linear forms of T may be expressed as:

$$T\left(e, e^{(1)}, \ldots, e^{(\gamma)}, \int_0^t ed\tau\right) = K_0 e + K_1 e^{(1)} + \ldots + \quad (2)$$

$$K_\gamma e^{(\gamma)} + K_I \int_0^t e(\tau)d\tau, \gamma \in (1, 2, \ldots, h),$$

with matrices $K_0, K_1, \ldots, K_\gamma$, and $K_I$. All matrices K are assumed to be non-negative diagonal (either zero or positive diagonal matrices).

Specific examples of linear tracking properties include "PD" (proportional-derivative), "PI" (proportional-integral), and "PID" (proportional-integral-derivative):

$$T(e, e^{(1)}) = K_0 e + K_1 e^{(1)} \quad (PD) \quad (3a)$$

$$T\left(e, \int_0^t ed\tau\right) = K_0 e + K_I \int_0^t ed\tau \quad (PI) \quad (3b)$$

$$T\left(e, e^{(1)}, \int_0^t ed\tau\right) = K_0 e + K_1 e^{(1)} + K_I \int_0^t ed\tau \quad (PID) \quad (3c)$$

Other forms can also be selected for the function T. Let T(s) be defined by:

$$T(s) = K_0 + K_1 s + \ldots + K_\gamma s^\gamma + K_I/s, \gamma \in (1, 2, \ldots, h) \quad (4)$$

where T(s) is the symbolic Laplace transform of the function T(e, ...), $T(s)E(s) \equiv \mathcal{L}\{T[e(t), \ldots]\}$, $\mathcal{L}\{\}$ is the Laplace operator, and s is the Laplace complex variable with real and imaginary parts, $s = (\sigma + j\omega)$.

The tracking properties in this section must meet a certain requirement, namely:

Requirement 1

All the zeros (roots) of det[T(s)]=0 must lie in the open left half of the s-plane. i.e., have negative real parts.

This requirement in essence requires that the tracking property be stable on its own, i.e., we are not requesting an unstable tracking property in which the tracking error would fail to converge to zero.

Note 1.

The location of the zeros of det[T(s)]=0 is governed by the requested tracking property. It should be assured by the choice of the K matrices only. It should be independent of the internal dynamics of the system controlled, which will be achieved by natural tracking control.

As an example of such a PD tracking property, consider $$K_0 = \begin{bmatrix} 1. & 0. \\ 0. & 1. \end{bmatrix} K_1 = \begin{bmatrix} 1. & 0. \\ 0. & 1. \end{bmatrix}$$

so that $$T(s)E(s) = \mathcal{L}\{T[e(t), e^{(1)}(t)]\} =$$

$$\left(\begin{bmatrix} 1. & 0. \\ 0. & 1. \end{bmatrix}\begin{bmatrix} e_1(s) \\ e_2(s) \end{bmatrix} + \begin{bmatrix} 1. & 0. \\ 0. & 1. \end{bmatrix}\begin{bmatrix} s\, e_1(s) \\ s\, e_2(s) \end{bmatrix}\right) = 0$$

$$T(s)E(s) = \begin{pmatrix} e_1(s)(s + 1) \\ e_2(s)(s + 1) \end{pmatrix} = 0.$$

I.e., the shape of the tracking error can be determined by the solution to this unforced linear differential equation without knowledge of the system dynamics to be controlled. In fact, the determinant det[T(s)]=0 comprises two first-order equations in s, and its zeros are s=−1 and s=−1, defining an exponential curve converging from some non-zero initial condition to zero final condition. Note that both roots have negative real parts, which means the tracking property is stable.

Implementation of a Linear Tracking Property

A linear differential equation form of a tracking property (such as PD) may be illustrated in block diagram form. FIG. 1 illustrates such a tracking property. The Laplace transform of the output of the system, Y(s) is measured and compared with the Laplace transform of the desired output, $Y_d(s)$. Their difference is the Laplace transform of the output error or tracking error, $E(s) = Y_d(s) - Y(s)$. For a PD tracking property, the tracking error is multiplied by a diagonal gain matrix $K_0$, and is also differentiated and multiplied by a derivative gain matrix $K_1$. The sum of the results is the tracking property $T(s) = K_0 E(s) + sK_1 E(s)$, where sE(s) denotes differentiation of the tracking error element-by-element. The shape of this tracking error is the exponential solution to the Laplace transform of the s-domain form of the differential equation $K_0 e(t) + K_1 e^{(1)}(t) = 0$, i.e. $e(t) = (e^{-K_0^{-1}K_1 t})e_0$ where $e_0$ is the initial error. Notice that the envelope that encompasses the decay of the tracking error is exponential. This tracking may therefore be called "exponential tracking." "Exponential tracking" does not, in general, mean that the error itself is necessarily exponential. It does mean that there exists an envelope surrounding the error that will exponentially decay to zero. However, in this example there is elementwise tracking, because the matrices $K_i$ are diagonal.

Figure 2:
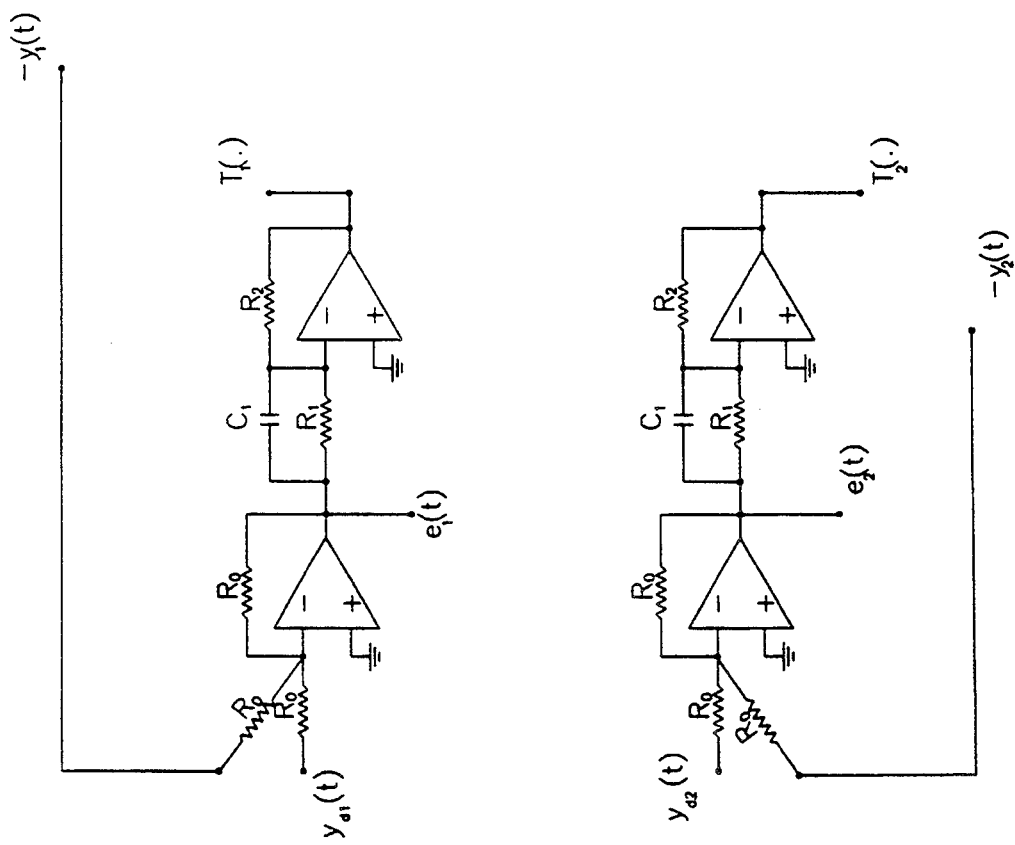
FIG. 2 illustrates an implementation of a linear, two-input, two-output PD tracking property.

Linear differential forms of tracking properties may be implemented with linear integrated or other circuit components, such as operational amplifiers, capacitors, and resistors. In FIG. 2 an implementation of a two-input, two-output, PD tracking property is illustrated. The additive inverses of the outputs to be controlled, $-y_1(t)$ and $-y_2(t)$, are added to the desired outputs, $y_{d1}(t)$ and $y_{d2}(t)$ through an (inverting) summing amplifier. The resistor values $R_0$ for the inputs to the summing amplifier are chosen in accordance with the accepted practice of using relative large resistances (e.g., 10 k Ohms or above), to minimize the current in the op amps. The composite outputs of the first op amps are represented by $e_1(t)$ and $e_2(t)$.

The next op amps implement the tracking property, which in this case is PD. The values of the resistors $R_1$ and $R_2$ and of the capacitor $C_1$ are chosen to limit the current in the op amps as before, and they take the form illustrated because $$\frac{R_2}{R_1}(R_1 C_1 s + 1)$$

represents the Laplace transform of each element of the tracking property. In the example from above, since the Laplace transform of the tracking property is $(s+1)$, if $R_2$ is chosen to be $10,000\Omega$, then $R_1$ is also $10,000\Omega$, and $C_1$ is 100 $\mu$F.

Figure 3:
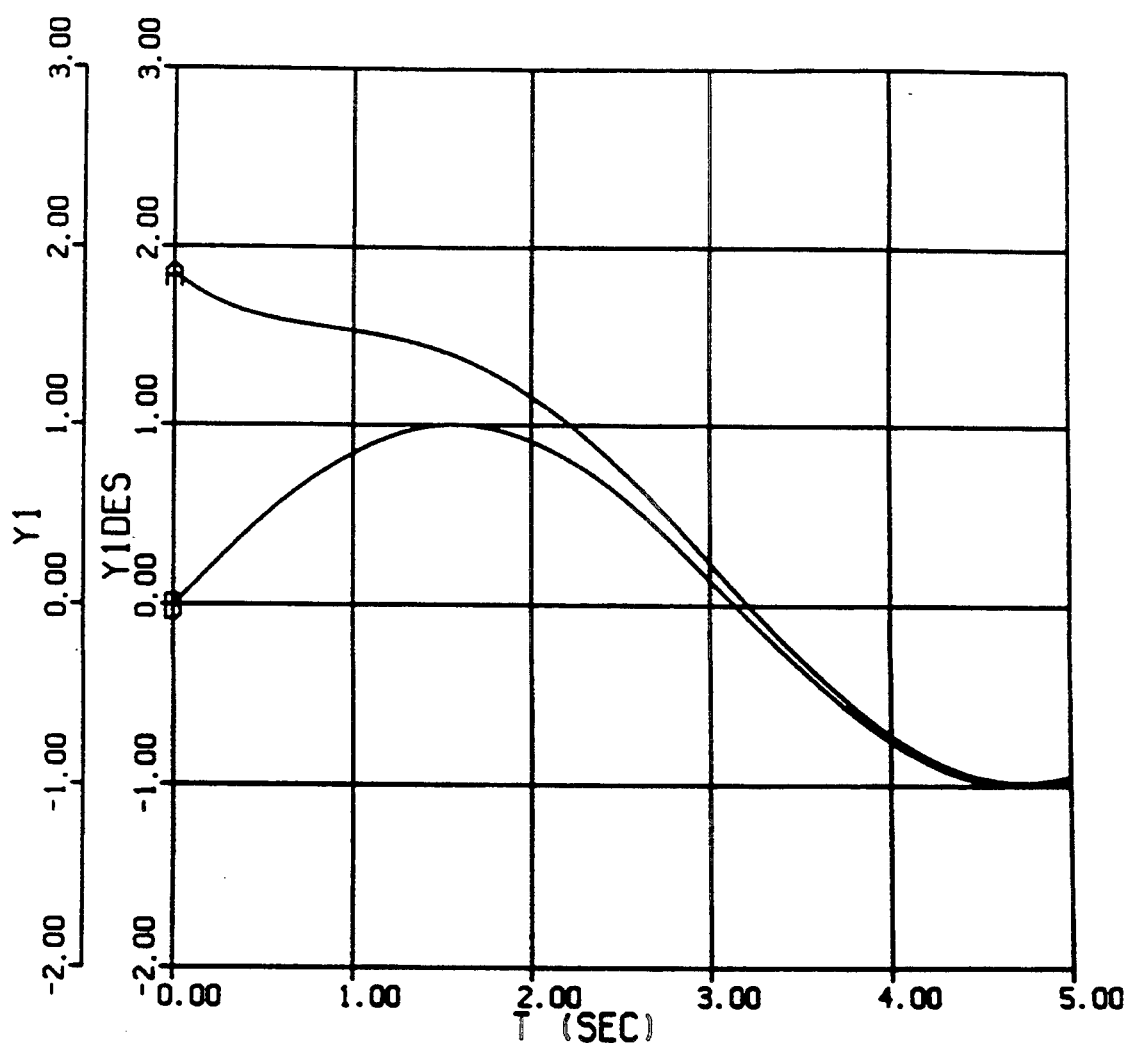
FIG. 3 illustrates the convergence of an actual output to a desired output for a linear system.
Figure 4:
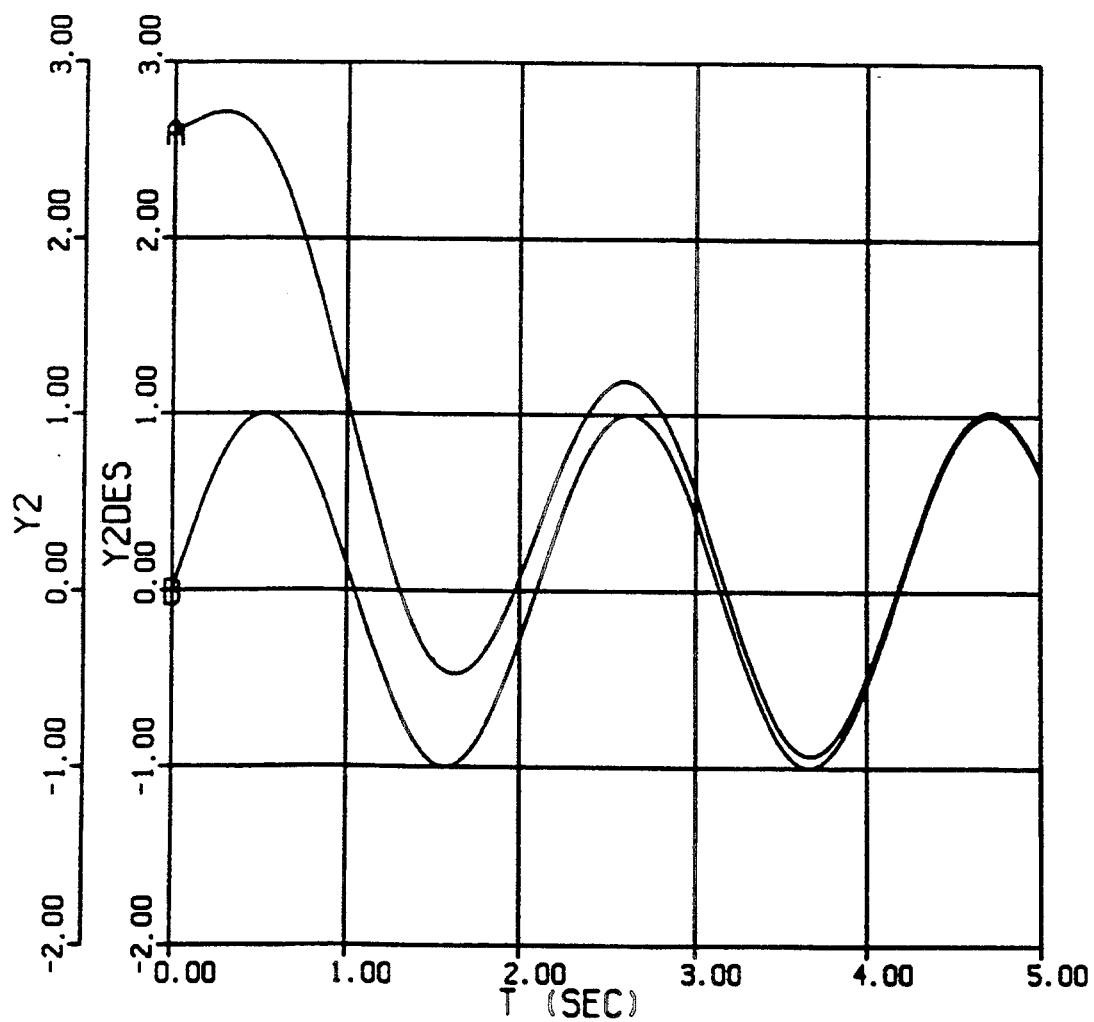
FIG. 4 illustrates the convergence of an actual output to a desired output for a linear system.
Figure 5A:
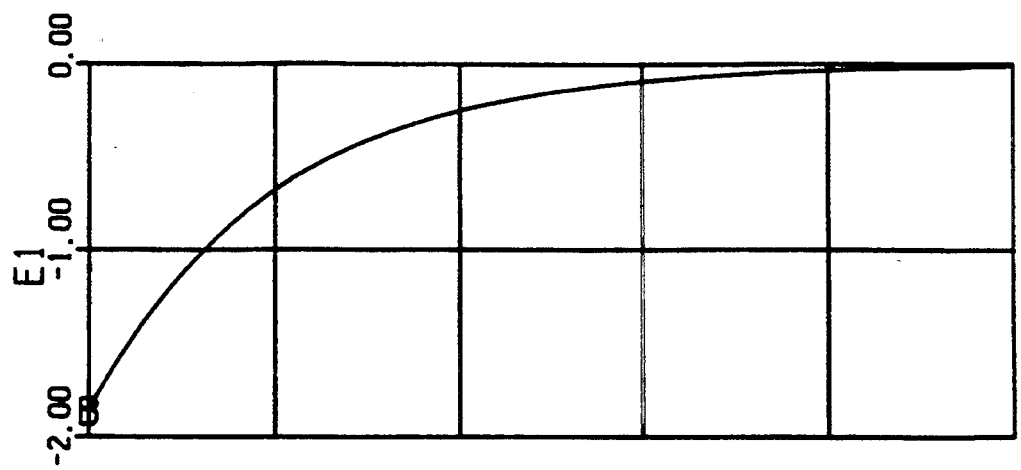
FIGS. 5(A) and 5(B) illustrate the convergence of the errors in FIGS. 3 and 4 to zero.
Figure 5B:
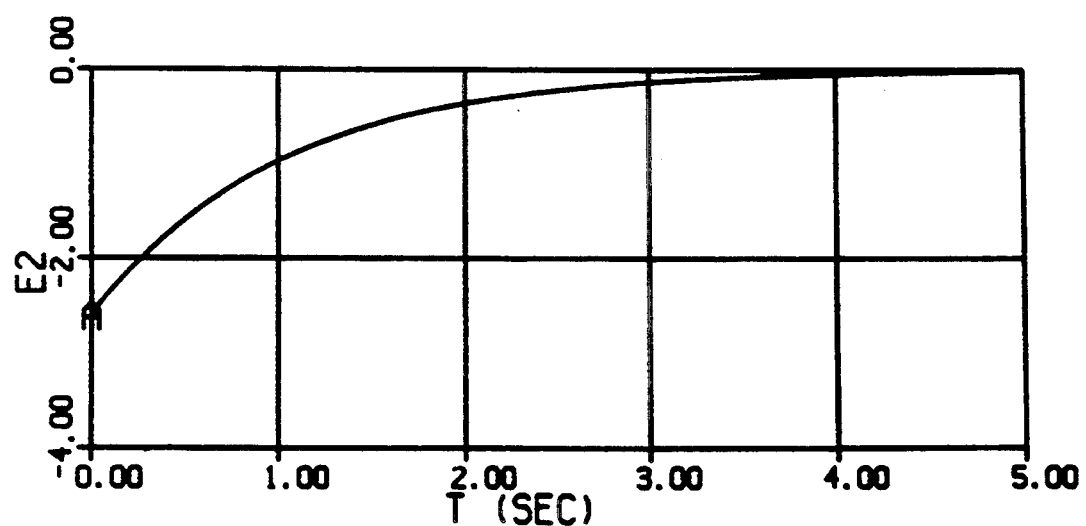

A simulated example of exponential tracking for a two-input, two-output case is illustrated in FIGS. 3 to 5. In FIG. 3, a desired output $y_{d1}(t) = \sin(t)$ (labelled B) was reached exponentially by the corresponding actual output $y_1(t)$ (labelled A). Output $y_1(t)$ started from an arbitrary initial condition, and exponentially "tracked" the desired output. In FIG. 4 similar illustrations are shown for the second output $y_2(t)$ and the second desired output $y_{d2}(t) = \sin(3t)$. The two errors, $e_1(t)$ [E1] and $e_2(t)$ [E2], are illustrated in FIGS. 5(A) and 5(B). Note that the desired outputs are different, and that each is a function of time. The exponential tracking of the outputs to the desired outputs is illustrated in FIG. 5. Note that even though the two outputs were dynamically coupled, and that the desired outputs were different and varied with time, the actual outputs converged to the desired outputs.

1.2 NONLINEAR DIFFERENTIAL EQUATION FORM OF TRACKING PROPERTY

It may be desirable to require a system to exhibit a higher order tracking property or "higher quality tracking," i.e., to have the tracking error converge faster than the exponential-like tracking properties of section 1.1. Nonlinear tracking properties can be described that define this higher order tracking and therefore the "shape" of the output tracking error as it is reduced to zero. In the following section several definitions are necessary that define the sign of a variable. Let sign $\zeta = |\zeta|^{-1}\zeta$ for $\zeta \neq 0$, and sign $0 = 0$ (to prevent the division by zero); also $s(e) = (\text{sign } e_1 \text{ sign } e_2 \ldots \text{ sign } e_n)^T$ defines a vector of sign functions of n variables; and $S(e) = \text{diag}\{\text{sign } e_1 \text{ sign } e_2 \ldots \text{ sign } e_n\}$ defines a diagonal $n \times n$ matrix with zeros everywhere off the main diagonal, and the sign of the variables on the main diagonal; and finally I is the identity matrix of the appropriate order required by context. We may define an exponential function $e^K = (e_1^{k_1} e_2^{k_2} \ldots e_n^{k_n})^T$, for $K = \text{diag}\{k_1 k_2 \ldots k_n\}$, with the diagonal entries being positive real numbers as $k_i \epsilon \{1, \ldots, 2, \ldots\}$, with unequal entries such as $k_i \neq k_j$ permitted. The Euclidean norm (or length of a vector) $\|.\| : \Re^N \to \Re_+$ on $\Re^N$ will also be used with $\Re^N$ being a N-dimensional space of real numbers; $\Re_+ = [0, +\infty)$ and $\|x\| = (x^T x)^{1/2}$ is the Euclidean norm of the N-dimensional vector x. Furthermore, $D^j(|e|) = \text{diag}\{|e_1|^j \ldots |e_n|^j\}$ is a diagonal $n \times n$ matrix with zeros off the main diagonal, and jth powers of the absolute values of the output-error variables.

A requested nonlinear tracking property is defined by the function T and equation (1) (as in section 1.1), $$T\left(e, e^{(1)}, \ldots, e^{(\gamma)}, \int_0^t e d\tau\right) = 0, \gamma \in (1, 2, \ldots, h). \quad (1)$$

For this section, specific nonlinear forms of T may be written:

$$T\left(e, e^{(1)}, \ldots, e^{(\gamma)}, \int_0^t e d\tau\right) = \quad (2)$$

$$K_0 e(t) + K_1 e^{(1)}(t) + \ldots + K_\gamma e^{(\gamma)}(t) + K_I \int_0^t e d\tau + K_s s(e) +$$

$$L[S(e_o)e(t,e_o)]^{I-L-1} + M \int_0^t [S(e_o)e(\tau,e_o)]^{I-M-1} +$$

$$N_0[D(|e|)]^{\alpha/\beta} S(e), \gamma \in (1, 2, \ldots, h)$$

for different cases of matrices $K_0, K_1, \ldots, K_\gamma, K_I, K_s$, L, M, and $N_0$ and for natural numbers $\alpha, \beta \in \{1, 2, \ldots, n, \ldots\}$. All of these matrices are assumed to be non-negative diagonal (e.g. zero or positive diagonal matrices). Note that this equation contains the nonlinear functions of the sign of the initial tracking error $e(0)$ as $S(e_0)$, the sign of the (vector) tracking error $e(t)$ as $s(e)$, the elementwise absolute value of $e(t)$ as $|e|$, and power functions of the tracking error $[\ldots e(\;)]^K$.

Let $p^k$ be the symbol for $d^k(.)/dt^k$, the kth derivative of $(.)$; and $p^{-1} = 1/p$ be the symbol for $$\int_0^t (.)d\tau - \text{the integral of } (.).$$

Then (2) may be rewritten in the symbolic form $T(p) = 0,$ $T(p) = K_0 + K_1 p + \ldots + K_{65} p + K_I/p + K_s s(.)$ $+ L[S(e_0)(.)]^{I-L-1} + \{M[S(e_0)(.)]^{I-M-1}\}/p + N_0[D(|.|)]^{\alpha/\beta} S(.), \gamma \in (1,2,\ldots,h)$  (3)

where (.) stands symbolically for $e(t)$. In the linear form of $T(.)$, when $L = M = N_0 = 0$, (see equation (2) of section 1.1), then $p$ in (3) may be replaced by $s$ (the Laplace domain complex variable), which will give $T(p)|_{p \to s}$ in the Laplace operator form (see equation (4) of section 1.1).

For example, the tracking property may be described by $T(e, e^{(1)}) = K_1 e^{(1)}(t) + L[S(e_0) e(t, e_0)]^{(I-L-1)}$ with $$K_1 = \begin{bmatrix} 1 & 0 \\ 0 & 1 \end{bmatrix} \text{ and } L = \begin{bmatrix} 3 & 0 \\ 0 & 3 \end{bmatrix},$$

so that $$T(e, e^{(1)}) = \left( \begin{bmatrix} 1. & 0. \\ 0. & 1. \end{bmatrix} \begin{bmatrix} e_1^{(1)}(t) \\ e_2^{(1)}(t) \end{bmatrix} + \begin{bmatrix} 3 & 0 \\ 0 & 3 \end{bmatrix} \begin{bmatrix} S(e_{01}) e_1(t, e_{01}) \\ S(e_{02}) e_2(t, e_{02}) \end{bmatrix} \right) \begin{bmatrix} \frac{2}{3} & 0 \\ 0 & \frac{2}{3} \end{bmatrix} = 0$$

defines the shape of the tracking property as it converges to zero in finite time $T_i = |e_{i0}|^{1/3}$, $i = 1,2$ from an initial condition $e_0 = (e_{10}, e_{20})^T$ based upon the initial error $e_0$. This is the so-called stablewise tracking with finite (prespecified) settling time, with or without finite reachability time. Stablewise tracking with finite settling time means that the tracking error decays such that an envelope surrounding the error is less than a specified value at a specified time. Finite reachability time means that there is a finite time after which the tracking error is identically zero. It is possible to have stablewise tracking, while the error does not converge identically to zero. However, both conditions together are desirable.

Implementation of a Nonlinear Tracking Property

Figure 6:
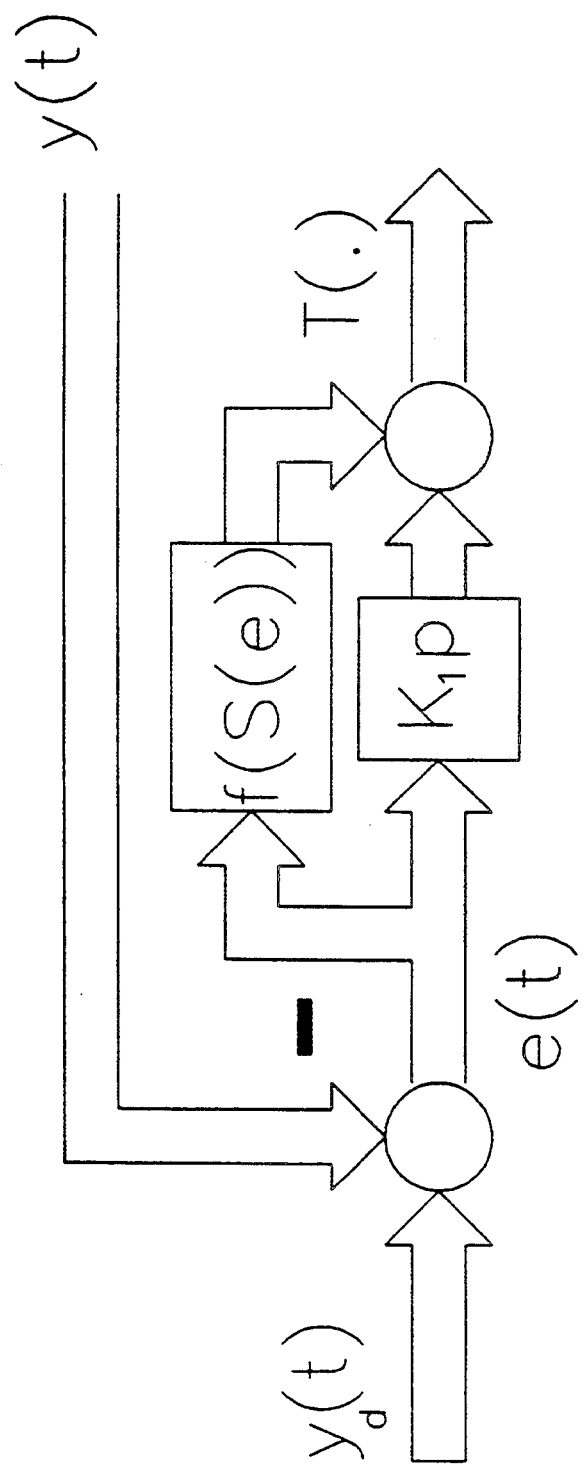
FIG. 6 illustrates a nonlinear differential equation form of a tracking property.

A nonlinear differential equation form of a tracking property may be illustrated by a block diagram, as in FIG. 6. This block diagram is similar in some respects to that of FIG. 1. However, in FIG. 6 the constant gain matrix $K_0$ is replaced by a function block representing the sign of the error, $S(e)$, and the gain matrix $L$. The function $S(e_0)$ is the sign of the initial error, which may be represented by $(+1,-1,0)$. The power function $(.)^{I-L-1}$ is a straightforward element-by-element power function. In this case, it raises the product of the sign of the initial error and the current error to some fractional power. For example, since $L = \text{diag}\{3.0, 3.0\}$, then $[\text{sign}(e_{0i}) e_i(t)]^{2/3}$ comprises this pan of the function for tracking error $i = 1,2$. The diagonal elements of the gain matrix $L$ are then $l_i [\text{sign}(e_{0i}) e_i(t)]^{2/3}$; $l_i = 3$; $i = 1, 2$. Note that larger nonnegative values of the diagonal entries in $L$ specify a "higher quality" (i.e., faster converging) tracking property. The tracking property itself is formed by summing the elements of the linear derivative part, $K_1 p$, and the just-described nonlinear part.

Figure 7:
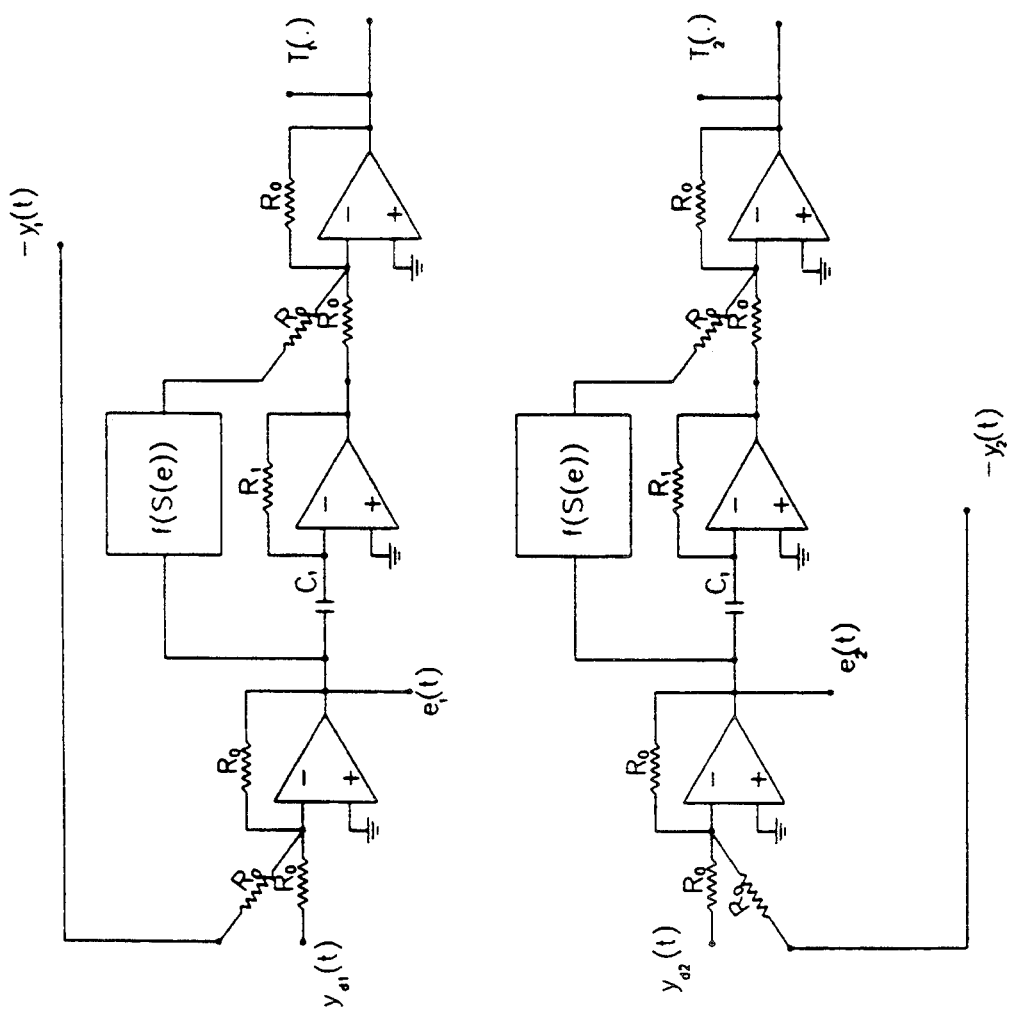
FIG. 7 illustrates an implementation of a two-input, two-output nonlinear tracking property.

A nonlinear tracking property may also be implemented with integrated circuits, as illustrated in FIG. 7. The tracking error may be measured as illustrated in FIG. 2, with operational amplifiers (op amps) and with the $R_0$ chosen as in standard practice. The derivative function may be constructed with an op amp that forms the derivative of its input, i.e. of the tracking error. The op amp differentiator output voltage is proportional to the value of $R_1 C_1 d(.)/dt$, where (.) is the input voltage for the differentiator, which in this case is $e_i(t)$, $i = 1,2$ the tracking error. The values of $R_1$ and $C_1$ are chosen from standard practices, accounting for current limitations and scaling requirements. (The voltage range of amps is limited (typically within $\pm 15$ volts).)

The nonlinear part of the tracking property is depicted by a function block representing an analog multiplier circuit for multiplying $S(e)$ and $e(t)$, and then raising this product to some fractional power. Since $S(e)$ is elementwise diagonally either plus one, minus one, or zero by definition, a comparator circuit may be used to evaluate the sign of the initial error; its output may then drive a latch circuit which holds a voltage whose sign is a function of the sign of the initial error. For simplicity, we may assume that this voltage is either, $+1$, $-1$ or 0. This circuit has a constant output until it is reset.

An analog multiplier/divider (AD538, Data Acquisition Databook Update and Specification Guide, Analog Devices, 1986, p 2–22) may be used with a resistor programmable power function of the form $V_{out} = -V_Y (V_Z/V_X)^M$, where $V_Z$ is the product $S(e_i) e_{i(t)}$, $i = 1,2$; $V_X = 1.0$ volt; $M = l_i$; $i = 1,2$; and $V_Y = l_i$; $i = 1,2$. In the example above, $l_i = 3$; $i = 1,2$. The final sum is preformed by an (inverting) op amp whose resistors values may be chosen for implementation considerations by standard means known in the art.

Figure 8:
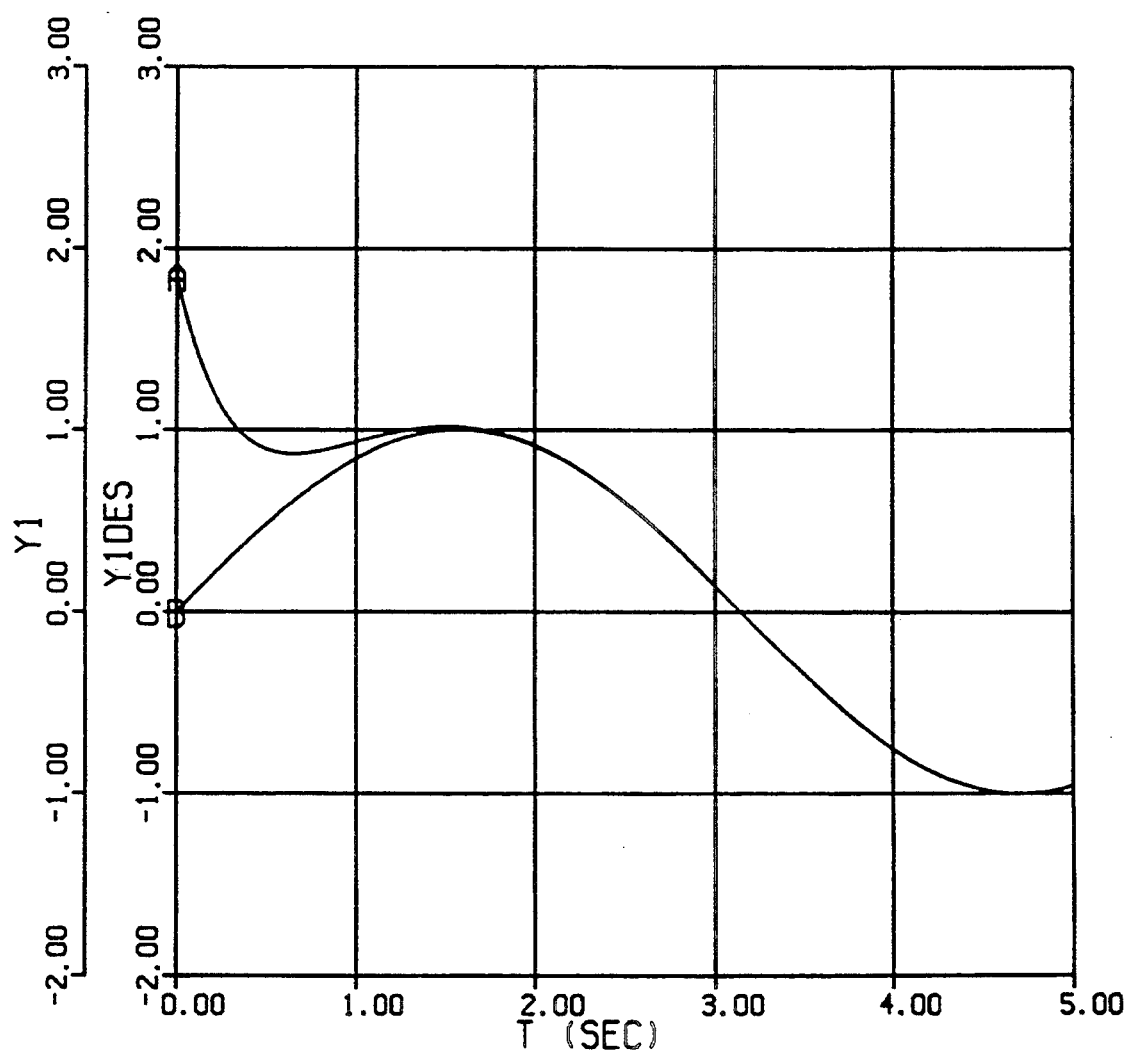
FIG. 8 illustrates the convergence of an actual output to a desired output for a nonlinear system.
Figure 9:
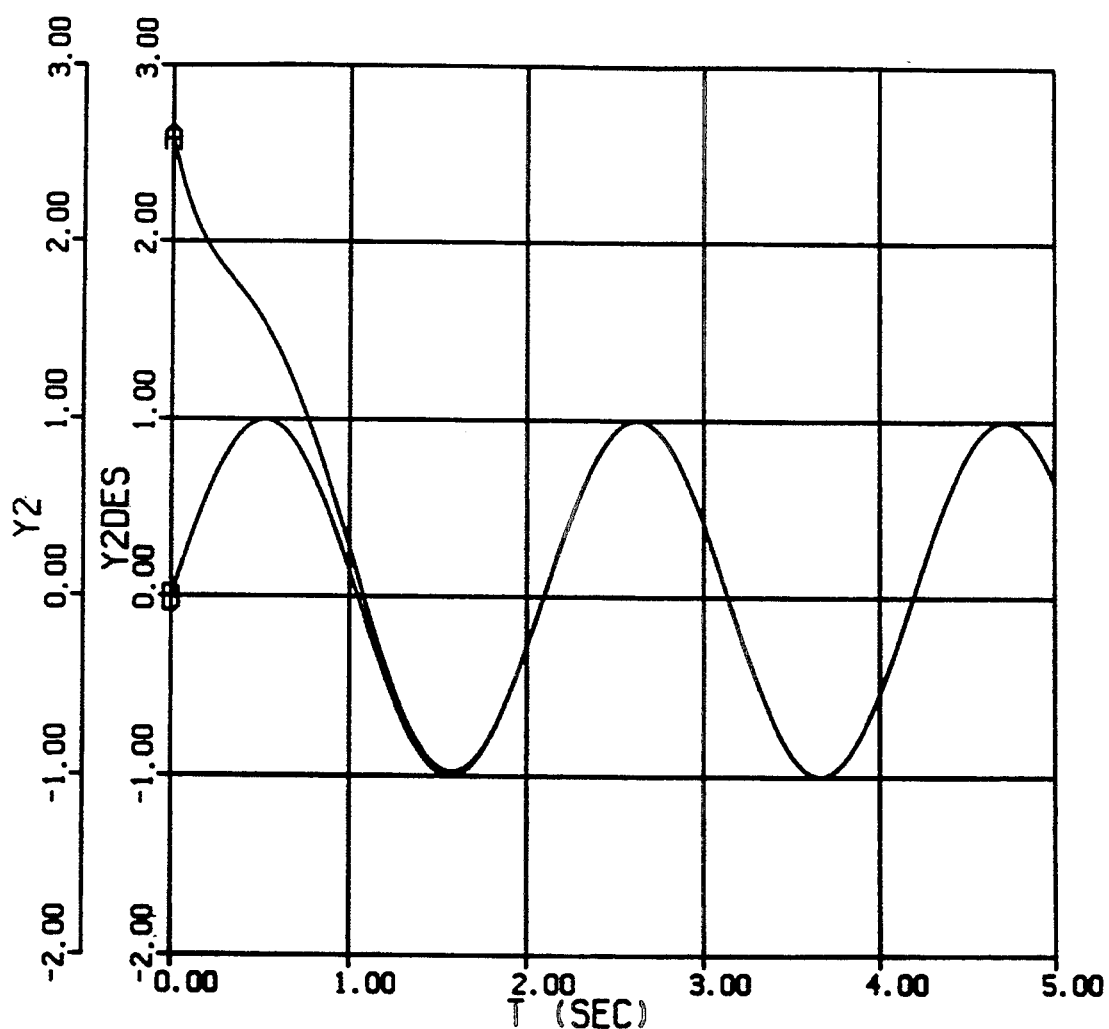
FIG. 9 illustrates the convergence of an actual output to a desired output for a nonlinear system.
Figure 10A:
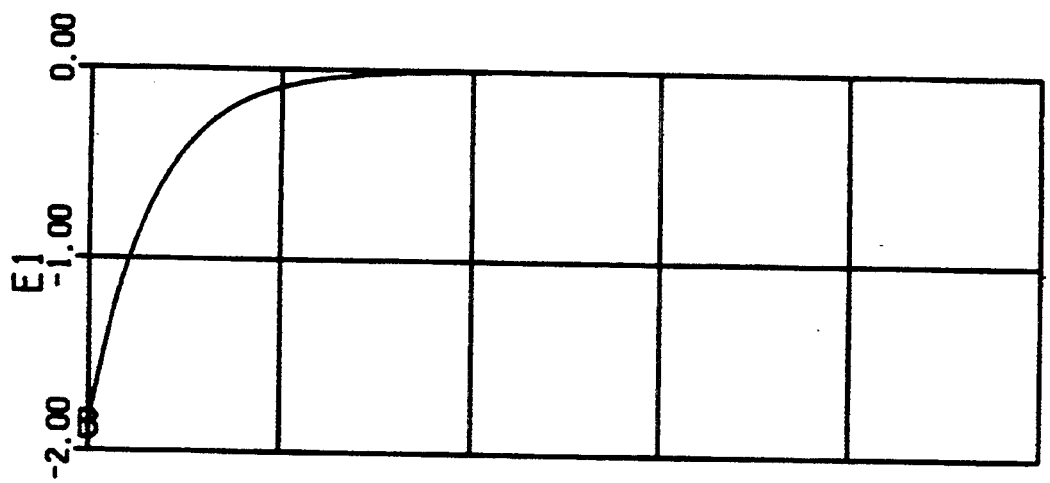
FIGS. 10(A) and 10(B) illustrate the convergence of the errors in FIGS. 8 and 9 to zero.
Figure 10B:
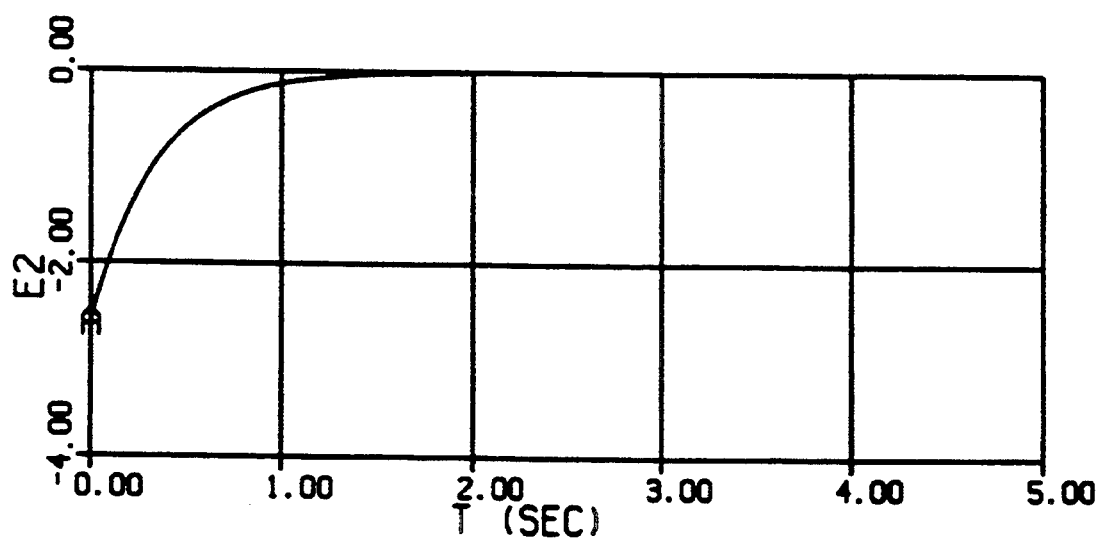

FIGS. 8 through 10 illustrate a simulation of the above nonlinear tracking property. In this example, the desired outputs $y_{d1}(t)$ and $y_{d2}(t)$ (labelled A) are the same as in the example shown in FIGS. 3 and 4. The convergence of the outputs $y_1(t)$ and $y_1(t)$ in FIGS. 8 and 9, respectively, are dramatically different from the linear counterparts illustrated in the previous section. Their radically faster ("higher quality") tracking is due to the substitution of the $L[S(e_0) e(t)]^{I-L-1}$ function for $K_0 e(t)$ forcing the tracking error to zero much faster than before. The tracking errors $e_1(t)$ [E1] and $e_2(t)$ [E2] illustrated in FIGS. 10(A) and 10(B) demonstrate this higher quality, nonlinear tracking property as the errors are reduced to zero and thereafter remain zero. Note for comparison that the only change between FIGS. 3–5 and FIGS. 8–10 is the nonlinear tracking property. All inputs, disturbances, and dynamics were otherwise the same for these two simulations.

1.3 HYBRID SAMPLE-DATA EQUATION FORM OF TRACKING PROPERTY

In some cases the more difficult portions of the algorithms, and of the tracking properties, may be more easily calculated on a digital computer than with analog circuit elements. However, part or all of the tracking property may be formed with continuous-time devices (e.g., operational amplifiers, resistors, capacitors, etc.). This section addresses the situation where a tracking property has been "conventionally" created, and is then sampled through an analog-to-digital converter with sample time $T_s$ for use in a discrete-time device (i.e. a digital computer). Let $T(k)$ be the kth sample of the tracking property of section 1.1 or 1.2 above. For section 1.1, $T(k)$ for a sample period $T_s$ may be formed either by $$T(k) = K_0 e(kT_s) + K_1 e^{(1)}(kT_s) + \ldots + K_\gamma e^{(\gamma)}(kT_s) + \quad (1a)$$
$$K_I \int_0^t e(\tau;e_0) d\tau(kT_s), \gamma \in (1,2,\ldots,h)$$

i.e., by individually sampling each portion of the tracking property, or $$T(k) = \quad (1b)$$

$$\left[ K_0 e + K_1 e^{(1)} + \ldots + K_\gamma e^{(\gamma)} + K_I \int_0^{-t} e(\tau;e_0) d\tau \right](kT_s),$$

$$\gamma \in (1,2,\ldots,h)$$

i.e., by sampling the collective continuous time tracking property (the sum is formed with analog components, and then that sum is sampled).

This also holds for the nonlinear tracking properties of 1.2 above, as $$T(k) = K_0 e(kT_s) + K_1 e^{(1)}(kT_s) + \ldots + K_\gamma e^{(\gamma)}(kT_s) + \quad (2a)$$

$$K_I \int_0^t e(\tau;e_0) d\tau(kT_s) + K_s s(e(kT_s)) + \{L[S(e_0)e(kT_s,e_0)]^{I-L-1}\} +$$

$$\left( M \int_0^t [S(e_0)e(\tau,e_0)]^{I-M-1} d\tau \right)(kT_s)) +$$

$$N_0 \{D[|e(kT_s)|]\}^{\alpha/\beta} S[e(kT_s)], \gamma \in (1,2,\ldots,h)$$

for individually sampling each portion of the nonlinear tracking property, and $$T(k) = [[K_0 e(t;e_0) + K_1 e^{(1)}(t;e_0) + \ldots + K_\gamma e^{(\gamma)}(t;e_0) + \quad (2b)$$

$$K_I \int_0^t e(\tau;e_0) d\tau + K_s s[e(t;e_0)] +$$

$$L[S(e_0)e(t,e_0)]^{I-L-1} + M \int_0^t [S(e_0)e(\tau,e_0)]^{I-M-1} d\tau \Bigg] +$$

$$N_0 \{D[|e(t;e_0)|]\}^{\alpha/\beta} S[e(t;e_0)]](kT_s), \gamma \in (1,2,\ldots,h)$$

for the "collective" sampling of the nonlinear tracking property.

This hybrid approach offers the advantages that the tracking property may be easily monitored with inexpensive components (such as industry standard PD, PI, or PID controllers for linear properties). The (possibly) more difficult controller formulation tasks to follow may be best implemented with the computational power afforded by digital computers.

Figure 11:
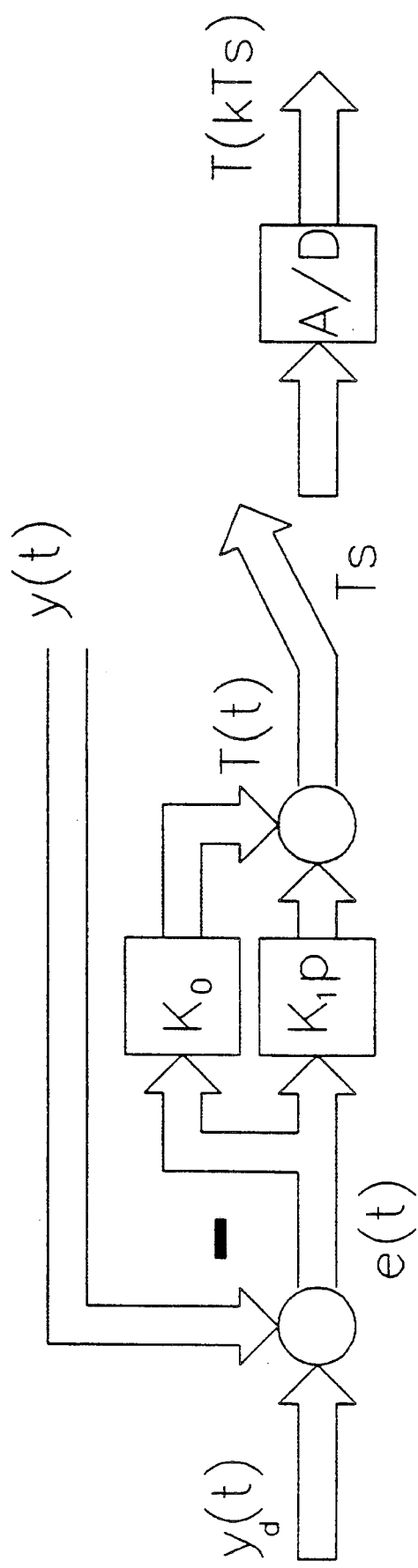
FIG. 11 illustrates a hybrid form of a tracking property.

Implementation of a Hybrid Sample-Data Equation Form of a Tracking Property the PD tracking property example from section 1.1 may alternatively be implemented in a hybrid, two-step sample-data process in which an analog PD tracking property is sampled by a sample-and-hold circuit with an analog-to-digital converter circuit, for use in a digital computer. This two-step process is illustrated by the block diagram of FIG. 11. The tracking error e(t) is formed as before by subtraction of the actual output y(t) from the desired output $y_d(t)$. A scaled derivative of the error is then formed by $K_1 p$, where $p \equiv d(.)/dt$ as before. The tracking property T(t) is formed continuously by summing the scaled derivative and a scaled term proportional to the error, $K_0 e(t)$. The continuous tracking property is sampled by a circuit with sampling time $T_s$, and converted to a digital number by an analog-to-digital (A/D) converter. The final result of the sample-data function is the tracking property $T(kT_s)$ representing the analog voltage T(t) at each sampling time $kT_s$, $k \in (1,2,\ldots)$. The digital value of the sampled signal is assumed constant between sample periods, because it is sampled and held by a sample-and-hold (S/H) circuit.

Figure 12:
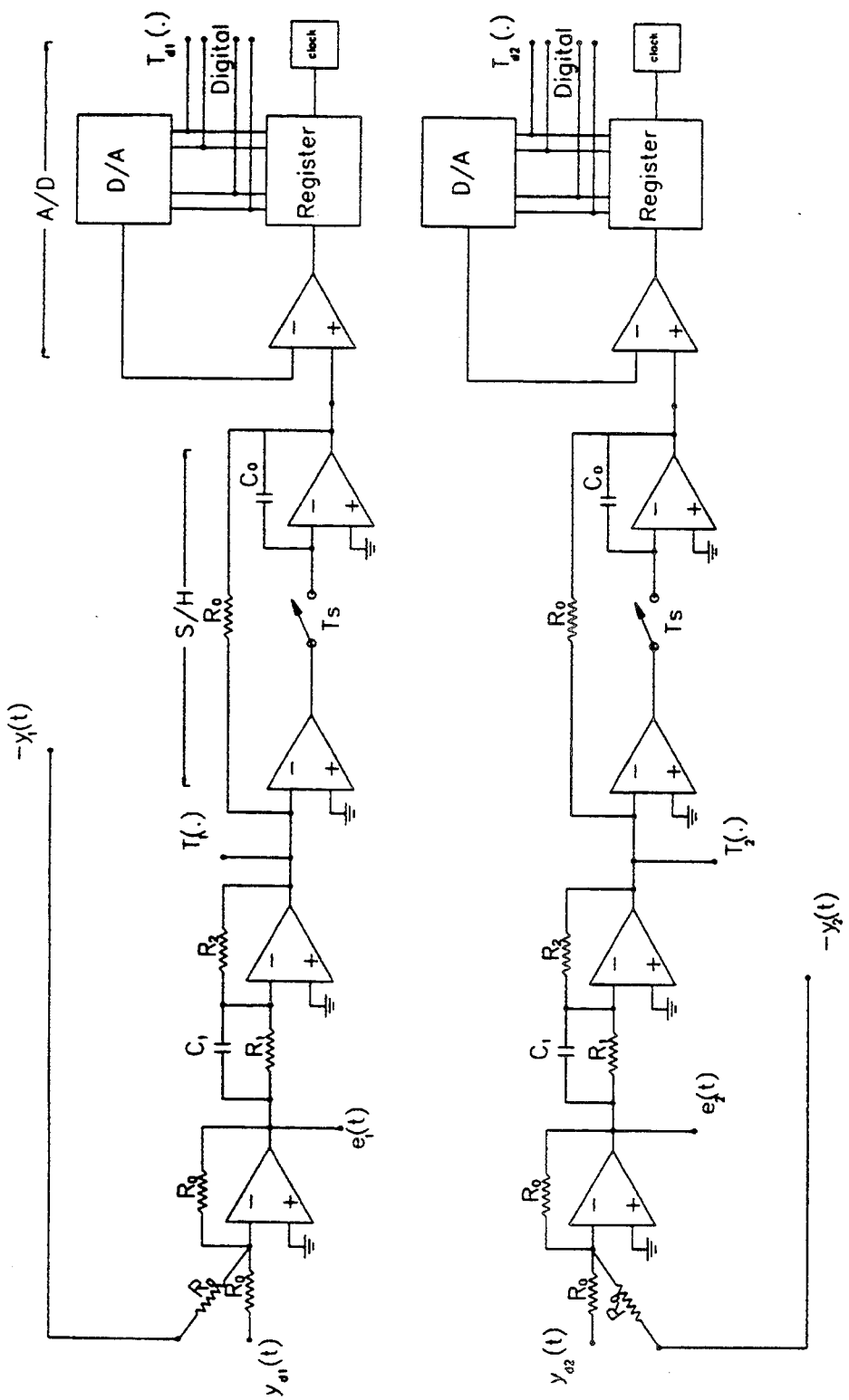
FIG. 12 illustrates an implementation of a hybrid tracking property.

An implementation of the hybrid tracking property is illustrated in FIG. 12. The analog tracking error for each output is formed in a summing (inverting) amplifier. A PD op amp circuit, identical to that of FIG. 12, implements the tracking property. A pair of op amps with a sampling switch which closes at intervals $T_s$ comprise the S/H circuit. Its resistor value $R_0$ and capacitor value $C_0$ may be chosen for standard implementation reasons. The piece-wise continuous voltage output of each S/H is then converted to a digital number $T_d(.)$ by an A/D circuit. Some A/D converters have the S/H circuit as an integral part of their design, for example AD7824. p 2-64, Data Acquisition Databook Update and Specification Guide, Analog Devices, 1986.

Figure 13:
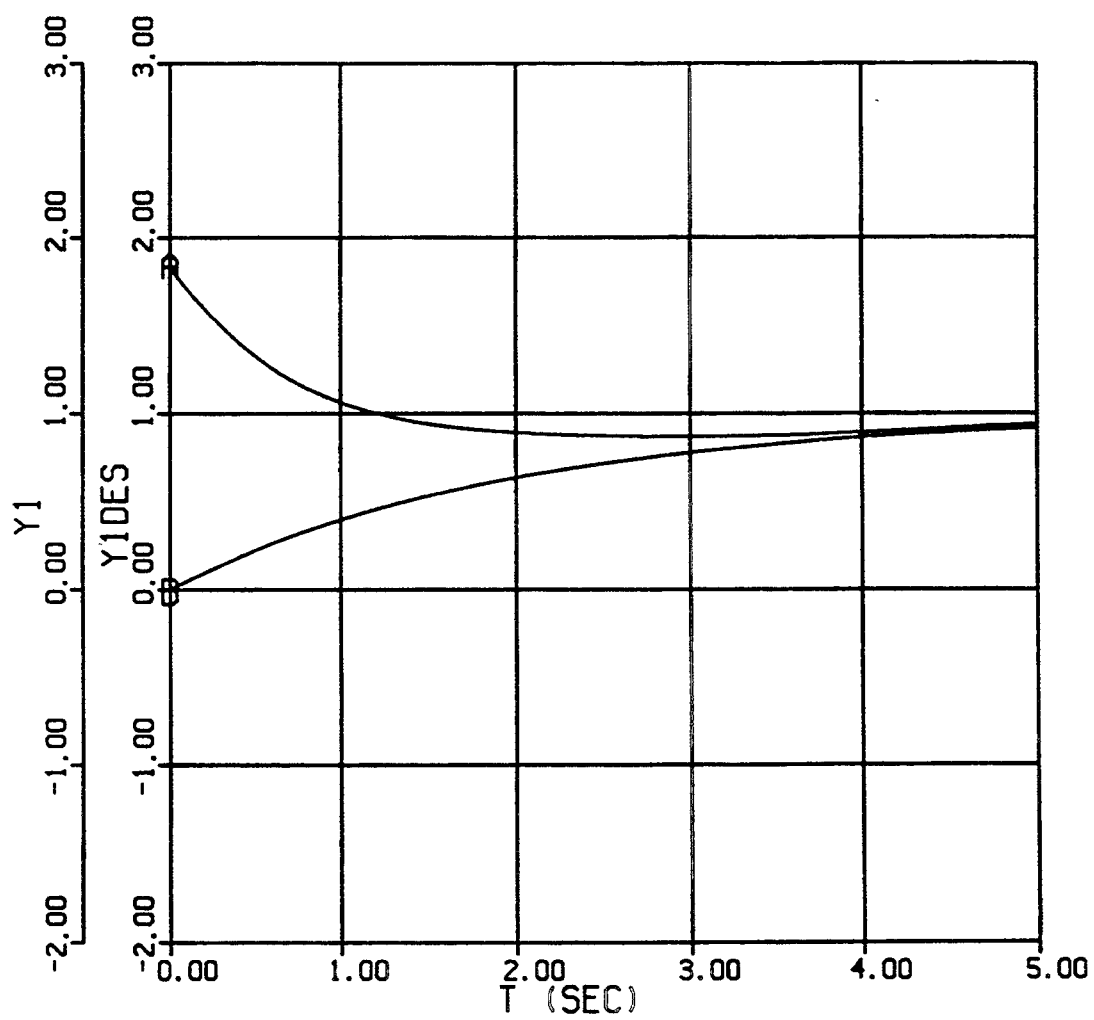
FIG. 13 illustrates the convergence of an actual output to a desired output for a hybrid system.
Figure 14:
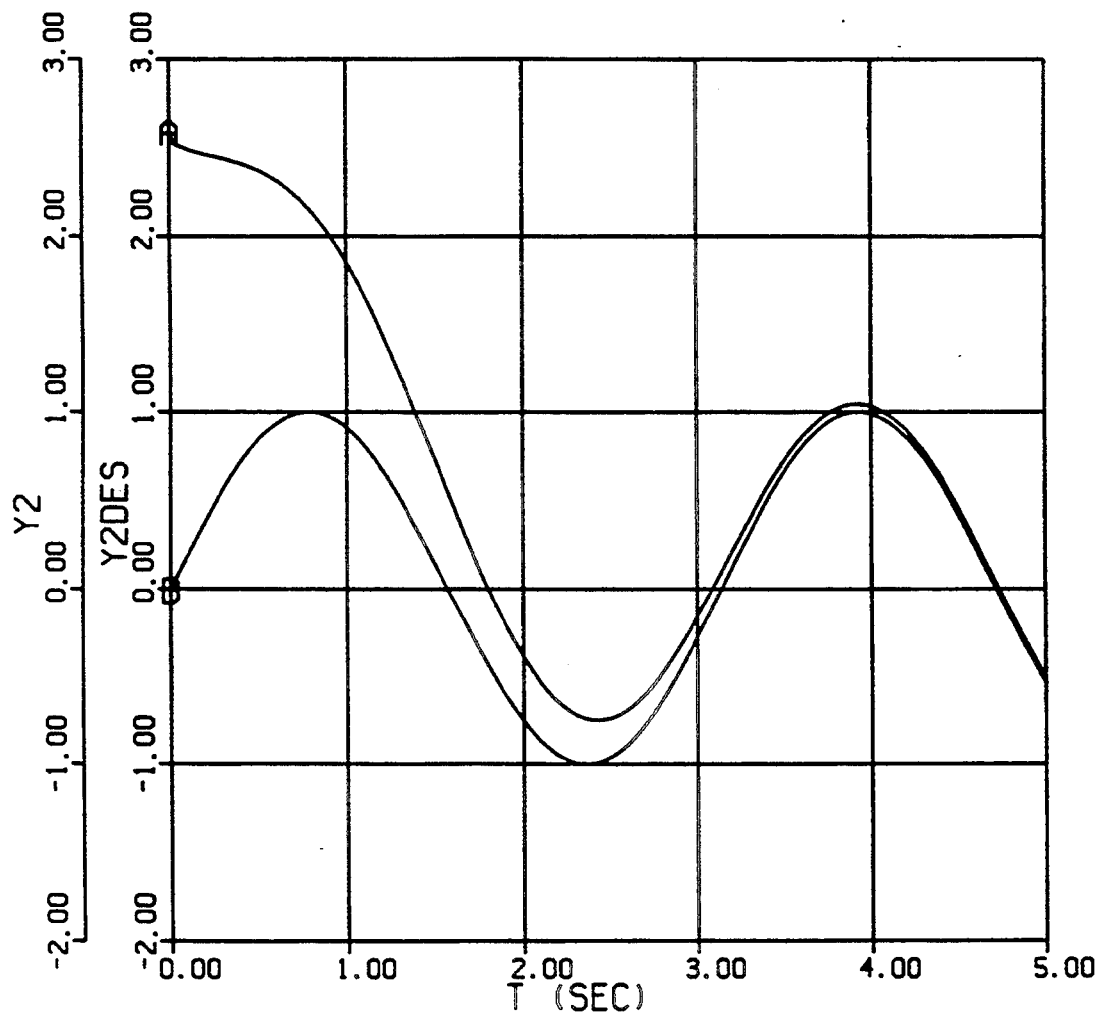
FIG. 14 illustrates the convergence of an actual output to a desired output for a hybrid system.
Figure 15A:
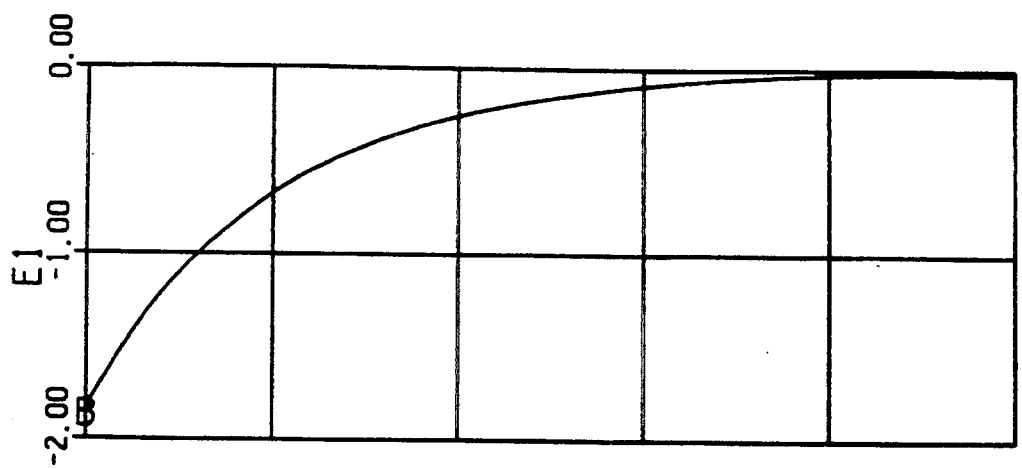
FIGS. 15(A) and 15(B) illustrate the convergence of the errors in FIGS. 13 and 14 to zero.
Figure 15B:
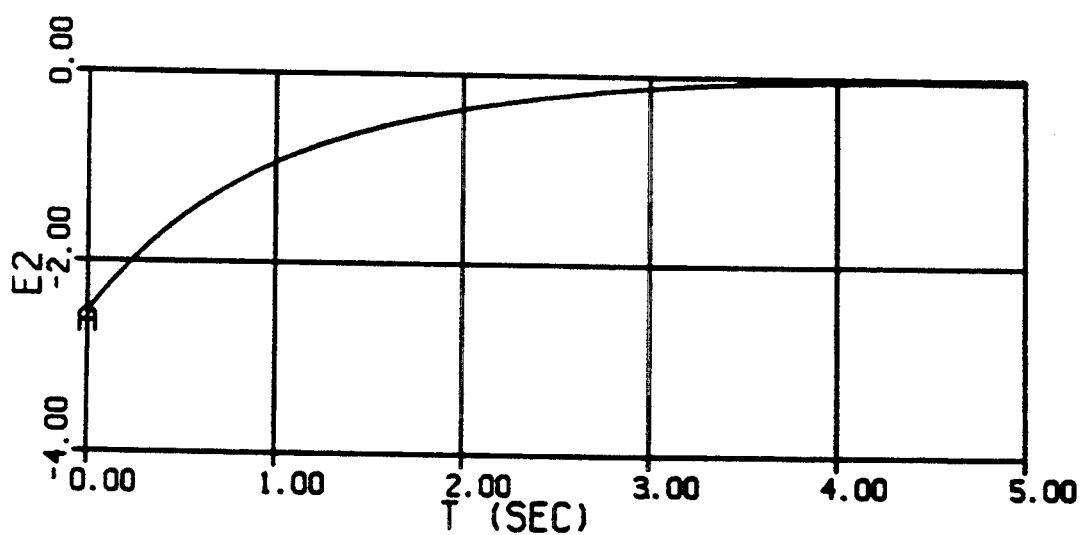

A simulation of a PD tracking property with hybrid implementation is illustrated in FIGS. 13-15. The system simulated is the same as described above in the sections 1.1 and 1.2. However, in this example the desired outputs (labelled B) $y_{d1}(t)$ [Y1DES] and $y_{d2}(t)$ [Y2DES] are different: $y_{d1}(t) = (1 - e^{-0.5t})$ and $y_{d2}(t) = \sin(2t)$. In FIG. 13 the system output $y_1(t)$ (labelled A) exponentially converges to the desired output $y_{d1}(t)$. Similarly, the output $y_{d2}(t)$ converges to desired output $y_{d2}(t)$, as illustrated in FIG. 14. The tracking errors $e_1(t)$ and $e_2(t)$ are shown in FIGS. 15(A) and 15(B), and demonstrate the tracking errors' exponential decay to zero. The remaining portions of the controller were implemented as if for a digital controller. The sampling time for this simulation was $T_s = 0.01$ sec.

1.4 SAMPLE-DATA EQUATION FORM OF TRACKING PROPERTY

The conclusions of the previous section also apply for a totally digital tracking property, where the tracking error e(t) itself is determined by sampling the output(s). The tracking error then becomes e(k). More formally, let $e(k) = y_d(k) - y(k)$ be the difference between the value of the kth sample of the desired output and that of the actual output of the system. Then $T(k) = T(kT_s)$ for linear $T(.)$ for sample period $T_s$ may be formed by $$T(k) = K_0 e(k) + K_1 e(k-1) + \ldots + K_\gamma e(k-\gamma), \quad \gamma \in (1,2,\ldots,h) \quad (1)$$

by individually sampling (or creating) each desired output and sampling each system output. This also holds for the nonlinear $T(.)$, i.e. for the nonlinear tracking properties of section 1.2 above as $$T(k) = K_0 e(k;e_0) + K_1 e(k-1;e_0) + \ldots \\ + K_\gamma e(k-\gamma;e_0) + \\ K_s S[e(k;e_0)] + L[S(e_0)e(k;e_0)]^{I-L-1} + M[S(e_0)e(k-\eta,e_0)]^{I-M-1} + \\ N_0\{D[|e(k;e_0)|]\}^{\alpha/\beta} S[e(k;e_0)], \gamma \in (1,2,\ldots,h) \quad (2)$$

for individually sampling (or creating) each desired output and sampling each system output. This section then describes the totally digital approach to the formulation land (and implementation) of the tracking property.

2 SYSTEM DESCRIPTION: TIME INVARIANT SYSTEMS

The purpose of the section is twofold: first, to define the systems to which the tracking properties will be assigned, and then to define the control algorithms that will force the systems to exhibit the desired tracking properties. It has been discovered that the systems can exhibit the desired tracking quality only if they possess certain physical and functional properties, the "trackability" property mentioned before and described further below. A system may be said to "allow" a controller to force it to exhibit tracking if it is "trackable." If a system is not trackable, the system cannot be guaranteed to track the desired output.

There are several different methods for describing systems of differential equations. In the following discussion an extensive list is provided that spans the more restrictive to the more general methods of describing systems of differential equations. Each of the descriptions has its own mathematical requirements. The more general methods of describing systems of differential equations encompass the more restrictive methods; however, the more restrictive methods may usually be more succinctly presented. In this vein, the following sections describe a manner in which a system of differential equations can be written; then the tracking control algorithms are given using specific system properties that make the system naturally trackable; and last implementation-oriented sections are presented for certain specific controllers as examples.

2.1 LINEAR INPUT-OUTPUT DIFFERENTIAL EQUATION FORM

An input-output form for representing differential equations is one in which the output of the system and its derivatives are directly modeled. Input-output modeling may result from the representation of the physics of the problem in differential form. For example, the motion of an object in space may be described by its position, velocity, and acceleration. As acceleration is the derivative of velocity, and velocity is the derivative of position, the position x of this system may be described by the following (linear) equation with the forcing function u:

$$\frac{d^2x}{dt^2} + a_1 \frac{dx}{dt} + a_0 x = b_0 u$$

with $\{a_1, a_0, b_0\} \subset \Re$, i.e. $a_1, a_0, b_0$ are real numbers.

2.1.1 SYSTEMS DESCRIPTION

A generalized linear differential equation may be written for n variables in a more restrictive case as:

$$\sum_{k=0}^{\nu} A_k y^{(k)}(t) = B_0 u(t) + \sum_{k=0}^{\rho} D_k d^{(k)}(t), \text{ where } y^{(k)}(t) = d^k y(t)/dt^k, A_\nu \neq 0 \quad (1)$$

or more generally:

$$\sum_{k=0}^{\nu} A_k y^{(k)}(t) = \sum_{k=0}^{\eta} B_k u^{(k)}(t) + \sum_{k=0}^{\rho} D_k d^{(k)}(t), \quad (2)$$

$$A_\nu \neq 0, \text{ and } 0 \leq \eta \leq \nu.$$

In these equations the matrices $A_k$, $B_k$, and $D_k$ describe the n-scalar differential equations for n-variables $(y_1, y_2, \ldots, y_n)$, $y = [y_1\ y_2 \ldots y_n]^T$ with $u = [u_1\ u_2 \ldots u_r]^T$ as a control (vector function) with $\nu \geq \eta$ (i.e. more than or equal the number of derivatives in y than in u), and where $0 < n \leq r < +\infty$ (at least as many controls as outputs).

An example of the more restrictive set of equations for $n = 2 = r$ (the same number of controls as outputs), $\nu = 2$ (second order differential equation), $\eta = 0$ (no derivatives of the control vector), and $\rho = 0$ (no derivatives of the disturbance vector) is $$A_2 y^{(2)} + A_1 y^{(1)} + A_0 y = B_0 u + D_0 d \quad (\text{ex 1})$$

$$A_2 = \begin{bmatrix} 1.0 & 2.0 \\ 0.0 & 1.0 \end{bmatrix} A_1 = \begin{bmatrix} -1.0 & -2.0 \\ -2.0 & -3.0 \end{bmatrix} A_0 = \begin{bmatrix} 2.0 & 5.0 \\ 3.0 & 4.0 \end{bmatrix}$$

$$B_0 = \begin{bmatrix} 1.0 & 3.0 \\ 5.0 & 7.0 \end{bmatrix} D_0 = \begin{bmatrix} 0.1 & -0.3 \\ 0.5 & -0.2 \end{bmatrix}$$

$$y^{(k)} = \begin{bmatrix} y_1^{(k)} \\ y_2^{(k)} \end{bmatrix} k = 0, 1, n = 2, y^{(0)} = \begin{bmatrix} y_1 \\ y_2 \end{bmatrix}$$

The transfer matrix function, $G_u(s)$, of the system (1) or (2), relates the input to the output y. It is usually defined by $$Y(s) = G_u(s) U(s) |_{d=0,\ Y(0)=0}$$

where U(s) is the Laplace transform of the input u, and Y(s) is the Laplace transform of the output y; d≡0 means that there are no external disturbances, and Y(0)≡0 means zero initial conditions.

The transfer matrix function $G_u(s)$ for the input-output description of systems, as in (1) and (2), is $$G_u(s) = \left( \sum_{k=0}^{\nu} A_k s^k \right)^{-1} B_0$$

for the restricted system (1), and $$G_u(s) = \left( \sum_{k=0}^{\nu} A_k s^k \right)^{-1} \left( \sum_{k=0}^{\eta} B_k s^k \right)$$

for the general case (2), when these are defined for almost all complex numbers $s \in C$.

$$\left( \sum_{k=0}^{\nu} A_k s^k \right)^{-1}$$

means the inverse of the matrix polynomial $$\left( \sum_{k=0}^{\nu} A_k s^k \right)$$

in the Laplace complex variable s with coefficients from $A_k$, k=0,1, . . . ,$\nu$. Similarly $$\left( \sum_{k=0}^{\eta} B_k s^k \right)$$

means the matrix polynomial comprised of powers of s multiplied by the matrix $B_k$, k=0,1, . . . ,$\eta$.

From our example (ex1), $$G_u(s) = \begin{bmatrix} \frac{-9s^2 + 7s - 21}{s^4 - s^2 + 6s - 7} & \frac{-11s^2 + 5s - 23}{s^4 - s^2 + 6s - 7} \\ \frac{5s^2 - 13s + 17}{s^4 - s^2 + 6s - 7} & \frac{7s^2 - 15s + 19}{s^4 - s^2 + 6s - 7} \end{bmatrix}.$$

For both methods (1) or (2) of describing linear input-output differential equations the following conditions are required:

Requirement 1

(a) The transfer matrix function $G_u(s)$ of the system (1) or (2) is well defined for almost all complex numbers s, (s∈C), $G_u(s) \neq 0$; and the rank [$G_u(s)$]=n for almost all s∈C.

(b) The matrix $$G_u(\infty) = \lim_{s \to \infty} [s^{\nu - \eta} G_u(s)]$$

has full rank, or rank $G_u(\infty)$=n.

Comment 1

Under Requirement 1a it follows that $$det\left[ \sum_{k=0}^{\nu} A_k s^k \right] \neq 0.$$

As applied to the system of (ex1), $$det\left[ \sum_{k=0}^{\nu} A_k s^k \right] =$$

$$\begin{bmatrix} s^2 - s + 2 & 2s^2 - 2s + 5 \\ -2s + 3 & s^2 - 3s + 4 \end{bmatrix} = s^4 - s^2 + 6s - 7 \neq 0$$

for almost all values of $s \in C$. Satisfying Requirement 1 assures that there is a uniquely defined solution to the system output y(t).

The next property leads to "natural control," as all information about the system's internal dynamics may be unknown:

Property 1 a) The matrices $A_k$, k=0,1 . . . ,$\nu$ may be completely unknown (the internal dynamics).

b) The matrices $B_k$, k=0,1, . . . ,$\eta$ are known (the input relationship).

c) The matrix $B_{72}$ has full rank (i.e. rank $B_\eta$=n, where n is the number of independent differential equations describing the system)

d) The matrices $D_k$, k=0,1, . . . ,$\rho$ may be completely unknown, and d can be completely unknown disturbances.

Comment 2

From Requirement 1b and Property 1c it follows that the matrix $A_\nu$, is nonsingular and is determined from $$A_\nu \left\{ \lim_{s \to \infty} [s^\nu G_u(s)] \right\} = B_0 \text{ for the system (1),} \quad (5)$$

$$A_\nu \left\{ \lim_{s \to \infty} [s^{\nu - \eta} G_u(s)] \right\} = B_\eta \text{ for the system (2).} \quad (6)$$

Comment 3.

Requirement 1a guarantees a) rank[$B_0$]=n for the system (1) or, b)

$$rank\left( \sum_{k=0}^{\eta} B_k s^k \right) = n$$

for the system (2) for almost all s ∈ C.

Requirement 2

The matrix $A_v$ is determined from (5) or (6), respectively if it is a priori unknown from (1) or (2).

Requirement 3

Either condition a) or b) below holds:

a) The matrix $$G_\infty = \lim_{s \to \infty} s^{v-\eta}[G_u(s) - G_u(\infty)]$$

is well defined and has full rank, rank $G_\infty = n$, or equivalently, there exists $W \in \Re^{r \times n}$ such that $\det(G_\infty W) \neq 0$.

b) The matrix $$G_0 = G_u(0) = \lim_{s \to 0} G_u(s),$$

is well defined and has full rank, rank $G_0 = n$, or equivalently, there exists $W \in \Re^{r \times n}$ such that $\det(G_0 W) \neq 0$.

2.1.2 TRACKING CONTROL ALGORITHMS

In sections 2.1.2 through 2.1.6, the digital equivalent of the tracking property $$T_d\left(e, e^{(1)}, \ldots, e^{(\gamma)}, \int_0^t e d\tau\right) = \qquad (7)$$

$$\left\{\begin{array}{l} T(k-1), t \quad [(k-1)T_s, kT_s) \\ T(k), t \in [kT_s, (k+1)T_s) \end{array}\right\}, \gamma \in (1, 2, \ldots, h).$$

For linear input-output differential equation forms of systems we define $$V = f(W(\cdot), G_u(\cdot)) \qquad (8)$$

in the tracking control algorithms below. V defines a scaling assignment between the different input-output channels. Additionally we require that the internal control variable w(t) is formed from the just previously calculated $w(t-\epsilon)$ for $\epsilon$ time delay as:

$$w(t) = \mu w(t-\epsilon) + VT\left(e, \ldots e^{(\gamma)}, \int_0^t e d\tau\right), \qquad (9a)$$

$$\gamma \in (1, 2, \ldots, h),$$

or for its digital equivalent, $$w(t) = \mu w(t-\epsilon) + VT_d\left(e, \ldots e^{(\gamma)}, \int_0^t e d\tau\right), \qquad (9b)$$

$$\gamma \in (1, 2, \ldots, h)$$

each with a linear gain $\mu$, $$\mu \in (0,1], \mu >> 0 \qquad (10)$$

which determines the extent of the near-unity positive feedback in (9a) or (9b). Note that if $\mu = 1$ then the control may be referred to as "natural control," and corresponds to unit positive feedback in the controller itself. If the gain is less than one, but very close to one, the control may be referred to as "high-gain natural control," where the gain k may be defined as $$k = (1-\mu)^{-1} \qquad (11)$$

In equations (9a) and (9b) there is a time delay $\epsilon$ in the feedback of the just-previously-realized value (or values) due to the finite speed of the continuous-time or discrete-time realization of (9a) or (9b). This time delay may be expressed by $$\epsilon \in [0,1), \epsilon << 1 \qquad (12)$$

where $\epsilon$ is substantially less than one. If $\epsilon = 0$ or $\epsilon = 0+$ (i.e., $\epsilon$ positive but so near to zero as to be negligible) and $\mu = 1$, then we may speak of the "ideal case," because the time delay in the positive feedback is completely ignored.

Finally, the controller's output u, that will be the controlling input in (1) or (2), is defined by the solution to (13):

$$\sum_{k=0}^{\eta} B_k u^{(k)}(t) = w(t). \qquad (13)$$

This equation must be solved for the controller output u(t). For example, in (ex1) since $$B_0 = \begin{bmatrix} 1.0 & 3.0 \\ 5.0 & 7.0 \end{bmatrix}, \text{ then}$$

$$u(t) = B_0^{-1} w(t)$$

$$\begin{bmatrix} u_1(t) \\ u_2(t) \end{bmatrix} = \begin{bmatrix} 1.0 & 3.0 \\ 5.0 & 7.0 \end{bmatrix}^{-1} \begin{bmatrix} w_1(t) \\ w_2(t) \end{bmatrix} =$$

$$\frac{-1}{8} \begin{bmatrix} 7.0 & -3.0 \\ -5.0 & 1.0 \end{bmatrix} \begin{bmatrix} w_1(t) \\ w_2(t) \end{bmatrix}$$

Higher derivatives contained in (13) require that a filter with feedback be defined by the solution to (13). For example, if $B_1 u^{(1)}(t) + B_0 u(t) = w(t)$, then $u^{(1)}(t) = B_1^{-1}(-B_0 u(t) + w(t))$ would be integrated to give u(t). A two dimensional example follows:

If $B_1 u^{(1)}(t) + B_0 u(t) = w(t)$, or for example, $$\begin{bmatrix} 1.0 & -2.0 \\ 0.0 & 1.0 \end{bmatrix} \begin{bmatrix} u_1^{(1)}(t) \\ u_2^{(1)}(t) \end{bmatrix} + \begin{bmatrix} 1.0 & 2.0 \\ 3.0 & 4.0 \end{bmatrix} \begin{bmatrix} u_1(t) \\ u_2(t) \end{bmatrix} = \begin{bmatrix} w_1(t) \\ w_2(t) \end{bmatrix}$$

then $$\begin{bmatrix} u_1^{(1)}(t) \\ u_2^{(1)}(t) \end{bmatrix} =$$

-continued $$\begin{bmatrix} 1.0 & -2.0 \\ 0.0 & 1.0 \end{bmatrix}^{-1} \left( \begin{bmatrix} -1.0 & -2.0 \\ -3.0 & -4.0 \end{bmatrix} \begin{bmatrix} u_1(t) \\ u_2(t) \end{bmatrix} + \begin{bmatrix} w_1(t) \\ w_2(t) \end{bmatrix} \right)$$

and finally $u^{(1)}(t)$ is integrated to determine $u(t)$:

$$\begin{bmatrix} w_1(t) \\ w_2(t) \end{bmatrix} = \begin{bmatrix} \int_0^t u_1^{(1)}(\tau)d\tau \\ \int_0^t u_2^{(1)}(\tau)d\tau \end{bmatrix}.$$

This process is itself a feedback loop within the controller.

The subcases below may be summarized as follows:

There is some real, positive $\delta$ such that every zero of $f_e(s;\mu,\epsilon)=\text{num det}[I(1-\mu e^{-\epsilon s})+G_u(s)V(s)T(s)]=0$ has its real part less than $-\delta$ for $V(s)$ to be determined and for:

a) $\mu=1$, $\epsilon=0$ (the ideal case), or
b) $\mu=1$, $0<\epsilon<<1$ (a real case with infinite gain and $\epsilon$-delay), or
c) $0<<\mu<1$, $\epsilon=0$ (a real case, high-gain and no delay), or
d) $0<<\mu<1$, $0<\epsilon<<1$ (a real case, high-gain with $\epsilon$-delay).

The polynomial $f_e(s;\mu,\epsilon)$ is the accurate characteristic polynomial of the closed-loop feedback control system. Its first approximation with respect to $\epsilon$ is the polynomial $f_{ea}(s;\mu,\epsilon)$ which is significantly easier to evaluate as:

$$f_{ea}(s;\mu,\epsilon)=\text{num det}[I(1-\mu+\epsilon s)+G_u(s)V(s)T(s)].$$

Every zero of $f_{ea}(s;\mu,\epsilon)=\text{num det}[I(1-\mu+\epsilon s)+G_u(s)V(s)T(s)]=0$ has negative real parts for $V(s)$ to be determined and for:

a) $\mu=1$, $\epsilon=0$ (the ideal case), or
b) $\mu=1$, $0<\epsilon<<1$ (a real case with infinite gain and $\epsilon$-delay), or
c) $0<<\mu<1$, $\epsilon=0$ (a real case, high-gain and no delay), or
d) $0<<\mu<1$, $0<\epsilon<<1$ (a real case, high-gain with $\epsilon$-delay).

Comment 4 a) If $r>n$ and rank $G_\infty=n$ or equivalently $\det(G_\infty G_\infty^T)\neq 0$ then we can set $W=G_\infty^T$, i.e. $W=(A_\nu^{-1}B_\eta)^T$.
b) If $r>n$ and rank $G_\infty<n$ or equivalently $\det(G_\infty\tilde{W})=0$ for every $\tilde{W}\in\Re^{r\times n}$, but rank $G_0=n$ or equivalently $\det(G_0G_0^T)\neq 0$, then we can set $W=G_0^T$, i.e. $W=(A_0^{-1}B_0)^T$.
c) If $r=n$ and $\det(G_\infty)\neq 0$, then we can set $W=I$.
d) If $r=n$, $\det(G_\infty)=0$, and $\det(G_0)\neq 0$, then we can set $W=I$.

Comment 5.

In case all the matrices $A_k$, $k=0,1,\ldots,\nu$ and $B_k$, $k=0,1,\ldots,\eta$, are known, then we can determine $G_u(s)$, $G_0$, $G_u(\infty)$, $G_\infty$ as follows:

$$G_u(s) = \left( \sum_{k=0}^{\nu} A_k s^k \right)^{-1} \left( \sum_{k=0}^{\eta} B_k s^k \right)$$

$G_0=A_0^{-1}B_0$, $\det A_0\neq 0$ $G_u(\infty)=A_\nu^{-1}B_\nu$, $\det A_\nu\neq 0$; $G_u(\infty)=0$ if and only if $\eta<\nu$, (i.e, $B_\nu=0$)

$G_\infty=A_\nu^{-1}B_\eta$, $\det A_\nu\neq 0$

2.1.3 NATURAL TRACKING CONTROL: IDEAL CASE, LINEAR INPUT-OUTPUT SYSTEMS

In the ideal case there is such a small time delay $\epsilon$ in the positive feedback of the just-previously-calculated $w(t)$ that the delay approaches zero, and there is unit positive feedback of this variable inside the controller; these two criteria are represented by $$\epsilon=0^+, \text{ and } \mu=1 \tag{14}$$

so that $t-\epsilon=t-0^+=t^-$. Therefore, using (9) and (14), $w$ is redefined with $w(t^-)=w(t-0^+)$ as $$w(t) = w(t^-) + VT\left(e, \ldots e^{(\gamma)}, \int_0^t ed\tau\right), \gamma\in\{1,2,\ldots,h\} \tag{15a}$$

or for the digital implementation case with $\epsilon$ time delay ($\epsilon<<1$)

$$w(t) = w(t-\epsilon) + VT_d\left(e, \ldots e^{(\gamma)}, \int_0^t ed\tau\right), \gamma\in\{1,2,\ldots,h\} \tag{15b}$$

where a) $V=W(G_0W)^{-1}$ if, and only if, rank $G_0=n$, rank $G_\infty<n$ and $\det(G_0W)\neq 0$
b) $V=W(G_\infty W)^{-1}$ if, and only if, rank $G_\infty=n$ and $\det(G_\infty W)\neq 0$ These two equations (15) define the ideal case for natural tracking control. Note that the ideal case is the case which, in the past, had been assumed to exist for classically defined controllers with minimal time delay in all variables fed back via negative feedback loops.

2.1.4 NATURAL TRACKING CONTROL: REAL CASE, LINEAR INPUT-OUTPUT SYSTEMS

The ideal case discussed in the previous section may be technically infeasible because of the finite length of signal paths outside (primarily wire lengths) or inside (signal paths and time delay for digital systems) controllers. This case is characterized by a time delay in adding the just-previously-calculated $w(t)$ to the new $w(t)$ in the controller. There is still unity feedback of this just-previously-realized variable, so that the feedback gain $\mu$ and the delay $\epsilon$ are defined by $$1>>\epsilon>0 \text{ and } \mu=1. \tag{16}$$

Hence w is redefined with this new time delay $\epsilon > 0+$ in the continuous time case by $$w(t) = w(t - \epsilon) + VT\left(e, \ldots e^{(\gamma)}, \int_0^t e d\tau\right), \gamma \in \{1, 2, \ldots, h\} \quad (17a)$$

or in the discrete-time case $$w(t) = w(t - \epsilon) + VT_d\left(e, \ldots e^{(\gamma)}, \int_0^t e d\tau\right), \gamma \in \{1, 2, \ldots, h\} \quad (17b)$$

In this real case of natural tracking control there is an additional requirement, mathematically stated as:

Requirement 4

There exists a positive real number $\delta$ such that the real part of every zero (root) of $F_e(s; \epsilon) = \det[I(1 - \mu e^{-\epsilon s}) + G_u(s)V(s)T(s)] = 0$ is less than $-\delta$. It can be shown that $$\sum_{k=0}^{\nu} A_k s^k \text{ and } \sum_{k=0}^{\eta} B_k s^k$$

are known, this condition is equivalent to every zero of $$f_e(s; \epsilon) = \det\left[(1 - \mu e^{-\epsilon s}) \sum_{k=0}^{\nu} A_k s^k + \sum_{k=0}^{\eta} B_k s^k VT(s)\right] = 0$$

having a negative real part less than $-\delta$.

Note

The preceding condition is an exact, sufficient condition for stability of the system (1) or (2) with a feedback controller and $\epsilon$ time delay in the feedback loop. It is also, unfortunately, infinite-dimensional. It may be simplified by the following first approximation:

Approximate Requirement 5

Every zero (root) of $F_{ea}(s; \epsilon) = \det[I \epsilon s + G_u(s)VT(s)] = 0$ has negative real part, or equivalently, with $$\sum_{k=0}^{\nu} A_k s^k \text{ and } \sum_{k=0}^{\eta} B_k s^k$$

known, every root of $$f_{ea}(s; \epsilon) = \det\left[\epsilon s \sum_{k=0}^{\eta} A_k s^k + \sum_{k=0}^{\eta} B_k s^k VT(s)\right] = 0$$

has a negative real part.

Approximate Requirement 5 is the first order approximation of Requirement 4 based on the expansion $(1 - e^{-\epsilon s}) \approx \epsilon s$. If $\epsilon$ is small, then $$\epsilon s \sum_{k=0}^{\eta} A_k s^i \approx 0,$$

which means that the internal dynamics of system (1) or (2) are canceled out during natural tracking control. For example, if $$A_2 y^{(2)} + A_1 y^{(1)} + A_0 y = B_0 u + D_0 d \quad (ex2)$$

$$A_2 = \begin{bmatrix} 1.0 & 0.2 \\ 0.0 & 0.5 \end{bmatrix} A_1 = \begin{bmatrix} 3.0 & 1.0 \\ 0.0 & 3.0 \end{bmatrix} A_0 = \begin{bmatrix} 2.0 & 5.0 \\ 3.0 & 4.0 \end{bmatrix}$$

$$B_0 = \begin{bmatrix} 1.0 & 3.0 \\ 5.0 & 7.0 \end{bmatrix} D_0 = \begin{bmatrix} 0.1 & 0.3 \\ 0.1 & -0.5 \end{bmatrix}$$

and the tracking property chosen is PID with $$K_1 = \begin{bmatrix} 2.0 & 0.0 \\ 0.0 & 2.0 \end{bmatrix} K_0 = \begin{bmatrix} 1.0 & 0.0 \\ 0.0 & 1.0 \end{bmatrix} K_I = \begin{bmatrix} 1.0 & 0.0 \\ 0.0 & 1.0 \end{bmatrix}$$

then Requirement 4 would be (for $\epsilon = 1.0 \times 10^{-6}$)

$$\det\left[\epsilon s \sum_{k=0}^{\nu} A_k s^k + \sum_{k=0}^{\eta} B_k s^k VT(s)\right] = 0,$$

$$\left| s \epsilon \begin{bmatrix} (s^2 + 3s + 2) & (0.2s^2 + s + 5) \\ (3) & (0.5s^2 + 3s + 4) \end{bmatrix} + \begin{bmatrix} 1.0 & 3.0 \\ 5.0 & 7.0 \end{bmatrix} \begin{bmatrix} 1.0 & 0.2 \\ 0.0 & 0.5 \end{bmatrix} \begin{bmatrix} \frac{(s^2 + 2s + 1)}{s} & 0 \\ 0 & \frac{(s^2 + 2s + 1)}{s} \end{bmatrix} \right| = 0$$

This may be rewritten as $$\left| s^2 \epsilon \begin{bmatrix} (s^2 + 3s + 2) & (0.2s^2 + s + 5) \\ (3) & (0.5s^2 + 3s + 4) \end{bmatrix} + \begin{bmatrix} 1.0 & 3.0 \\ 5.0 & 7.0 \end{bmatrix} \begin{bmatrix} 1.0 & 0.2 \\ 0.0 & 0.5 \end{bmatrix} \begin{bmatrix} (s^2 + 2s + 1) & 0 \\ 0 & (s^2 + 2s + 1) \end{bmatrix} \right| = 0$$

whose eight zeros (roots) are $s \approx \{(-2. \pm 3000j), (-0.5 \pm 1000j), (-1. \pm \sim 0j), (-1), (-1)\}$. The real part of each of these roots is negative. If we set $\epsilon = 0$, then there are only four roots and all are exactly equal to $(-1)$. Therefore, the combination of the tracking property (PID), the original system $(A_2, A_1, A_0)$ to control, and the choice of $\epsilon$ (time delay) will track any desired output while rejecting the effects of external disturbances.

Requirement 4 could also be verified via the Huriwitz test or Routh test, or by other methods known in the art for determining the stability of linear systems.

Figure 16:
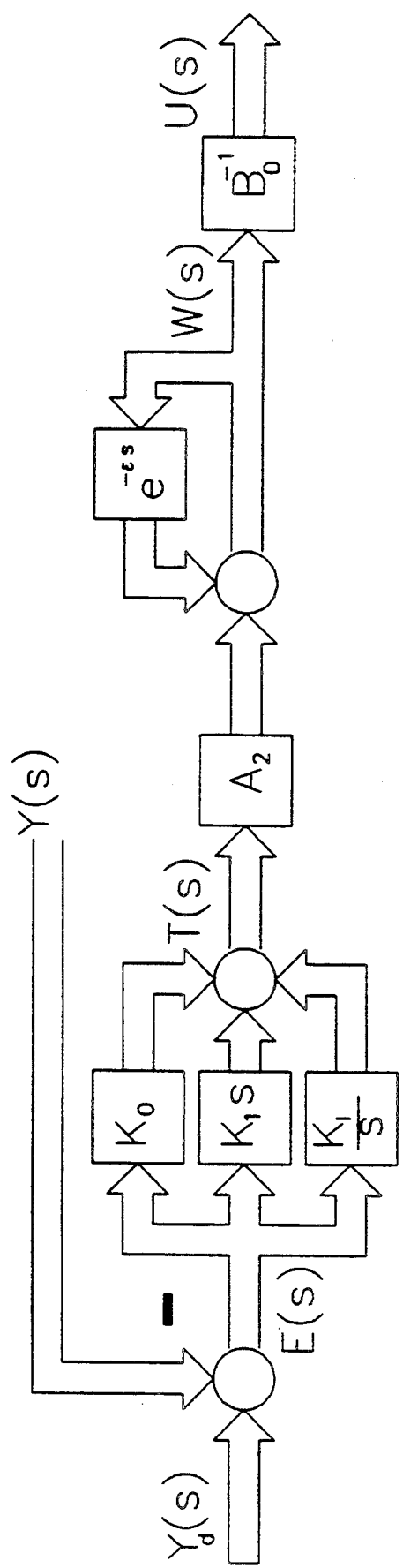
FIG. 16 illustrates a complete natural tracking controller for an input-output differential equation form of a tracking property.

Simulation of a Linear Input-Output System with a PD Natural Tracking Controller A complete natural tracking controller for an input-output differential equation for the system of ex2 is illustrated in FIG. 16. The tracking property is PID, and is formed from a scaled gain of the tracking error, a scaled derivative of the tracking error, a scaled integral of the tracking error, and $T(s)=[K_0+K_1 s+K_2/s]$. The tracking property is multiplied (or scaled) by the gain $A_2$, which is known for this system's properties because $G_{28}=A_2^{-1}B_0$ and $V=G_\infty^{-1}$ in this case, so that $V=B_0^{-1}A_2$.

The controller variable $W(s)=W(s)e^{-\epsilon s}+B_0^{-1}A_2T(s)$ is shown in the unit positive feedback of the variable $W(s)$ through the time delay $e^{-\epsilon s}$ (where $\epsilon$ is the time delay), in combination with the product $B_0^{-1}A_2T(s)$. The output Of the controller $U(s)$ is formed from the product $U(s)=B_0^{-1}W(s)$. The control variable $U(s)$ is then fed to the system to be controlled as in eq. (1) or (2) in section 2.1.1.1.

Figure 17:
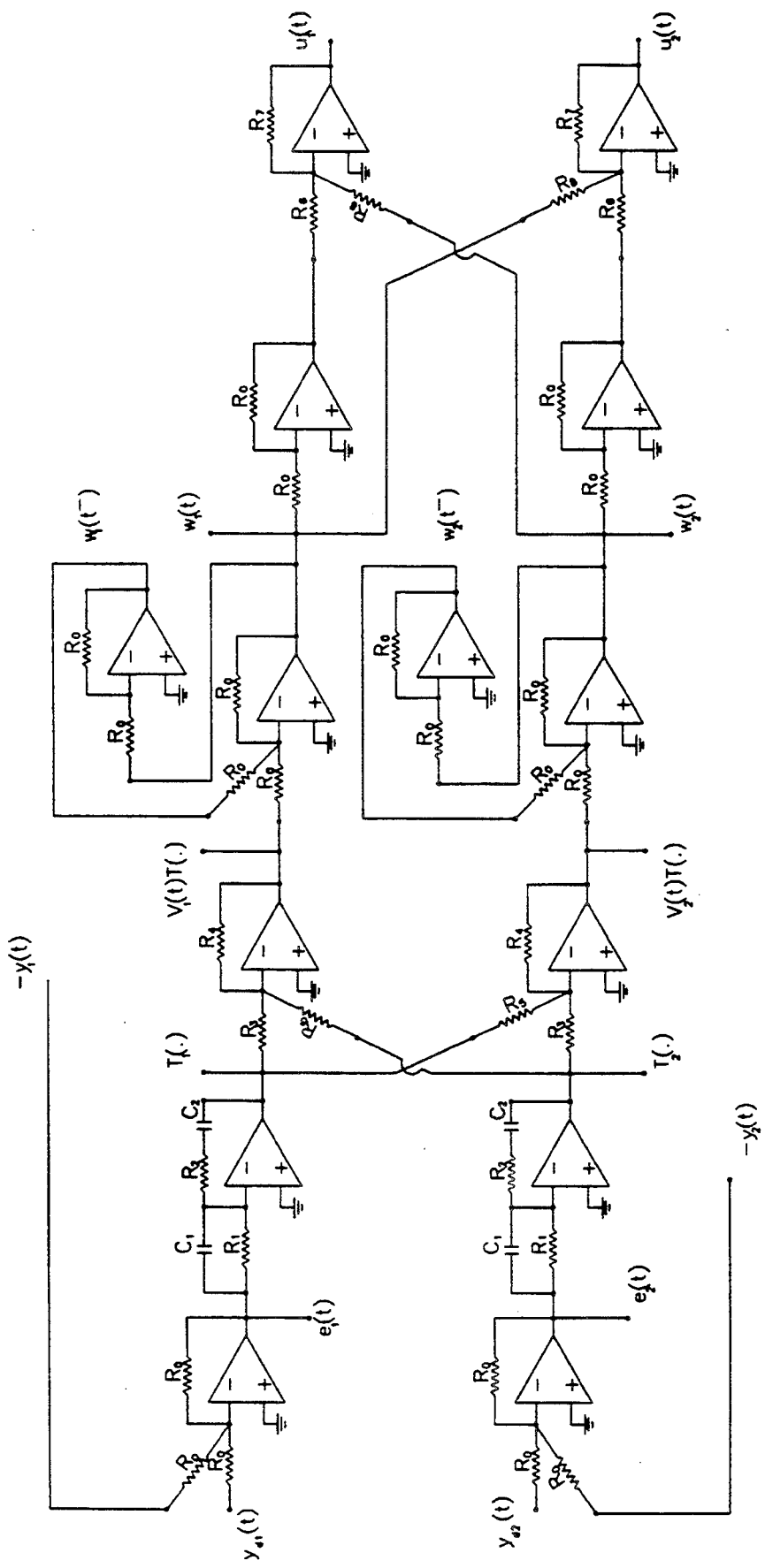
FIG. 17 illustrates an implementation of a complete natural tracking controller for an input-output, PID form of a tracking property.

An op amp implementation is illustrated in FIG. 17. The tracking errors $e_1(t)$ and $e_2(t)$ were created as before. The PID tracking property may be implemented by op amps with a capacitor $C_1$ in parallel to resistor $R_1$. The Laplace transform of the PID function in op amp form is $$T(s) = \frac{(R_1 C_1 s + 1)(R_2 C_2 s + 1)}{R_1 C_2 s}.$$

Resistors $R_1$ and $R_2$ may be chosen to limit the current in the op amps, and then $C_1$, $C_2$, $R_2$ and $R_1$ are chosen to implement the particular PID tracking property. Since in this example $T(s)=(s^2+2s+1)/s$, if $R_1$ is chosen to be $10k\Omega$, then $C_2=100~\mu F$ and $R_1 C_1=1.0$ sec. Thus $R_2 C_1$ must equal 1 sec., and $R_1 C_1+R_2 C_2$ must equal 2 sec. In fact, if $R_2 C_1=R_1 C_2=1.0$ sec, then the condition is satisfied if $R_1=R_2=10k\Omega$ and $C_1=C_2=100~\mu F$.

The multiplication of the tracking property $T(.)$ by $B_0^{-1}A_2$ is performed by scalar addition in a summing (inverting) amplifier with resistor values $R_3$, $R_4$, and $R_5$. Since the entries in matrix $A_2$ in this example are all non-negative, their summation does not require any inversion of voltages. The values of $R_3$, $R_4$, and $R_5$ may be chosen to limit the current in the op amps, and to scale the inputs appropriately. For example, if $R_4=10$ k$\Omega$, then since $A_{21,1}=1.0$, and $A_{21,2}=0.2$ (the row, column entries in $A_2$), the other two resistors for the upper op amp would be given by $R_3/R_4=1.0$, $R_3/R_5=0.2$ or $R_4=10$ k$\Omega$ and $R_5=50$ k$\Omega$.

The unit positive feedback of the controller variable $w_i(t)$, $i=1, 2$ is implemented by two inverting op amps, one to sum the voltages $V_i(t)T_i(t)$, $i=1, 2$ with the just-previously-created $w_i(t-\epsilon)$, $i=1,2$, and one to form the voltage $w_i(t-\epsilon)$, $i=1, 2$, from $w_i(t)$, $i==1, 2$. Since inverting operational amplifiers are shown in this implementation, the second op amp inverts the voltage $-w_i(t)$, $i=1, 2$ in order to form the unit positive feedback of this variable.

Finally the scaling of $w(t)$ by $B_0^{-1}$ to form $u(t)$ is performed by resistors $R_6$, $R_7$, and $R_8$. Since the diagonal entries in the example matrix $B_0^{-1}$ are negative, and the off-diagonal entries are positive, the off-diagonal entries are inverted in sign prior to the summation. Similar to determining the values of the summing resistors for $B_0^{-1}A_2$ as above, if $R_7=10$ k$\Omega$, then $R_6 \simeq 11.4$ k$\Omega$ and $R_8 \simeq 26.6$ k$\Omega$ for the upper circuit, forming $u_1(t)=B_{01,1}^{-1}w_1(t)+B_{01,1}^{-1}w_2(t)$.

Figure 18:
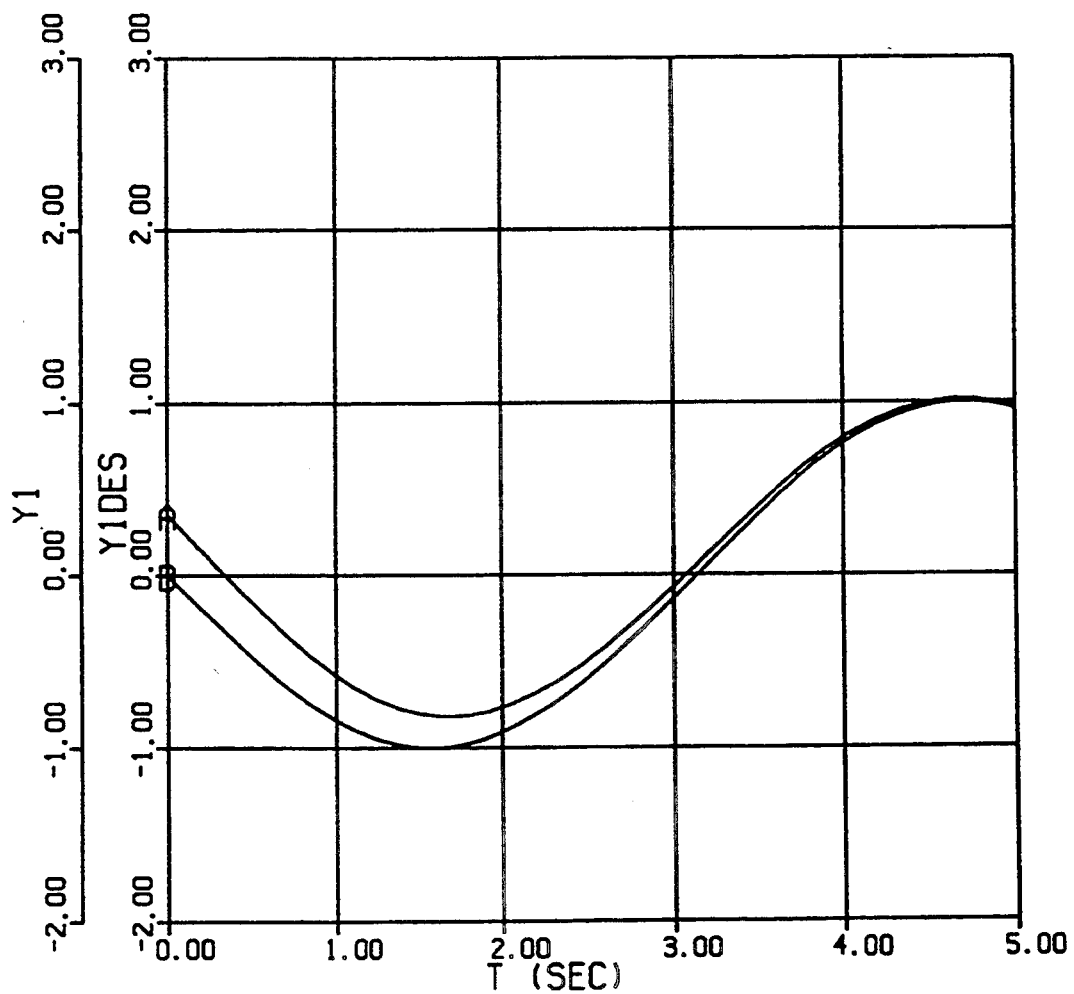
FIG. 18 illustrates the convergence of an actual output to a desired output for a complete natural tracking controller.
Figure 19:
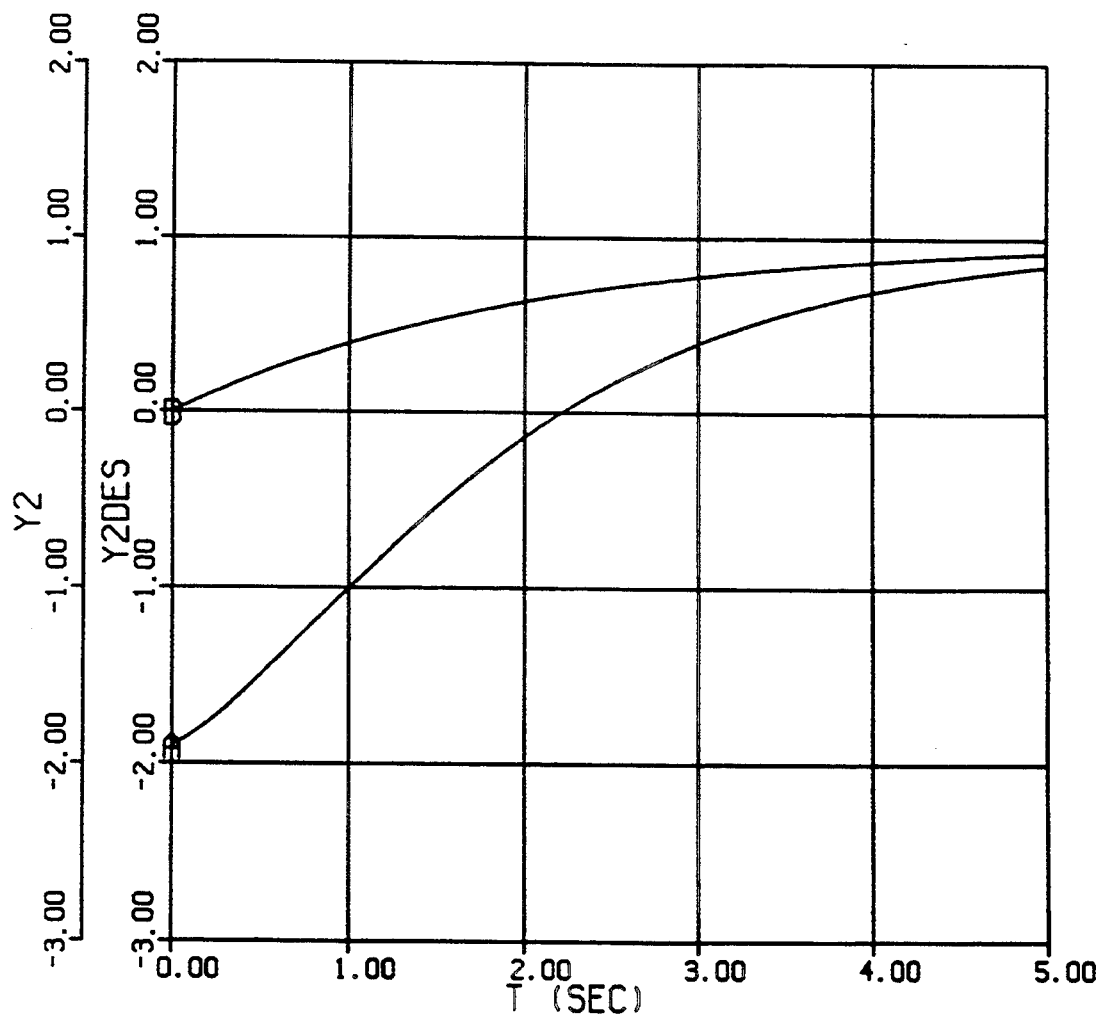
FIG. 19 illustrates the convergence of an actual output to a desired output for a complete natural tracking controller.

A simulation of the input-output system of (ex2) with a PID natural tracking controller is illustrated in FIGS. 18 and 19. Exponential convergence is again seen.

2.1.5 HIGH-GAIN NATURAL TRACKING CONTROL, LINEAR INPUT-OUTPUT SYSTEMS

In the high-gain natural tracking control case, the unity feedback gain is replaced by a gain near one, which also results in a classically defined "high gain" (11). Formally these changes are:

$$\epsilon=0^+, 0<<\mu<1, 1<<k<\infty. \tag{18}$$

With these changes the natural tracking control becomes:

$$w(t) = \mu w(t^-) + VT\left(e, \ldots e^{(\gamma)}, \int_0^t e\, d\tau\right), \gamma \in \{1, 2, \ldots, n\} \tag{19a}$$

or for the discrete-time case:

$$w(t) = \mu w(t^-) + VT_d\left(e, \ldots e^{(\gamma)}, \int_0^t e\, d\tau\right), \gamma \in \{1, 2, \ldots, n\} \tag{19b}$$

or for the two classically described high-gain cases:

$$w(t) = kVT\left(e, \ldots e^{(\gamma)}, \int_0^t e\, d\tau\right), \gamma \in \{1, 2, \ldots, n\} \tag{20a}$$

and $$w(t) = kVT_d\left(e, \ldots e^{(\gamma)}, \int_0^t e\, d\tau\right), \gamma \in \{1, 2, \ldots, n\} \tag{20b}$$

There is a new requirement for the high-gain natural tracking control system, a requirement similar to Requirement 4 for the real case:

Requirement 6

The function T is such that for sufficiently high k, the real parts of all the zeros of $F_e(s;k)=\det[Ik^{-1}+G_u(s)VT(s)]=0$ are negative. Or equivalently, all the zeros of $$f_e(s;k) = \det\left[k^{-1}\sum_{k=0}^{\nu}A_k s^k + \sum_{k=0}^{\eta}B_k s^k VT(s)\right] = 0$$

Requirement 6 may be evaluated in a manner similar to the method described for Requirement 5 above.

2.1.6 REAL HIGH-GAIN NATURAL TRACKING CONTROL

The real, high gain case of natural tracking control is similar to section 2.1.1.5 above, but with $0<<\mu<1$, and $0<\epsilon<<1$ (a real case, high-gain with $\epsilon$-delay). In this case, $\det[I(1-\mu+\epsilon s)+G_u(s)V(s)T(s)]=0$ may be substituted for Requirement 5.

2.2 LINEAR STATE-SPACE EQUATION FORM

The input-output form used above for describing systems of differential equations is not the only way to describe systems. The "state-space" representation lends itself to the use of linear algebra (for linear systems), and to a compact notation in which the dynamics of the system are separate from the algebraic expressions for the output. The focus of such a description has historically been to study the stability and control of a set of first-order differential equations which describe the "states" of the system. The states of a system are non-uniquely defined as a smallest set of (mutually) linearly independent variables, such that knowledge of the initial values of these variables, together with knowledge of the inputs completely describes the dynamics of the system. The state variables may not necessarily be physical variables, but can be mathematical variables bearing no immediately apparent relation to the actual system, except as they determine the output of the system. Because the state equations are first-order differential equations, there may be $N=\nu n$ state variables required to describe a particular system, where $\nu$ is the number of derivatives used to describe the physical system in n-variables. The following sections set forth the requirements for such a system of N-variables to be naturally trackable, and the control algorithms to force these systems to track.

2.2.1 SYSTEMS DESCRIPTION

Linear state-space systems by definition have a set of N state variables whose dynamics are described by N first-order linear differential equations. The system description may be separated into two parts, one for the dynamics of the state variables, the other for the algebraic description of the outputs. In the following these equations are formally described for linear systems.

A general method of describing a set of N state variables is $$x^{(1)} = Ax + Bu + Dd \quad (1a)$$

where x is an $N \times 1$-dimensional vector of state variables $x = (x_1 x_2 \ldots x_N)^T$ whose derivatives are $x^{(1)} = (x_1^{(1)} x_2^{(1)} \ldots x_N^{(1)})^T$. The state matrix A is an $N \times N$ matrix with known or unknown elements (which are constant for a time-invariant system), $A \in \Re^{N \times N}$; the input matrix B is an $N \times r$ matrix of known or unknown coefficients, $B \in \Re^{N \times r}$, and the state disturbance matrix D is an $N \times p$ matrix of known or unknown entries, $D \in \Re^{N \times p}$. Thus, there are N states, r controls and p disturbances in the state equations with $1 \leq n \leq r \leq N < +\infty$. The algebraic output equation of the system is $$y = Cx + Eu + Fd \quad (1b)$$

where y is an $n \times 1$-dimensional vector of outputs, $y = (y_1 y_2 \ldots y_n)^T$, C is an $n \times N$ matrix, $C^{n \times N}$, E is an $n \times r$ matrix, $E \in \Re^{n \times r}$, and F is an $n \times p$ matrix, $F \in \Re^{n \times p}$.

The transfer matrix function $G_u(s)$ of the system (1) with respect to the control u is determined by:

$$Y(s) = G_u(s)U(s)|_{d=0,\ Y(0)=0} \quad (2)$$

where U(s) is the Laplace transform of the input u, and Y(s) is the Laplace transform of the output y; $d \equiv 0$ means that there are no external disturbances, and $Y(0) \equiv 0$ means zero initial conditions. If, and only if, $G_u(s)$ is well defined, then $$G_u(s) = C(sI-A)^{-1}B + E. \quad (3)$$

An example of a state-space system for two states, $N=2$; two controls, $r=2$; two outputs, $n=2$; and two disturbances, $p=2$; in the form of (1a) and (1b) is $$A = \begin{bmatrix} 0.0 & 1.0 \\ 4.0 & 2.0 \end{bmatrix} B = \begin{bmatrix} 1.0 & 2.0 \\ 1.0 & 0.0 \end{bmatrix} C = \begin{bmatrix} 1.0 & 2.0 \\ 2.0 & 0.0 \end{bmatrix} \quad (\text{ex1})$$

$$D = \begin{bmatrix} 1.2 & 0.85 \\ -0.65 & 1.6 \end{bmatrix} x(0) = \begin{bmatrix} 1.9 \\ 0.6 \end{bmatrix}$$

$$E = \begin{bmatrix} 1.0 & 0.0 \\ 0.0 & 1.0 \end{bmatrix} F = \begin{bmatrix} 0.0 & 0.0 \\ 0.0 & 0.0 \end{bmatrix}$$

If the number of controls is greater than the number of outputs $(r>n)$, then the outputs may be (formally) augmented by additional (perhaps "dummy") outputs; however, if the number of outputs is greater than the number of controls, for natural tracking control additional inputs must be sought so that r is at least as great as n.

In the following discussion, r (the number of controls) may be greater than n (the number of outputs), without augmentation of the number of outputs. Additional requirements for naturally trackable systems follow:

Requirement 1

The transfer matrix function $G_u(s)$ of the system (1) is well-defined and completely known, $G_u(s) \neq 0$ and $$\text{rank } [G_u(s)] = n \text{ for almost all } s \in C. \quad (4)$$

Comment 1 a) Well-defined $G_u(s)$ means that for every complex number s, except perhaps for a finite set of complex numbers s, every entry of $G_u(s)$ has a complex value. It further implies:

$$\det(sI-A) \neq 0.$$

b) Condition (4) means that $G_u(s)$ has full rank except, perhaps, for a finite set of complex numbers s.

c) Notice that for the system (1) obeying Requirement 1:

$$G_u(s) = [C(sI-A)^{-1}B + E].$$

which is useful in case the matrices A, B, C and E are well-defined and known.

From (ex 1) one can form this n×n matrix in the Laplace variable s, representing the transfer of the inputs u to the outputs y as $Y(s) = G_u(s)U(s)$. The transfer matrix function for this particular example is, $$G_u(s) = [C(sI-A)^{-1}B + E]$$

$$G_u(s) = \left[ \begin{pmatrix} 1.0 & 2.0 \\ 2.0 & 0.0 \end{pmatrix} \begin{pmatrix} s & -1.0 \\ -4.0 & s-2 \end{pmatrix}^{-1} \begin{pmatrix} 1.0 & 2.0 \\ 1.0 & 0.0 \end{pmatrix} + \begin{pmatrix} 1.0 & 0.0 \\ 0.0 & 1.0 \end{pmatrix} \right]$$

whose determinant is $$det[G_u(s)] = \begin{vmatrix} \frac{s^2 + s + 3}{s^2 - 2s - 4} & \frac{2s + 12}{s^2 - 2s - 4} \\ \frac{2s - 2}{s^2 - 2s - 4} & \frac{s^2 + 2s - 12}{s^2 - 2s - 4} \end{vmatrix}$$

Since $G_u(s)$ in this example is a square n×n matrix, Requirement (1) reduces to $detG_u(s) \neq 0$, so, $det[G_u(s)]$ 0 by inspection.

An advantage of natural tracking control over other control methods is that only a relatively small number of requirements and properties need be defined for the system's output to track the desired output. The goal of natural tracking control is to track with minimum knowledge of the internal dynamics of the system or of the effects of the disturbances. More formally, natural tracking control requires or allows the following useful properties:

Property 1
a) The matrices A, B, C, D, E and F can be completely unknown (from Requirement (1) in (1); i.e., there is no need for knowledge of the internal dynamics, or of disturbance actions on the system.
b) The state vector can be elementwise unmeasurable and unknown.
c) The disturbance vector d can be unmeasurable and unknown. An additional requirement is:

Requirement 2
Either condition a) or b) below must hold:
a) The matrix $$G_\infty = \lim_{s \to \infty} s[G_u(s) - G_u(\infty)],$$

is well defined and is such that there exists a matrix $W \in \Re^{r \times n}$ for which $det(G_\infty W) \neq 0$ has full rank, or equivalently rank $G_\infty = n$.
b) The matrix $$G_0 = \lim_{s \to 0} [G_u(s)]$$

is well defined and is such that there exists a matrix $W \in \Re^{r \times n}$, for which $det(G_0 W) \neq 0$, or equivalently, rank $G_0 = n$.

Comment 2
Requirement 1 and requirement 2 imply (respectively):
a)

$$(CB) = G_\infty = \lim_{s \to \infty} s[G_u(s) - G_u(\infty)], \ det[(CB)W] \neq 0$$

or equivalently rank$G_\infty$ = rank{CB} = n.
b)

$$(E - CA^{-1}B) = G_0 = \lim_{s \to 0} [G_u(s)], \ det[(E - CA^{-1}B)W] \neq 0$$

or equivalently rank$G_\infty$ = rank {E−CA$^{-1}$B} = n.

Comment 3
a) If r>n and rank $G_\infty = n$ or equivalently $det(G_\infty G_\infty^T) \neq 0$ then we can set $W = G_\infty^T$, i.e. $W = (CB)^T$.
b) If r>n and rank $G_\infty < n$, or equivalently $det(G_\infty \widetilde{W}) = 0$ for every $\widetilde{W} \in \Re^{r \times n}$; but rank $G_0 = n$ or equivalently $det(G_0 G^T) \neq 0$, then we can set $W = G_0^T$, i.e. $W = (E - CA^{-1}B)^T$.
c) If r=n and $det(G_\infty) \neq 0$, then we can set W=I.
d) If r=n, $det(G_\infty) = 0$, and $det(G_0) \neq 0$, then we can set W=I.

For the example of (ex1) the rank of $G_\infty$ is determined as:

$$det(G_\infty) = det(CB) = \left| \begin{bmatrix} 1.0 & 2.0 \\ 2.0 & 0.0 \end{bmatrix} \begin{bmatrix} 1.0 & 2.0 \\ 1.0 & 0.0 \end{bmatrix} \right| = 8.0 \neq 0$$

Hence rank $G_\infty$ = rank CB = 2 = n. So from Comment 3c we can set W=I, or similarly we can determine the rank of $G_0$ by $$det(G_0) = det[E - CA^{-1}B] = -0.75 \neq 0$$

Hence rank $G_0$ = rank(E−CA$^{-1}$B) = 2 = n, so from Comment 3d we can also set W=I.

2.2.2 TRACKING CONTROL ALGORITHMS
For linear state-space differential forms we define
$V \equiv W(G_0 W)^{-1}$ if and only if rank $G_\infty < n$ and $det(G_0 W) \neq 0$, and rank $G_0 = n$, (5a)
or
$V = V(s) \uparrow W \equiv [sG_u(\infty) + G_\infty]W\}^{-1}$ if and only if rank $G_\infty = n$ and $det(G_\infty W) \neq 0$, (i.e. rank $G_\infty = n$), and $det(G_0 \widetilde{W}) = 0$ for every $\widetilde{W} \in \Re^{r \times n}$, (i.e. rank $G_0 < n$). (5b)

Comment 4
In case the matrices A, B, C, and E are known then we can use them to determine $G_0$, $G_u(\infty)$, and $G_\infty$:

$$G_0 = E - CA^{-1}B, \ det(A) \neq 0$$

$$G_u(\infty) = \lim_{s \to \infty} G_u(s) = E$$

and $G_{28} = CB$.

As an example we shall take the following system (ex2), and determine V for this specific case. The system is described by:

$$A = \begin{bmatrix} 0.0 & -1.0 \\ 4.0 & -2.0 \end{bmatrix} B = \begin{bmatrix} 1.0 & 2.0 \\ 1.0 & 0.0 \end{bmatrix} \quad \text{(ex2)}$$

$$C = \begin{bmatrix} 1.0 & 2.0 \\ 2.0 & 0.0 \end{bmatrix} E = \begin{bmatrix} 1.0 & 0.3 \\ 0.2 & 1.0 \end{bmatrix}$$

Therefore, $$G_\infty = CB = \begin{bmatrix} 3.0 & 2.0 \\ 2.0 & 4.0 \end{bmatrix}$$

whose determinant is $\det(G_\infty) = 8 \neq 0$ and $$G_0 = E - CA^{-1}B = \begin{bmatrix} 3.25 & 5.30 \\ 0.70 & 3.00 \end{bmatrix}$$

whose determinant $\det(G_0) = \det(E - CA^{-1}B) = 6.04 \neq 0$. Since r=n (same number of controls as outputs), from comment 3c we can set W=I and similarly from comment 3d we can also set W=I, so that our tracking function V may be $$V = G_0 = (E - CA^{-1}B)^{-1} =$$

$$\begin{bmatrix} 3.25 & 5.30 \\ 0.700 & 3.00 \end{bmatrix}^{-1} = \begin{bmatrix} 0.497 & -0.878 \\ -0.116 & 0.538 \end{bmatrix}$$

and $$V(s) = [sG_u(\infty) + G_\infty]^{-1} = (Es + CB)^{-1} =$$

$$\begin{bmatrix} \dfrac{s+4}{0.94s^2 + 6s + 8} & \dfrac{-(0.3s + 2)}{0.94s^2 + 6s + 8} \\ \dfrac{-(0.2s + 2)}{0.94s^2 + 6s + 8} & \dfrac{s+3}{0.94s^2 + 6s + 8} \end{bmatrix}$$

with $\det[sG_u(\infty) + G_\infty] = \det(Es + CB) \neq 0$ because $G_\infty = CB$ is nonsingular. However, we note that $V(s) = (Es + CB)^{-1}$ is the condition that must be used from (5b), since rank $G_\infty = n = 2$. Thus (5a) does not apply, and also W=I from comment 3c.

As in previous sections, with V or V(s) specific for state-space systems, the inner positive feedback portion of the natural tracking control is as follows, first for the continuous time case:

$$w(t) = \mu w(t - \epsilon) + VT\left(e, \ldots e^{(\gamma)}, \int_0^t e d\tau\right), \gamma \in \{1, 2, \ldots, h\}, \quad (6a)$$

then for the discrete time case:

$$w(t) = \quad (6b)$$

$$\mu w(t - \epsilon) + VT_d\left(e, \ldots e^{(\gamma)}, \int_0^t e d\tau\right), \gamma \in \{1, 2, \ldots, h\},$$

with $\mu$ defined for the ideal, real, high-gain, and real high-gain cases as $$\mu \in (0,1], \mu >> 0 \quad (7)$$

$$k = (1-\mu)^{-1} \quad (8)$$

and the time delay for the real cases for natural and high-gain tracking control, $$\epsilon \in [0,1), \epsilon << 1. \quad (9)$$

Note that for linear state-space systems u(t)=w(t), which is assumed for the ideal, real, high-gain, and real high-gain cases below.

The subcases below may be summarized as follows: There is some real, positive $\delta$ such that the real part of every zero of $F_e(s;\mu,\epsilon) = \det[I(1-\mu e^{-\epsilon s}) + G_u(s)VT(s)] = 0$ is less than $-\delta$ for V(s) to be determined and for:

a) $\mu=1$, $\epsilon=0$ (the ideal case), or
b) $\mu=1$, $0 < \epsilon << 1$ (a real case with infinite gain and $\epsilon$-delay), or
c) $0 << \mu < 1$, $\epsilon=0$ (a real case, high-gain and no delay), or
d) $0 << \mu < 1$, $0 < \epsilon << 1$ (a real case, high-gain with $\epsilon$-delay).

The polynomial $F_e(s;\mu,\epsilon)$ is the accurate characteristic polynomial of the closed-loop feedback control system. Its first approximation with respect to $\epsilon$ is the polynomial $f_{ea}(s;\mu,\epsilon)$ which are the numerator polynomials of $F_e(s;\mu,\epsilon) = \det[I(1-\mu e^{\epsilon s}) + G_u(s)VT(s)]$ and of $F_{ea}(s;\mu,\epsilon) = \det[I(1-\mu+\epsilon s) + G_u(s)VT(s)]$ respectively. It is significantly easier to evaluate $f_{ea}(s;\mu,\epsilon)$ as:

Every zero of $f_{ea}(s;\mu,\epsilon) = \text{num det}[I(1-\mu+\epsilon s) + G_u(s)VT(s)] = 0$ has negative real parts for V(s) to be determined and for:

a) $\mu=1$, $\epsilon=0$ (the ideal case), or
b) $\mu=1$, $0 < \epsilon << 1$ (a real case with infinite gain and $\epsilon$-delay), or
c) $0 << \mu < 1$, $\epsilon=0$ (a real case, high-gain and no delay), or
d) $0 << \mu < 1$, $0 < \epsilon << 1$ (a real case, high-gain with $\epsilon$-delay).

2.2.3 NATURAL TRACKING CONTROL: IDEAL CASE

There are no further restrictions on the system in the ideal case. See section 2.1.3 for the criteria in such a case.

2.2.4 NATURAL TRACKING CONTROL: REAL CASE

As in previous sections discussing the real case, there may be a small, nonzero delay in the unity feedback of the just-previously-calculated control variable w(t−). There is therefore an additional requirement on the system, similar to the requirement for linear input-output systems.

Requirement 3

There is a real, positive δ such that the real part of every zero of $F_e(s;\epsilon) = \det[I(1-e^{-\epsilon s}) + G_u(s)V(s)T(s)] = 0$ is less than $-\delta$. Equivalently, if A, B, C, and E are known, then the real part of every zero of $f_e(s;\epsilon) = \det\{I(1-\mu e^{-\epsilon s}) \det(sI-A) + [C \text{ adj}(sI-A)B + E \det(sI-A)]V(s)T(s)\} = 0$ is less than $-\delta$.

As in the input-output system description, Requirement 3 is infinite-dimensional, so an approximate method is:

Approximate Requirement 4

Every zero of $F_{ea}(s;\epsilon) = \det[I\epsilon s + G_u(s)VT(s)] = 0$ has a negative real part. Requirement 3 is exact, and Requirement 4 presents an approximate condition for the real case. Equivalently, if A, B, C, and E known, every zero of $f_{ea}(s;\epsilon) = \det\{I\epsilon s \det(sI-A) + [C \text{ adj}(sI-A)B + E\det(sI-A)]V(s)T(s)\} = 0$, has negative real parts.

For example, the zeros for the naturally trackable system with the following A, B, C, and E are found as follows:

$$A = \begin{bmatrix} 0.0 & -1.0 \\ 4.0 & -2.0 \end{bmatrix} B = \begin{bmatrix} 1.0 & 2.0 \\ 1.0 & 0.0 \end{bmatrix} C = \begin{bmatrix} 1.0 & 2.0 \\ 2.0 & 0.0 \end{bmatrix} E = \begin{bmatrix} 1.0 & 0.3 \\ 0.2 & 1.0 \end{bmatrix}$$ (ex2)

For a PD controller, with $K_1$ and $K_0$, then $$(K_1 s + K_0) = \begin{bmatrix} (s+1) & 0.0 \\ 0.0 & (s+1) \end{bmatrix}$$

which is chosen to match the desired tracking property. Then a system described by (ex2), for $$\epsilon = 1.0 \times 10^{-6} \det [I\epsilon s \det(sI - A) + [C \text{ adj}(sI - A)B + E \det(sI - A)]V(s)(K_1 s + K_0)] =$$

$$\left| \epsilon s \begin{bmatrix} (0.94s^4 + 7.88s^3 + 23.76s^2 + 40.0s + 32.0) & 0.0 \\ 0.0 & (0.94^4 + 7.88s^3 + 23.76s^2 + 40.0s + 32.0) \end{bmatrix} \right|$$

whose roots of may be calculated to be $s = \{(-1.0 \times 10^{-6}), (-1.00 \times 10^{-6}), (-4.19 \pm 0.00j), (-3.83 \pm 0.00j), (-1.00 \pm 0.00j), (-1.00 \pm 0.00j)\}$ Note that the real part of each of these roots is negative, and that Requirement 4 therefore is fulfilled.

Figure 20:
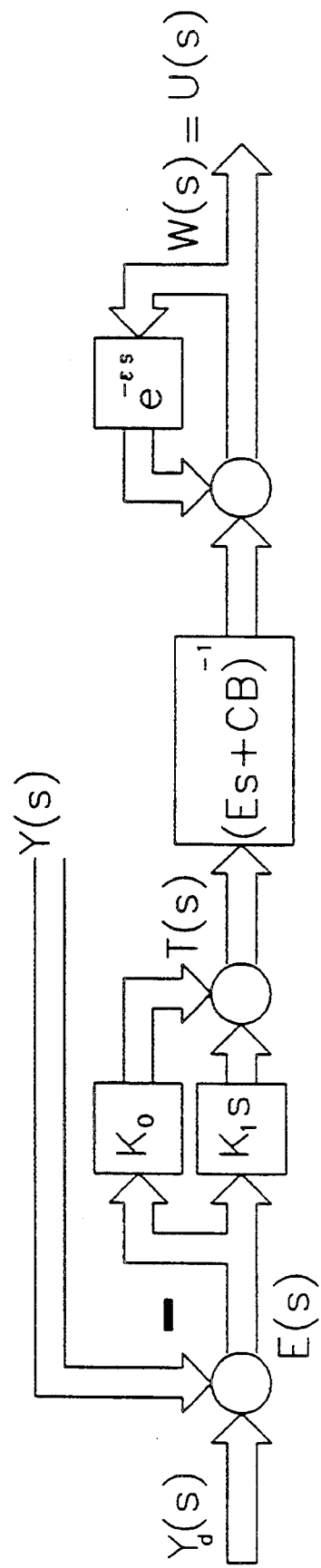
FIG. 20 illustrates a natural tracking controller for a state-space system.

Simulation of a linear, state-space system with a PD natural tracking controller The natural tracking controller for the example state-space system is illustrated in FIG. 20. The Laplace transform of the tracking error, E(s), is formed in the usual way at a summing junction by $E(s) = Y_d(s) - Y(s)$. The tracking property T(s) is PD, and is formed as before. The function V(s), which multiplies the tracking property, in this case is $V(s) = [sG_u(\infty) + G_\infty]^{-1} = (Es+CB)^{-1}$, where E and CB are specific to the system. This function V(s) defines a dynamic gain as seen in section 2.2.2 for (ex2). The control variable W(s) is formed analogously to that for the input-output case by the summation of the product V(s)T(s) with $W(s)e^{-\epsilon s}$ as $W(s) = W(s)e^{-\epsilon s} + V(s)T(s)$. Finally, since $U(s) = W(s)$ in the linear state-space case, the control variable U(s) has already been formed and may be sent directly to the system to be controlled.

Figure 21:
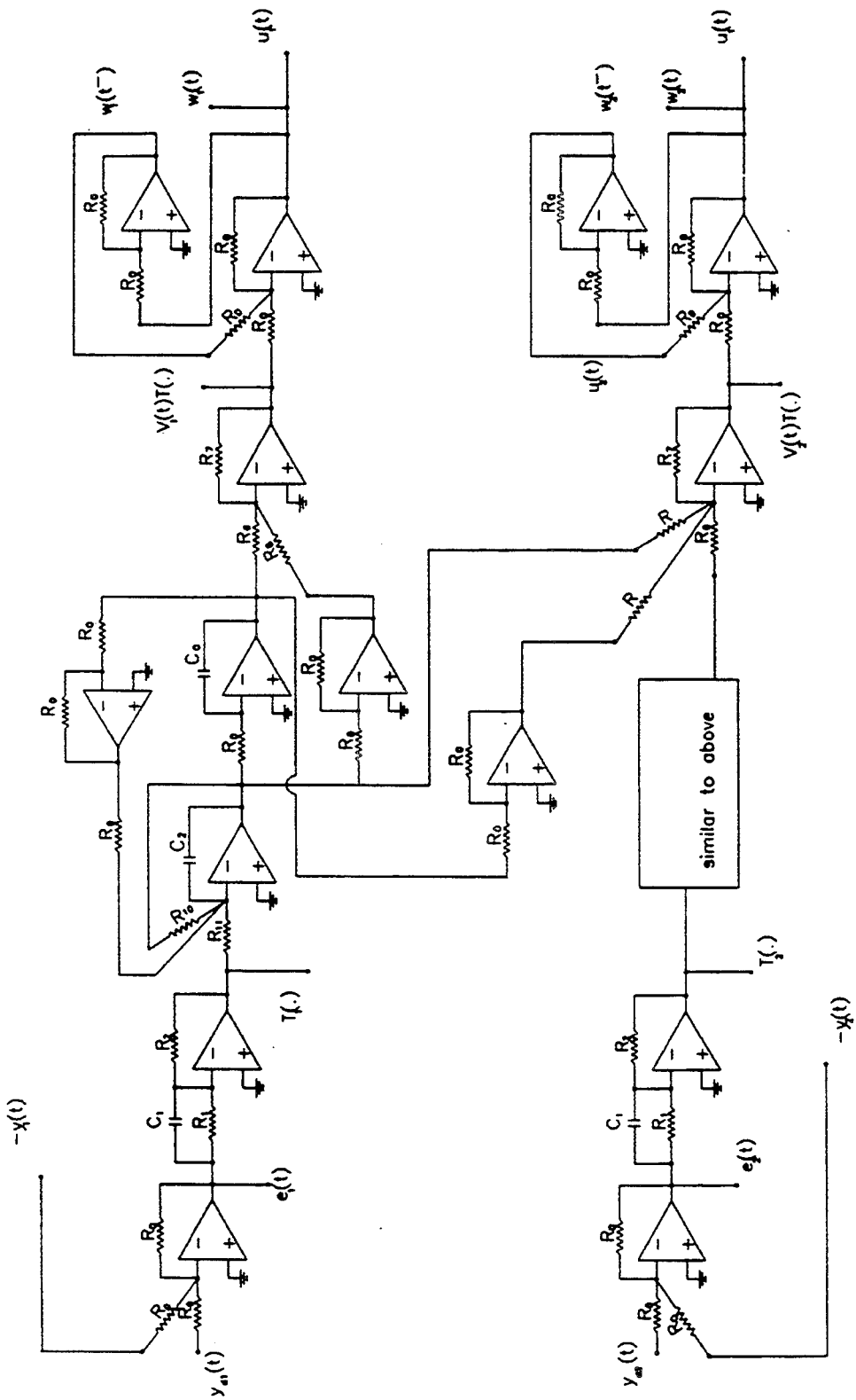
FIG. 21 illustrates an implementation of a natural tracking controller for a linear state-space system.

An operational amplifier implementation of the PD natural tracking controller for this linear, state-space example is illustrated in FIG. 21. As in previous examples, the tracking errors $e_i(t)$, i = 1, 2, and the PD tracking property $T_i(t)$ may be formed by appropriate choices of resistors and capacitors.

Since the function V(s) is a second order transfer matrix function dynamic, a second-order dynamic filter may be used to form portions of V(s) from two integrating op amps with feedback of the filters' own states. Since the denominators of the entries of the function $V(s) = [sE + CB]^{-1}$ are the same for each component, only two filters are required to alter the signals dynamically. This filter may be implemented, for example, by the well known "control canonical form" (See G. F. Franklin et al., Feedback Control of Dynamic Systems, Addison-Wesley, 1991, p. 100), which significantly reduces the number of dynamic components of the filters for this multiple variable V(s). The resistors and capacitors for these filters may be chosen from industry practices. Finally, the control variable $w_i(t)$, i = 1, 2, is created with op amps as in the input-output case, using two op amps for each $w_i$. The output of these op amps is identically $u_i(t)$, i = 1, 2, for this linear state-space example.

Figure 22:
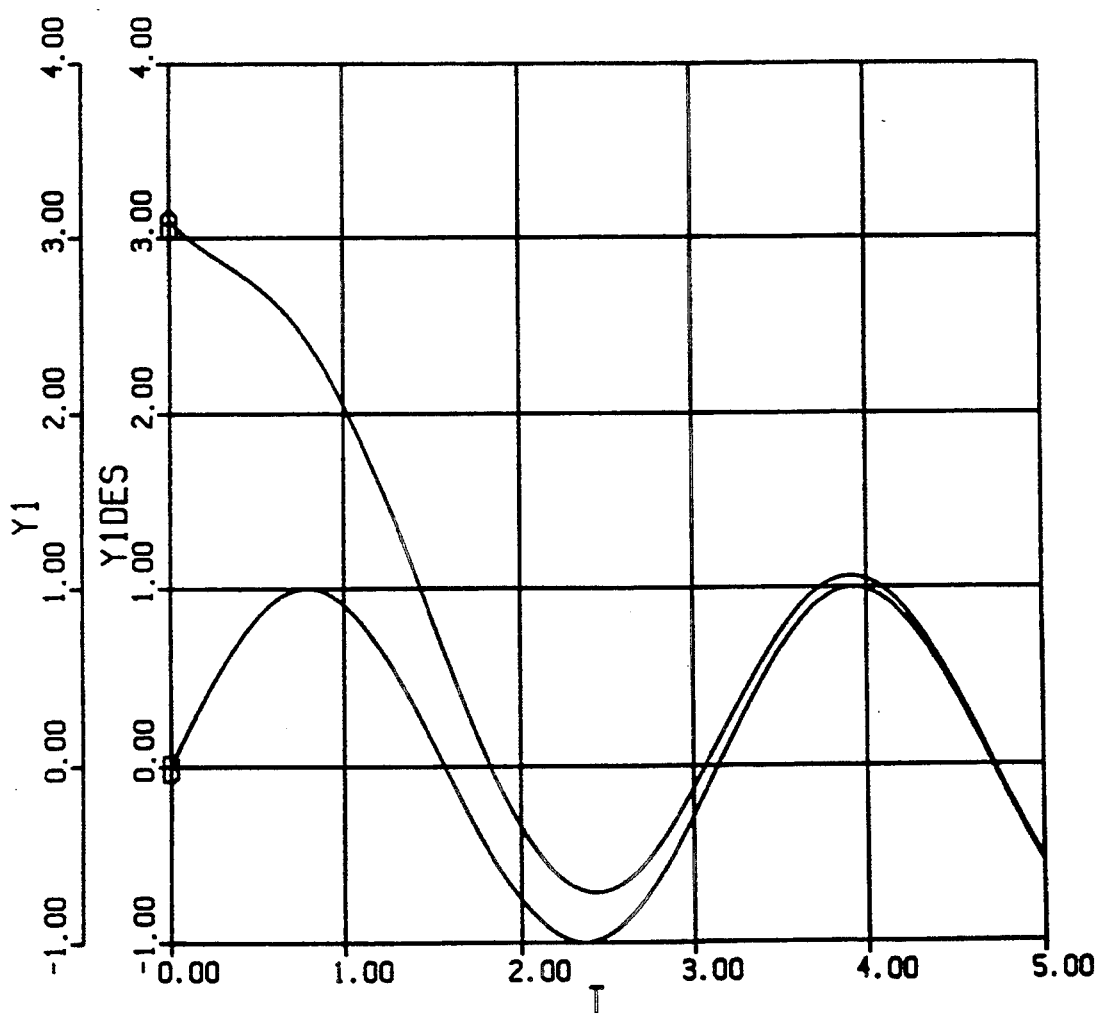
FIG. 22 illustrates the convergence of an actual output to a desired output for a state-space system.
Figure 23:
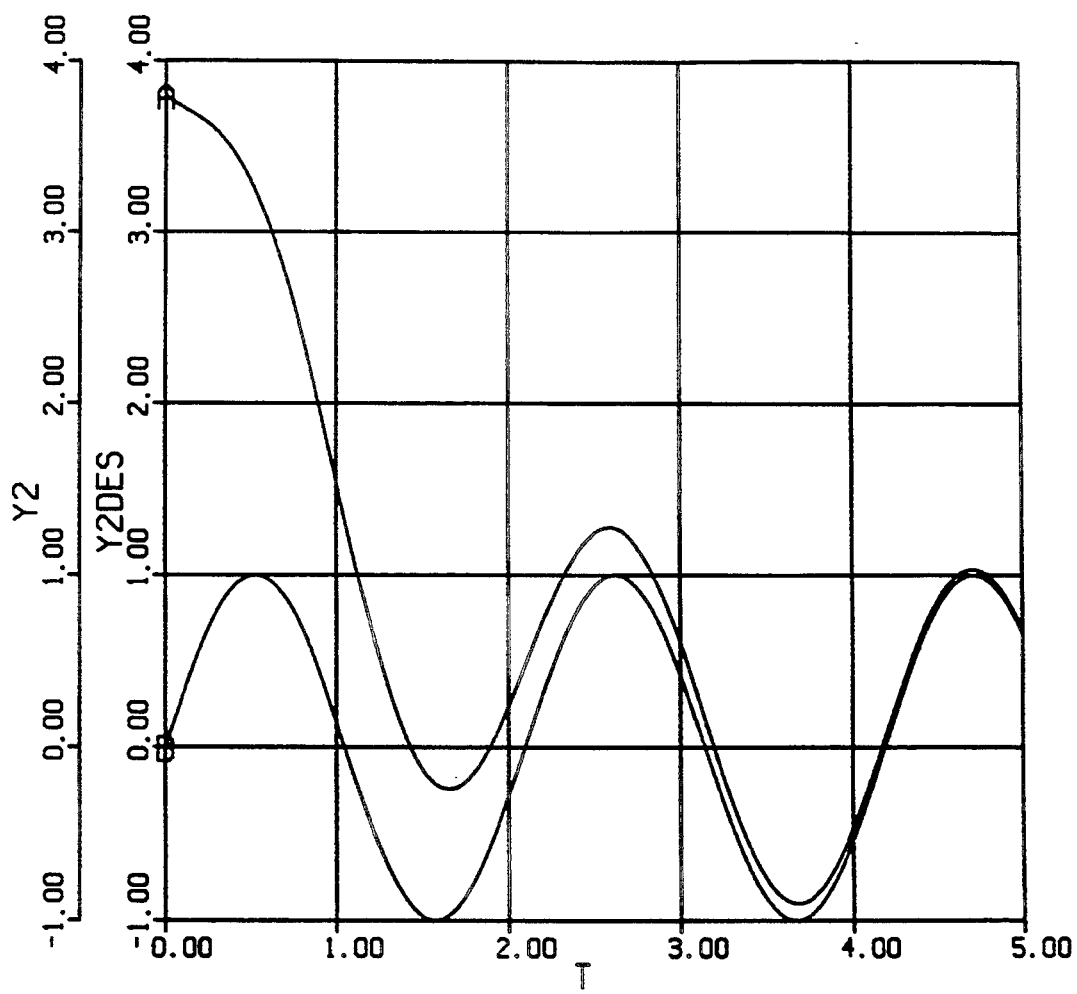
FIG. 23 illustrates the convergence of an actual output to a desired output for a state-space system.

A simulation of the linear state-space example (ex2) is shown in FIGS. 22 and 23. The output $y_1(t)$ (labelled A) in FIG. 22 exponentially tracks the desired output $y_{d1}(t) = \sin(2t)$ (labelled B). Similarly, the output $y_2(t)$ in FIG. 23 exponentially tracks the desired output $y_{d2}(t) = \sin(3t)$. These outputs smoothly and exponentially converge to their respective desired outputs, as the tracking errors are exponentially reduced to zero.

2.2.5 HIGH-GAIN NATURAL TRACKING CONTROL

Similar to requirement in section 2.1.5 for the high-gain case of linear input-output natural tracking control, there is also a new requirement for the high-gain state-space natural tracking system. This new requirement incorporates the use of the high-gain parameter k as:

Requirement 5

For sufficiently high-gain k, every zero of $F_e(s;k) = \det[Ik^{-1} + G_u(s)VT(s)] = 0$ has a negative real part. Equivalently, if A, B, C, and E are known, every zero of $f_e(s;k)$ num $\det\{Ik^{-1} \det(sI-A) + [C \text{ adj}(sI-A)B + E \det(sI-A)]VT(s)\} = 0$ has negative real parts.

2.2.6 REAL HIGH-GAIN NATURAL TRACKING CONTROL

The real, high gain case of natural tracking control is similar to section 2.2.5 above, but with $0 < \mu < 1$, and $0 < \epsilon < 1$ (a real case, high-gain with $\epsilon$-delay).

2.3 LINEAR GENERAL (MIXED, COMBINED) EQUATION FORM

2.3.1 SYSTEMS DESCRIPTION $$A_\nu q^{(\nu)} + \sum_{k=0}^{\nu-1} A_k q^{(k)}(t) = \sum_{k=0}^{\eta} B_k u^{(k)}(t) + \sum_{k=0}^{\rho} D_k d^{(k)}(t), \eta \leq \nu, \quad (1a)$$

$$y = Cq + Eu + Fd. \quad (1b)$$

Note: If, and only if, the system transfer matrix function $G_u(s)$ is well defined for almost all complex numbers s, then $$G_u(s) = \left[ C \left( \sum_{k=0}^{\nu} A_k s^k \right)^{-1} \left( \sum_{k=0}^{\eta} B_k s^k \right) + E \right]$$

Requirement 1
(a) The system transfer matrix function $G_u(s)$ of the system (1) is well defined for almost all complex numbers s, $G_u(s) \neq 0$ and the rank$[G_u(s)] = n$ for almost all $s \in \mathbb{C}$. Either condition b) or c) below must hold:
(b) The matrix $$G_\infty = \lim_{s \to \infty} s^{\nu-\eta}[G_u(s) - G_u(\infty)]$$

has full rank: or rank $G_\infty = n$, or equivalently, there is $W \in \Re^{r \times n}$ such that $\det(G_{2\infty} W) \neq 0$.
(c) The matrix $$G_o = G_u(0) = \lim_{s \to \infty} G_u(s)$$

has full rank: rank $G_0 = n$, or equivalently there is a $W \in \Re^{r \times n}$ such that $\det(G_0 W) \neq 0$.
Notice that:

1) $CA_\nu^{-1} B_\eta = G_\infty = \lim_{s \to \infty} s^{\nu-\eta}[G_u(s) - G_u(\infty)].$ 2) $(CA_0^{-1} B_0 + E) = G_0 = G_u(0).$ Comment 1
(a) Under Requirement 1a it follows that $$\det \left[ \sum_{k=o}^{\nu} A_k s^k \right] \neq 0.$$

(b) Requirement 1b implies the following:

rank$(CA_\nu^{-1} B_\eta)$ = rank$\{G_\infty\} = n$ (full rank).

(c) Requirement 1c yields rank$(CA_0^{-1} B_0 + E)$ = rank $G_0 = n$ (full rank).

Property 1
a) The matrices $A_k$, $k=0,1 \ldots, \nu$ may be completely unknown (the internal dynamics).
b) The matrices $B_k$, $k=0,1, \ldots, \eta$ are known (the input relationship).
c) The matrix $B_\eta$ has full rank (i.e. rank $B_\eta = n$, where n is the number of independent differential equations describing the system)

d) The matrices C, $D_k$ (k=0,1, ..., $\rho$), E, and F may be unknown.
e) The q vector may be elementwise unmeasurable and unknown.
f) The disturbance vector d may be elementwise unmeasurable and unknown.

Comment 2
Requirement 1 and Property 1 show that we need only input-output data from the system, available from $G_u(s)$.

Comment 3
In case:
a) If $r > n$, rank $G_\infty = n$, and $\det(G_\infty G_\infty^T) \neq 0$ then we set $W = G_\infty^T$.
b) If $r > n$, rank $G_0 = n$, and $\det(G_0 G_0^T) \neq 0$ but rank $G_\infty < n$, i.e. $\det(G_\infty W) = 0$ for every $\tilde{W} \in \Re^{r \times n}$, (i.e. rank $G_\infty < n$) then we set $W = G_0^T$.
c) If $r = n$ and $\det(G_\infty) \neq 0$, then we set $W = I$.
d) If $r = n$, $\det(G_0) \neq 0$ and $\det(G_\infty) = 0$, then we set $W = I$.

Comment 4
In case all the matrices $A_k$(k=0,1, ..., $\nu$), and $B_k$(k=0,1, ..., $\mu$) are known, then we can determine $G_0$, $G_u(\infty)$, and $G_\infty$ as follows:

$$G_0 = CA_0^{-1} + E, \det A_0 \neq 0,$$

$$G_u(\infty) = CA_\nu^{-1} B_\nu + E, \det A_\nu \neq 0;$$

$$G_\infty = CA_\nu^{-1} B_\eta, \det A_\nu \neq 0.$$

2.3.2 TRACKING CONTROL ALGORITHMS

For general linear equation forms we further require either that $$V = W(G_0 W)^{-1} \text{ for rank } G_\infty < n, \text{ rank } G_0 = n, \text{ and } \det(G_0 W) \neq 0. \quad (7a)$$

or $$V = W(G_\infty W)^{-1} \text{ for rank } G_\infty = n \text{ and } \det(G_\infty W) \neq 0, \quad (7b)$$

As in previous sections, with V or V(s) for state-space systems, the inner positive feedback portion of the natural tracking control is as follows, first for the continuous time case:

$$w(t) = \mu w(t - \epsilon) + VT \left( e, \ldots e^{(\gamma)}, \int_0^t e d\tau \right), \gamma \in \{1, 2, \ldots, h\}, \quad (8a)$$

then for the discrete time case:

$$w(t) = \mu w(t - \epsilon) + VT_d \left( e, \ldots e^{(\gamma)}, \int_0^t e d\tau \right), \gamma \in \{1, 2, \ldots, h\}, \quad (8b)$$

with $\mu$ defined for the ideal, real, and high-gain cases as $$\mu \in (0,1], \mu >> 0 \quad (9)$$

$$k = (1-\mu)^{-1}. \quad (10)$$

and the time delay for the ideal and real cases for natural tracking control, $$\epsilon \in [0,1), \epsilon << 1. \quad (11)$$

Finally, the control variable to be sent to the system to be controlled is formed from the solution to (12):

$$\sum_{k=0}^{\eta} B_k u^{(k)}(t) = w(t) \quad (12)$$

The subcases below may be summarized as follows: There is some real, positive δ such that the real part of every zero of $F_e(s;\mu,\epsilon) = \det[I(1-\mu e^{\epsilon s}) + G_u(s)VT(s)] = 0$ is less than $-\delta$ for V(s) to be determined and for:

a) $\mu=1$, $\epsilon=0$ (the ideal case), or
b) $\mu=1$, $0<\epsilon<<1$ (a real case with infinite gain and ε-delay), or
c) $0<<\mu<1$, $\epsilon=0$ (a real case, high-gain and no delay), or
d) $0<<\mu<1$, $0<\epsilon<<1$ (a real case, high-gain with ε-delay).

The polynomial $f_e(s;\mu,\epsilon) = \text{num } F_e(s;\mu,\epsilon)$ is the accurate characteristic polynomial of the closed-loop feedback control system. A first approximation with respect to ε is the polynomial $f_{ea}(s;\mu,\epsilon) = \text{num } F_{ea}(s;\mu,\epsilon)$ which is significantly easier to evaluate from $F_{ea}(s;\mu,\epsilon) = \det[I(1-\mu-\epsilon s) + G_u(s)VT(s)]$ as:

Every zero of $f_{ea}(s;\mu,\epsilon)$ has negative real parts for V(s) to be determined and for:

a) $\mu=1$, $\epsilon=0$ (the ideal case), or
b) $\mu=1$, $0<\epsilon<<1$ (a real case with infinite gain and ε-delay), or
c) $0<<\mu<1$, $\epsilon=0$ (a real case, high-gain and no delay), or
d) $0<<\mu<1$, $0<\epsilon<<1$ (a real case, high-gain with ε-delay).

2.3.3 NATURAL TRACKING CONTROL: IDEAL CASE

For the ideal case for natural tracking control, see section 2.1.3 above.

2.3.4 NATURAL TRACKING CONTROL: REAL CASE

For the real case for natural tracking control, see section 2.1.4 above.

2.3.5 HIGH-GAIN NATURAL TRACKING CONTROL

For the high-gain case for natural tracking control, see section 2.1.5 above.

2.3.6 REAL HIGH-GAIN NATURAL TRACKING CONTROL

For the real high-gain case for natural tracking control, see section 2.1.6.

2.4 TRANSFER FUNCTION FORM OF LINEAR, TIME-INVARIANT, MINIMUM AND NON-MINIMUM PHASE SYSTEMS

2.4.1 SYSTEM DESCRIPTION

The transfer matrix function $G_u(s)$ of the system (1) with respect to the control u is determined by:

$$Y(S) = G_u(s)U(s)|_{d=0, Y(0)=0} \quad (65)$$

where U(S) is the Laplace transform of the input u, and Y(s) is the Laplace transform of the output y; d≡0 means that there are no external disturbances, and Y(0)≡0 means a zero initial condition.

Requirement 1

The transfer matrix function $G_u(s)$ of the system (with respect to control u) is well-defined and completely known, and satisfies both conditions a) and b):

a) $G_u(s) \not\equiv 0$
b) $\text{rank}[G_u(s)] = n$ (the dimension of the output y of the system) for almost all $s \in c$ An advantage of natural tracking control over other control methods is that only a relatively small number of requirements and properties need be defined. The goal of natural tracking control is to track with minimum knowledge of both the internal dynamics of the system and of the effects of disturbances. More formally, natural tracking control requires or allows the following useful properties:

Property 1 a) We do not need any mathematical model of the system.
b) We do not need any information about the internal dynamics of the system.
c) We do not need any information about the state of the system.
d) The dimension of the control vector (r), i.e. dim (u)=r, can be equal to or greater than the dimension of the output vector (n), i.e. dim (y)=n≦dim (u)=r, $0<n\leq r$.
e) We do not need any knowledge of the transfer function $G_d(s)$ with respect to the disturbance d(s).
f) We do not need any information about any the disturbance vector function d.
g) The system may be non-minimum phase (i.e., the real parts of the zeros of the numerator of $G_u(s)$ may be greater than or equal to zero).
h) The system need not be stable.

Requirement 2

Let $\xi \in (0,1,2,\ldots)$, and $Z_k \in \mathfrak{R}^{r \times n}$ be defined by:

$$Z(s) = \sum_{k=0}^{\xi} Z_k s^k$$

so that a) $\det[G_u(s)Z(s)] \not\equiv 0$ or equivalently in case P(s) is the numerator polynomial matrix of $G_u(s)$ and Δ(s) is the denominator scalar polynomial of $G_u(s)$, i.e. for $G_u(s) = P(s)/\Delta(s)$, $\Delta: c \rightarrow c$, $P: c \rightarrow c^{n \times r}$,
b) $\det[P(s)Z(s)] \not\equiv 0$ Requirement 3

Let w be a vector input to a filter, $w: \mathfrak{R} \rightarrow \mathfrak{R}^n$, and let the vector control signal u be the output of the filter. Then a matrix function $H: c \rightarrow c^{n \times n}$ is selected to satisfy the following conditions:

a) $\det H(s) \not\equiv 0$
b) The filter is defined by $U(s) = Z(s)[G_u(s)Z(s)]^{-1}H(s)W(s)$ (where H(s) is to be selected)
c) the degree of the denominator polynomial of the matrix function $Z(GZ)^{-1}H: \mathfrak{R}^{r \times n}$ is not less than the degree of the numerator polynomial of each of its entries
d) either condition 1) or 2) holds:

1) there is a real, positive δ such that the real part of every zero of $F_e(s;\mu,\epsilon)=\det[I(1-\mu e^{\epsilon s})+H(s)V(s)T(s)]=0$ is less than $-\delta$.

2) all the zeros of $F_{ea}(s;\mu,\epsilon)=\det[I(1-\mu+\epsilon s)+H(s)V(s)T(s)]=0$ have negative real parts, for:
   (a) $\mu=1$, $\epsilon=0$ (the ideal case), or
   (b) $\mu=1$, $0<\epsilon<<1$ (real case, with infinite gain and $\epsilon$-delay), or
   (c) $0<<\mu<1$, $\epsilon=0$ (real case, high-gain and no delay), or
   (d) $0<<\mu<1$, $0<\epsilon<<1$ (real case, high-gain with $\epsilon$-delay).

Note 2 a) If $G_u(s)$ is given in the form $G_u(s)=P(s)/\Delta(s)$, then Requirement 3c takes the following form:
   c') the degree of the denominator polynomial of $\Delta Z(PZ)^{-1}H$ is not less than the degree of the numerator polynomial of every entry of $\Delta Z(PZ)^{-1}H$.

b) If the real parts of all zeros of $\det[H(s)]=0$ are negative then the conditions 1) and 2) of Requirement 3d can be expressed in the following form:
   1') there is a $\delta \in (0, +\infty)$ such that every zero of $F_{e1}(s;\mu,\epsilon)=\det[I(1-\mu e^{-\epsilon s})H^{-1}(s)+V(s)T(s)]=0$ has real parts less than $-\delta$.

c) The polynomials $f_e(s;\mu,\epsilon)=\text{num } F_e(s;\mu,\epsilon)$, $f_{e1}(s;\mu,\epsilon)=\text{num } F_{e1}(s;\mu,\epsilon)$, $f_{ea}(s;\mu,\epsilon)=\text{num } F_{ea}(s;\mu,\epsilon)$ and $f_{ea1}(s;\mu,\epsilon)=\text{num } F_{ea1}(s;\mu,\epsilon)$, do not depend (directly or explicitly) on $G_u(s)$ because the $F_{(\cdot)}(\cdot)$— matrix functions are not dependent on $G_u(s)$. If $\epsilon=0$ and $\mu=1$ (the ideal case), then $F_e(s;1,0)=F_e(s)=\det[H(s)V(s)T(s)]$
$=F_e(s;\mu,\epsilon)|_{\mu=1,\epsilon=0}$ $F_{e1}(s;1,0)=F_{e1}(s)=\det[V(s)T(s)]$
$=F_{e1}(s;\mu,\epsilon)|_{\mu=1,\epsilon=0}$ $F_{ea}(s;1,0)=F_{ea}(s)=\det[H(s)V(s)T(s)]$
$=F_{ea}(s;\mu,\epsilon)|_{\mu=1,\epsilon=0}$ $F_{ea1}(s;1,0)=F_{ea1}(s)=\det[V(s)T(s)]$
$=F_e(s;\mu,\epsilon)|_{\mu=1,\epsilon=0}$ d) We do not impose any stability condition on the filter itself.

e) If the above conditions 1) and 2) in Requirement 3d) above both do not hold then we set $H(s)$ and $V(s)$ to be well defined diagonal matrix functions that satisfy Requirement 4 below. $V(s)$ in addition should obey the realizability condition of $[V(s)T(s)]$; i.e., the degree of the numerator polynomial of $[V(s)T(s)]$ may not be less than the degree of the numerator polynomial of every entry of $[V(s)T(s)]$.

2.4.2 TRACKING CONTROL METHODS

Requirement 4

The filter input signal $w(t)$ in the time domain description may be generated by:

$$w(t) = \mu w(t-\epsilon) + VT\left(e, \ldots e^{(\gamma)}, \int_0^t e \, d\tau \right), \gamma \in \{1, 2, \ldots, h\}$$

For an s-domain description:

$W(s) = \mu e^{-\epsilon s} W(s) + V(s)T(s)E(s)$

For a p-operator form, $w(t) = \mu w(t-\epsilon) + V(p)T(p)e(t)$ where
1) $V(s) = H_0^{-1}$ if and only if $H_0 \in \Re^{n \times n}$ (i.e., $H_0$ is well defined), and $\det H_0 \neq 0$, where $$H_0 = \lim_{s \to 0} H(s)$$

and

2) $V(s) = [sH(\infty)+H_\infty]^{-1}$ if and only if $H_\infty \in \Re^{n \times n}$ (i.e., $H_\infty$ is well defined,) and $\det[H_\infty] \neq 0$, $\det H_0 = 0$, where $$H_\infty = \lim_{s \to \infty} \{s[H(s)-H(\infty)]\} \text{ and } H(\infty) = \lim_{s \to \infty} H(s)$$

Note 2

We can also define W by:

$W(s) = (1-\mu e^{-\epsilon s})^{-1} V(s)T(s)E(s)$, if $\epsilon > 0$ and/or $\mu < 1$.

Conclusion

Requirements 1 through 4 completely define a natural tracking controller for time-invariant, linear systems described by any plausible set of equations.

Note 4

It is well known that in case the system is stable, then $G_u(s)$ can be determined from its frequency response. Such frequency responses can be experimentally determined through standard means in the art.

2.4.3 NATURAL TRACKING CONTROL: IDEAL CASE

For the ideal case for natural tracking control, see section 2.1.3 above.

2.4.4 NATURAL TRACKING CONTROL: REAL CASE

For the real case for natural tracking control, see section 2.1.4 above.

2.4.5 HIGH-GAIN NATURAL TRACKING CONTROL

For the high-gain case for natural tracking control, see section 2.1.5 above.

2.4.6 REAL HIGH-GAIN NATURAL TRACKING CONTROL

For the real high-gain case for natural tracking control, see section 2.1.6.

2.5 NONLINEAR INPUT-OUTPUT SYSTEMS

Nonlinear system of equations are the norm, not the exception in describing physical systems. Nonlinear systems of equations are comprised of nonlinear functions of variables, and in some respects resemble the linear systems of the previous section. However, in nonlinear systems the matrices multiplying the system variables are usually a function of system variables themselves. In the following discussion, nonlinear systems are described in terms of input-output relationships, state-space relationships, and general relationships.

2.5.1 SYSTEMS DESCRIPTION

Nonlinear systems may sometimes be described with input-output differential equations. The outputs of the physical system are the variables y in the following descriptions.

$$A_\nu(y,\ldots,y^{(\nu-1)})y^{(\nu)}+h(y,\ldots y^{(\nu-1)},d,\ldots,d^{(p)})=Bu \quad (1)$$

or $$A_\nu(y,\ldots,y^{(\nu-1)})y^{(\nu)}+h(y,\ldots y^{(\nu-1)},d,\ldots,d^{(p)})=B(y)b(u,\ldots,u^{(\eta)}) \quad (2)$$

Requirement 1 a) The matrix function $A_\nu$ and the matrix B, the vector function h, and the families $S_d$ and $S_u$ are such that equation (1) has a unique solution $\underline{y}(t;y_0;d,u)$ for every $y_0^\nu \in Y_0^{\nu n}$ in a neighborhood $Y_0^{\nu n}$ of $y^\nu=0$, $y^\nu = (y\ y^{(1)}\ldots y^{(\nu-1)})^T$, for every $(d,u) \in S_d \times S_u$.

b) The matrix functions $A_\nu$ and B(y), the vector functions $b(u,\ldots,u^{(\eta)})$ and h(y,d), the families $S_d$ and $S_u$ and a neighborhood $Y_0^{\nu n}$ of $y^\nu=0$ are such that equation (2) has a unique solution $\underline{y}(t;y_0,d,u)$ for every $y_0^\nu \in Y_0^{\nu n}$ for every $(d,u) \in S_d \times S_u$.

Verification of Requirement 1 can be based on the physical properties of the system.

Property 1 a) The matrix function $A_\nu$ and the vector functions $b(u,\ldots,u^{(\eta)})$ and h(y,d) are continuous in all their arguments.

b) The vector function h(y,d) can be completely unknown (the internal dynamics).

c) The matrix function $A_\nu$, the matrix B for system (1) and the matrix functions $A_\nu$ and B(y) for system (2) and the vector function $b(u,\ldots,u^{(\eta)})$ for the system (2) are well defined (and completely known).

Requirement 2

The matrix function $A_\nu$ is identically nonsingular, $\det[A_\nu(y,\ldots,y^{(\nu-1)})] \neq 0$ for every $$y^\nu \in Y^\nu,\ Y_0^\nu \subseteq Y^\nu \subseteq \Re^{\nu n}. \quad (3)$$

Requirement 2 is the natural trackability requirement for the systems (1) and (2).

Requirement 3 a) The matrix function B(y) has full rank: rank B(y)=n for every $y^\eta \in Y^\eta$ $$\det(B(y)) \neq 0 \quad (4a)$$

or equivalently, there is a matrix function $W: \Re^{r \times n}$ such that $$\det[B(y)W(y)] \neq 0 \quad (4b)$$

for every $y^\eta \in Y^\eta$ b) The vector function $b(u,\ldots,u^{(\eta)})$ is such that $$b(u,\ldots,u^{(\eta)})=w \quad (5)$$

has a unique solution $u(t;u_0;w)$ for every $u_0^\eta\ U_0^\eta$, for every $w(t) \in C(\Re_+)$, for a neighborhood $U_0^{\eta 2}$ of $u^\eta=0$.

In case $\eta=0$ then condition b) of the preceding requirement reduces to the requirement that the vector function b be invertible, i.e. $u=b^I(w)$ with $b^I$ being the inverse of b.

Requirement 4

Let $W_y^\nu$, $W_y^\nu \subseteq \Re^{r \times n}$, be the output working space. Then $S_d$, $S_u$, $S_y$, and $W_y^\nu$ are such that for every $(d,y_d) \in S_d \times S_y$ there are $\tau \in (0,+\infty)$ and $u_N$, $u_N(t) \in S_u$ for all $t \in [0,\tau)$, obeying $$A_\nu[y_d^\nu(t)]y_d^\nu(t)+h[y_d^{(\nu)}(t),d^{p+1}(t)]=Bu_N(t) \text{ for all }$$
$t \in [0,\tau)$, for system (1), and $$A_\nu[y_d^\nu(t)]y_d^{(\nu)}(t)+h[y_d^\nu(t),d^{p+1}(t)]=B[y_d(t)]b(u_N^{\eta+1}(t))$$
for all $t \in [0,\tau)$, for system (2).

2.5.2 TRACKING CONTROL ALGORITHMS

For nonlinear input-output differential systems we require that $$V=W(BW)^{-1}A_\nu(y^\nu), \quad (6a)$$

for system (1) and for system (2), $$W(y)(B(y)W(y))^{-1}A_\nu(y^\nu) \quad (6b)$$

Further, $$w(t) = \mu w(t-\epsilon) + VT\left(e,\ldots e^{(\gamma)},\int_0^t e d\tau\right) \quad (7a)$$

or $$w(t) = \mu w(t-\epsilon) + VT_d\left(e,\ldots e^{(\gamma)},\int_0^t e d\tau\right), \quad (7b)$$

$$\mu \in (0,1],\ \mu >> 0, \quad (8)$$

$$k=(1-\mu)^{-1}, \quad (9)$$

$$\epsilon \in [0,1),\ \epsilon << 1. \quad (10)$$

$$B(y)b(u,\ldots,u^{(r)})=w(t). \quad (11)$$

2.5.3 NATURAL TRACKING CONTROL: IDEAL CASE

For the ideal case for natural tracking control, see section 2.1.3 above, which yields $\mu=1$ and $\epsilon=0^+$ in (7).

2.5.4 NATURAL TRACKING CONTROL: REAL CASE

For the real case for natural tracking control, see section 2.1.4 above, which means that $\mu=1$ and $\epsilon \in (0,1)$ in (7).

2.5.5 HIGH-GAIN NATURAL TRACKING CONTROL

For the high-gain case for natural tracking control, see section 2.1.5 above, which yields $\mu \in (0,1)$, $\mu >> 0$, and $\epsilon=0^+$ in (7).

2.5.6 REAL HIGH-GAIN NATURAL TRACKING CONTROL

For the real high-gain case for natural tracking control, see section 2 1.6 above, which yields $\mu \in (0,1)$, $1 > \mu >> 0$, and $1 >> \epsilon > 0$ in (7).

2.6 NONLINEAR STATE-SPACE SYSTEMS

Nonlinear systems may also be described by systems of nonlinear state-space equations where the highest derivative of the states x(t) is of order one. In nonlinear state-space descriptions, the derivatives of the states are nonlinear functions of the states and disturbances and the outputs y(t) are nonlinear functions of the states and disturbances.

2.6.1 SYSTEMS DESCRIPTION $$x^{(1)} = f(x,d) + B(x)u \quad (1a)$$

$$y = g(x,d) \quad (1b)$$

or $$x^{(1)} = f(x,d) + B(x)b(u) \quad (2a)$$

$$y = g(x,d) \quad (2b)$$

where $x \in \Re^N$, $u \in \Re^r$, $y \in \Re^n$, $d \in \Re^p$, $0 < n \leq r < N < +\infty$

Requirement 1 a) The vector function f(x,d) and the classes $S_d$ and $S_u$ are such that (1a) has a unique solution $\underline{x}(t;x_0;d,u)$ for every $x_0 \in X_0$ for every $(d,u) \in S_d \times S_u$, where $X_0$ is a neighborhood of $x = 0$.

b) The vector functions f(x,d) and b(u), and the families $S_s$ and $S_u$ are such that (2a) has a unique solution $\underline{x}(t;x_0;d,u)$ for every $x_0 \in X_0$ for every $(d,u) \in S_d \times S_u$.

c) The vector function g(x,d) is well-defined (and completely known), and is continuously differentiable in all its arguments. Its Jacobian with respect to x will be denoted by $J = (\partial g_i / \partial x_j)$ and with respect to d by $J_d = (\partial g_i / \partial d_j)$. In case $g(x,d) = C(x)x + Z(d)$, we replace J by C everywhere.

Property a) The vector function f(x,d) is continuous in all its arguments.

b) The vector function f(x,d) can be completely unknown.

c) The matrix function B(x) in (1) and (2), and the vector function b(u) in the case of the system (2), are well-defined (and completely known).

Requirement 2

The matrix function J(x,d)B(x) has full rank, i.e.

$$\det[J(x,d)B(x)] \neq 0 \text{ for every } (x,d) \in X \times S_d \quad (3a)$$

equivalently there exists a matrix function W, $W: \Re^N \times \Re^p \to f^{r \times n}$ such that $$\det[J(x,d)B(x)W(x,d)] \neq 0 \text{ for every } (x,d) \; X \times S_d \quad (3b)$$

where $X_0 \subseteq X \subseteq \Re^N$.

Requirement 3

In the case of system (2), the vector function b(u) is well defined and is such that:

$$b(u) = w, \quad (4)$$

has a unique solution $u = b^I(w)u$, where $b^I(w)$ is the inverse function of b(u).

Requirement 4

Let $W_y$, $W_y \subseteq \Re^n$, be (a given or to-be-determined) output working space. Then the state working space $W_x$ with respect to $(S_d \times W_y)$ is a nonempty connected subset of $$X(S_d, W_y), \; W_x \subseteq X(S_d \times W_y) \quad (5)$$

where $$X(S_d, W_y) = \{x: [\text{rank } J(x,d)B(x) = n \text{ for all } d \in S_d], \text{ and } [g(x,d) \in W_y \text{ for all } d \in S_d]\} \quad (6)$$

Requirement 5

The families $(S_d, S_u, S_y)$ and the output working space $W_y$ are such that for every $(d, y_d) \in S_d \times S_y$ there are $\tau \in (0, +\infty)$ and $u_N$, $u_N(t) \in S_u$, for all $t \in [0,\tau)$, causing $x_N$— motion of the system (1) or (2) so that $$x_N(t) \; X(S_d, W_y) \text{ for all } t \in [0,\tau)$$

and for the system (1)

$$x_N^{(1)}(t) = f[x_N(t), d(t)] + B u_N(t) \text{ for all } t \in [0,\tau)$$

$$g[x_N(t), d(t)] = y_d(t) \text{ for all } t \in [0,\tau)$$

or for the system (2):

$$x_N^{(1)}(t) = f[x_N(t)] + B[x_N(t)]b[u_N(t)] \text{ for all } t \in [0,\tau)$$

$$g[x_N(t), d(t)] = y_d(t) \text{ for all } t \in [0,\tau).$$

2.6.2 TRACKING CONTROL ALGORITHMS

For nonlinear state-space differential forms we further require that $$V = (J(x,d)B(x))^{-1} \quad (7)$$

and $$w(t) = \mu w(t - \epsilon) + VT\left(e, \ldots e^{(\gamma)}, \int_0^t e d\tau\right) \quad (8a)$$

or $$w(t) = \mu w(t - \epsilon) + VT_d\left(e, \ldots e^{(\gamma)}, \int_0^t e d\tau\right) \quad (8b)$$

$$\mu \in (0,1], \mu >> 0 \quad (9)$$

$$k = (1 - \mu)^{-1} \quad (10)$$

$$\epsilon \in [0,1), \epsilon << 1 \quad (11)$$

$$b(u) = w(t) \quad (12)$$

Comment 1

From (7) it follows that in general V depends on the disturbance d. However, if the output map g is separable in x and d, i.e. $g(x,d) = g_1(x) + g_2(d)$, where $g_1$ should be differentiable in x, and $g_2$ may be unknown, then J and V do not both depend on disturbance d. In the last case d may be unknown and measurable.

2.6.3 NATURAL TRACKING CONTROL: IDEAL CASE

For the ideal case of natural tracking control, see section 2.1.3 above, which yields $\mu=1$ and $\epsilon=0^+$ in (7).

2.6.4 NATURAL TRACKING CONTROL: REAL CASE

For the real case of natural tracking control, see section 2.1.4 above, which means that $\mu=1$ and $\epsilon\in(0,1)$, $\epsilon<<1$ in (7).

2.6.5 HIGH-GAIN NATURAL TRACKING CONTROL

For the high-gain case of natural tracking control, see section 2.1.5 above, which yields $\mu\in(0,1)$, $\mu>>0$, and $\epsilon=0^+$ in (7).

2.6.6 REAL HIGH-GAIN NATURAL TRACKING CONTROL

For the real high-gain case of natural tracking control, see section 2.1.6 above, which yields $\mu\in(0,1)$, $1>\mu>>0$, and $1>>\epsilon>0$ in (7)

2.7 NONLINEAR GENERAL SYSTEMS DESCRIPTION

A general nonlinear system of equations is comprised of nonlinear functions that resemble their counterparts in nonlinear input-output systems and in nonlinear state-space systems. As in the input-output equation form, there are typically physical variables q(t) and their derivatives which are associated with the dynamics of the system, as described in (1a) below.

2.7.1 NONLINEAR GENERAL SYSTEMS DESCRIPTION

If $\zeta=1$, $A_\zeta(q)\equiv I$, $p=0$ and $\eta=0$, then (1a) takes the form of the (nonlinear vector differential) state equation. However, the output of the system is expressed in a nonlinear algebraic form, as shown in (1b).

$$A_\zeta(q, \ldots, q^{(\zeta-1)})q^{(\zeta)} + h(q, \ldots q^{(\zeta-1)}, d, \ldots, d^{(p)}) = B(q)b(u, \ldots, u^{(\eta)}) \quad (1a)$$

$$y = g(q, d) \quad (1b)$$

where $q\in\Re^l$, $y\in\Re^n$, $u\in\Re^r$, $d\in\Re^p$, and $q^\zeta = (q\ q^{(1)} \ldots q^{(\zeta-1)})^T \in \Re^{l\zeta}$. If $g(q,d)\equiv q$, then (1b) becomes $y\equiv q$, which gives (1b) the form of a (nonlinear vector differential) input-output equation. Altogether, (1) is a very general description of time-invariant nonlinear systems.

An example of this general form of system description is a description of an n-degree-of-freedom (DOF) robot which is controlled in Cartesian space. The robot operates in, and is controlled in, a local coordinate system of joint variables—for example the angular position of a rotary joint. However, the output of the robot is in Cartesian space with $\{X,Y,Z,\omega(\text{roll}),\xi(\text{pitch}), \psi(\text{yaw})\}$ coordinates, for example. The output equations for a n-DOF robot are in general highly nonlinear, and are functions of the joint variables and external disturbances on the robot.

For example, a two degree-of-freedom robot which operates in a vertical plane, with normal gravity effects, can be modeled as $$A_2(q) + h(q,q^{(1)},d) = Bb(u) \quad (\text{ex1})$$

$$y = g(q)$$

with $\zeta=2$, $n=2$, $r=2$, $\eta=0$, $q(t)=(q_1,q_2)^T$ (joint positions), $q^{(k)}(t)=(q_1^{(k)},q_2^{(k)})^T$, $k=1,2$, (joint velocities and accelerations), and without loss of generality, $$B(q) = B = \begin{bmatrix} 1.0 & 0.0 \\ 0.0 & 1.0 \end{bmatrix}$$

and $b(u)=(u_1,u_2)$. The inertial matrix function of the robot $A_2(q)$ is highly nonlinear:

$$A_2(q) = \begin{bmatrix} \frac{m_1 l_2^2}{12} + \frac{m_1 l_1^2}{4} + \frac{m_2 l_2^2}{12} + \frac{m_2 l_2^2}{4} + m_2 l_1^2 + m_2 l_1 l_2 \cos(q_2) & \frac{m_2 l_2^2}{12} + \frac{m_2 l_2^2}{4} + \frac{m_2 l_1 l_2 \cos(q_2)}{2} \\ \frac{m_2 l_2^2}{12} + \frac{m_2 l_2^2}{4} + \frac{m_2 l_1 l_2 \cos(q_2)}{2} & \frac{m_2 l_2^2}{12} + \frac{m_2 l_2^2}{4} \end{bmatrix}$$

where $m_i$, $i\in(1,2)$ are the masses of the links of the robot, and $l_i$, $i\in(1,2)$ are the link lengths.

The internal dynamics of the robot, including coriolis and centripetal forces, may be described as:

$$h(q,q^{(1)},d) = \begin{bmatrix} \frac{(-m_2 l_1 l_2 \sin(q_2))}{2}(q_1^{(1)}q_2^{(1)} + q_2^{(1)}(q_1^{(1)} + q_2^{(1)})) + \frac{m_1 g l_1 \cos(q_1)}{2} + m_2 g l_1 \cos(q_1) + \frac{m_2 g l_2 \cos(q_1+q_2)}{2} \\ \frac{m_2 l_1 l_2 \sin(q_2)}{2}(q_1^{(1)})^2 + \frac{m_2 g l_2 \cos(q_1+q_2)}{2} \end{bmatrix}$$

where $q_i^{(1)}$, $i\in(1,2)$ are the joint velocities, and g is the gravitational force constant, modeled here as an external disturbance on the robot. Finally, the output of the robot in Cartesian space is $$\begin{bmatrix} y_1 \\ y_2 \end{bmatrix} = \begin{bmatrix} l_1\cos(q_1) + l_2\cos(q_1 + q_2) \\ l_1\sin(q_1) + l_2\sin(q_1 + q_2) \end{bmatrix}$$

The functions $A_2(.)$, $h(.)$, and $g(.)$ in our robot example are independent of $d\in\Re^p$, the external disturbances (except for gravity).

There are several requirements and properties that the nonlinear general system must satisfy to be naturally trackable (and to have a solution). Requirement 1 below assures that the dynamic equations are not dual-valued for a given input. This requirement does not preclude the possibility that the output may have multiple solutions, which is usually the case in multiple DOF systems such as robots. More formally, the requirement is:

Requirement 1

The matrix functions $A_\zeta$ and B in (1a), the vector functions h and b in (1b), and the families $S_d$ and $S_u$ are such that equation (1a) above has a unique solution $q(t;q_0^\zeta;d,u)$ for every initial condition $q_0^\zeta \in Q_0^\zeta$, for every disturbance and control $(d,u) \in S_d \times S_u$, for a suitable, non-empty $Q_0^\zeta \subseteq \Re^{l_\zeta}$.

Note 1

Requirement 1 reflects the trade-off among the allowable disturbance set $S_d$, the allowable command set $S_u$, and $Q_0^\zeta$, the allowable set of initial $q_0^\zeta$.

The uniqueness of the solution of (1) can be guaranteed by the Lipschitz property of the nonlinearities. [See R. E. Skelton, *Dynamic System Control*, John Wiley & Sons, New York. 1988, p.89.]

Several properties of such a system are:

Property 1 a) The matrix functions $A_\zeta$ and B, and the vector functions b and h are continuous in all their arguments.

b) The vector function h may be completely unknown.

c) The matrix functions $A_\zeta$ and B, and the vector function b are well defined and completely known.

For nonlinear systems such as robots, condition (a) is certainly satisfied, and property 1(b) is much sought-after since h(.) is highly nonlinear. Also from 1(c), the inertia matrix $A_\zeta(q^\zeta) \equiv A_2(q^2)$ of the robot is known and the input-output relationship between the actuators and the robot joints is known (in our example the actuators are assumed to be "direct drive" actuators).

Requirement 2

The matrix function $A_\zeta$ is nonsingular on a connected nonempty set $Q^\zeta$, $Q^\zeta \subseteq \Re^{l_\zeta}$, or equivalently, $$\det[A_\zeta(q, \ldots, q^{(\zeta-1)})] \neq 0 \text{ for every } q^{(i)} \in Q^\zeta \text{ for a suitable } Q^\zeta, Q_0^\zeta \subseteq Q^\zeta. \tag{2}$$

For real robots with real masses and link lengths this requirement is always satisfied. The sets $Q^\zeta$ and $Q_0^\zeta$ constitute a prespecified (given) pair, or they could be determined (possibly as the maximum pair). For our robot example, $$Q_0^\zeta \subseteq Q^\zeta \subseteq \{q: q = (q_1, q_2)^T \in \Re^2, q_1 \Re^1,$$

$$q_2 \neq \cos^{-1}\left[\frac{\sqrt{(m_1 l_2^2 + 3m_1 l_1^2 + 12m_1 l_1^2)m_2}}{6m_2 l_2}\right]\}$$

The set $Q_0^\zeta$ is the set of permitted initial $q_0$, and $Q^\zeta$ is the set of permitted $q^\zeta(t)$ at $t>0$.

Comment 1

The set $Q^\zeta$, $Q^\zeta \subseteq \Re^{l_\zeta}$, can be given, or is to be determined to obey (2).

Requirement 3

The vector function g (relating joint position to Cartesian position in our example) is well-defined (and completely known), and is continuously differentiable in all its arguments. Its Jacobian with respect to q is $J=(\partial g_i/\partial q_j)$, and with respect to d is $J_d=(\partial g_i/\partial d_j)$. In case $g(q,d)=C(q)q+Z(d)$, we may replace J by C everywhere.

For our robot example, the Jacobian of the output function is $$J(q) = (\partial g_i/\partial q_j) =$$

$$\begin{bmatrix} (-l_1\sin(q_1) - l_2\sin(q_1 + q_2)) & (-l_2\sin(q_1 + q_2)) \\ (l_1\cos(q_1) + l_2\cos(q_1 + q_2)) & (l_2\cos(q_1 + q_2)) \end{bmatrix}$$

Let $q^\zeta = (q\ q^{(1)} \ldots q^{(\zeta-1)})^T$. Then the natural trackability condition for general nonlinear systems is as follows:

Requirement 4

The matrix function $JA_\zeta^{-1}B$: $\Re^{l_\zeta} \times \Re^p \to \Re^{r \times n}$ has full rank on $Q^\zeta \times S_d$, $$\text{rank}[J(q,d)A_\zeta^{-1}(q^\zeta)B(q)] = n \text{ for every } (q^\zeta, d) \in Q^\zeta \times S_d \tag{3a}$$

or equivalently, there is some W: $\Re^{l_\zeta} \times \Re^p \to \Re^{r \times n}$ such that $$\det[J(q,d)A_\zeta^{-1}(q^\zeta)B(q)W(q^\zeta,d)] \neq 0 \text{ for all } (q^\zeta, d) \in Q^\zeta \times S_d. \tag{3b}$$

In the following discussion, $Q^\zeta = Q^\zeta(d)$ obeys both Requirement 3 and Requirement 4 for every $d \in S_d$. The set $Q^\zeta(S_d)$ obeys these requirements on $S_d$, (i.e. for all $d \in S_d$) if and only if it is the intersection of $Q^\zeta(d)$ on $S_d: Q^\zeta(S_d) = \cap [Q^\zeta(d): d \in S_d]$.

As stated above, the inertia matrix has full rank (is nonsingular) for every q. However, for robots, it is possible for the Jacobian to be singular, meaning that there is a loss of one or more DOF in the robot. Moving away from a singular joint configuration will require special considerations which are similar to those of known techniques. In our example, Requirement 4 means that $Q^\zeta \subseteq \{q: q \in \Re^l, \det[J(q)A_2^{-1}(q)] \neq 0\}$. This equation is difficult to solve manually in q-space. However, there are industry standard methods for solving for these conditions for specific robot configurations. Also note that since the function B in our robot example is the identity matrix, it is necessarily nonsingular.

Note 2

The conditions in (3) impose additional restrictions on (2), that is on $Q^\zeta$ and $S_d$. Certainly they should satisfy both (2) and (3), which is assumed to be achieved by requiring a motion within $Q^\zeta$ and no external disturbances (such as forces) which would force $q^\zeta$ out of $Q^\zeta$. In order to satisfy this we impose Requirement 7:

Note 3 a) Since $\text{rank}[J(q,d)A_\zeta^{-1}(q^\zeta)B(q)] = n$, i.e. $\det\{[J(q,d)A_\zeta^{-1}(q^\zeta)B(q)][J(q,d)A_\zeta^{-1}(q^\zeta)B(q)]^T\} \neq 0$ for all $q^\zeta \in Q^\zeta$, we can set $W(q^\zeta) \equiv [J(q,d)A_\zeta^{-1}(q^\zeta)B(q)]^T$.

b) If $l=n=r$, (the same number of outputs, inputs, and internal coordinates, e.g. in the robot example, the joint angles) and $\det[J(q,d)A_\zeta^{-1}(q^\zeta)B(q)] \neq 0$ for all $q^\zeta \in Q^\zeta$, then we can set $W=I$ (which will simplify the controller for this case).

The following requirement provides for a unique solution to the control equation, which was not a problem for the robot example.

Requirement 5 a) The vector function b is such that equation (4), $$b(u, \ldots, u^{(\eta)}) = w \tag{4}$$

has a unique solution $u(t; u_0^\eta; w)$ through every $u_0^\eta = (u_0, u_0^{(1)} \ldots u_0^{(\eta-1)})^T \in U_0^\eta$, $U_0^\eta \subseteq \Re^{\eta r}$ for every $w(t) \in C\Re_+)$, with $\underline{u}$ continuous in $t \in [0, +\infty)$ for every $u_0^\eta \in U_0^\eta$.

b) If $u \in S_u$, then $u_0^\eta \in U_0^\eta$ or equivalently, if a control is in the allowable set of controls, then the initial control and its initial derivatives are also allowable.

Finally, it is required that the action of the system remains within its working set. For example, a robot whose reach is finite should not be commanded to move outside of its work space (i.e., this task cannot be performed no matter what the control may be). More formally, the requirement is:

Requirement 6 a) The real joint q-working space $W_q(d)$ with respect to $d \in S_d$ is a connected, non-empty subset of $Q(d)$, $W_q(d) \subseteq Q(d)$, $Q(d) \subseteq \Re^{l_\zeta}$, $Q(d) = \{q^\zeta : q^\zeta \in \Re^{l_\zeta},\ \det[A_\zeta(q^\zeta)] \neq 0\}$, rank $[J(q,d)A_\zeta^{-1}(q^\zeta)B(q)] = n$, $d \in S_{dg}$ $Q^\zeta(d) \subseteq Q(d)$ b) The real joint q-working space $W_q(S_d)$ with respect to $S_d$ is a connected, non-empty subset of $Q(S_d)$, $Q(S_d) = \cap [Q(d): d \in S_d] = Q^\zeta(S_d)$.

c) If $W_y$ is the working space for output y, $W_y \subseteq \Re^n$, then the q-working space $W_q(S_d, W_y)$ with respect to $(S_d, W_y)$ is a connected non-empty subset of the set $Q(S_d, W_y)$, $Q(S_d, W_y) = \{q^\zeta : q^\zeta \in Q(S_d) \Rightarrow g(q,d) \in W_y \text{ for all } d \in S_d\}$, $W_q(S_d, W_y) \subseteq Q(S_d, W_y)$.

Requirement 7

For every $(d, y_d) \in S_d \times S_y$ there are some set of controls $u_N$ and internal motions $q_N$, $U_N \in S_u$, $q_N(t) \in W_q(S_d, W_y)$ for all $t \in [0, \tau)$ with $\tau \in (0, +\infty]$ given or to be determined, such that $A_\zeta(q_N, \ldots, q_N^{(\zeta-1)}) q_N^{(\zeta)} + h(q_N, \ldots q_N^{(\zeta-1)}, d_N, \ldots, d_N^{(p)}) = B(q_N) b(u_N, \ldots, u_N^{(\eta)})$ $g(q_N, d_N) \equiv y_d$, or for every $(d, y_d) \in S_d \times S_y$ there is a control $U_N \in S_N$ that forces the system motion $q_N$, $q_N(t) \in W_q(S_d, W_y)$ for all $t \in [0, \tau)$, such that $u_N$ forces the real output y to be identical to the desired output $y_d$, i.e., it is assumed that perfect tracking is possible for some initial conditions. If perfect tracking requires more torque, more joint motion, etc. than the system can deliver, then it follows that zero tracking error cannot be attained. It means that such a particular $(d, y_d)$ is not compatible with $(S_u, W_y)$ for the given system.

2.7.2 TRACKING CONTROL ALGORITHMS

As in the prior sections on tracking control, the natural trackability requirement in this section is used to form the internal natural control. Thus for nonlinear general equation forms we further require that $$V = V(q^\zeta, d) = W(q^\zeta)[J(q,d)A_\zeta^{-1}(q^\zeta)B(q)W(q^\zeta)]^{-1} \tag{7}$$

In the robot example, $W = I$ since there are the same number of outputs, inputs, and controlled joints, so:

$$V = (J(q,d)A_\zeta^{-1}B)^{-1}$$

For the robot example, we may form $V = (J(q,d)A_\zeta^{-1}B)^{-1} = A_2(J(q))^{-1}$, since B is the identity matrix, so that $$V = \left[ \left[ \frac{m_1 l_2^2}{12} + \frac{m_1 l_1^2}{4} + \frac{m_2 l_2^2}{12} + \frac{m_2 l_2^2}{4} + m_2 l_1^2 + m_2 l_1 l_2 \cos(q_2) \quad \frac{m_2 l_2^2}{12} + \frac{m_2 l_2^2}{4} + \frac{m_2 l_1 l_2 \cos(q_2)}{2} \right. \right.$$
$$\left. \left. \frac{m_2 l_2^2}{12} + \frac{m_2 l_2^2}{4} + \frac{m_2 l_1 l_2 \cos(q_2)}{2} \quad \frac{m_2 l_2^2}{12} + \frac{m_2 l_2^2}{4} \right] \right.$$
$$\left. \begin{bmatrix} (-l_1 \sin(q_1) - l_2 \sin(q_1 + q_2)) & (-l_2 \sin(q_1 + q_2)) \\ (l_1 \cos(q_1) + l_2 \cos(q_1 + q_2)) & (l_2 \cos(q_1 + q_2)) \end{bmatrix}^{-1} \right]$$

The internal natural tracking controller variable w(t) is formed with the specific tracking property from section 1 and the function V as above:

$$w(t) = \mu w(t - \epsilon) + VT\left(e, \ldots e^{(\gamma)}, \int_0^t e\, d\tau\right), \tag{8a}$$

$(\gamma = 1, 2, \ldots h)$ for the continuous-time case or the discrete-time case, $$w(t) = \mu w(t - \epsilon) + VT_d\left(e, \ldots e^{(\gamma)}, \int_0^t e\, d\tau\right), \tag{8b}$$

$(\gamma = 1, 2, \ldots h)$ with the gain $\mu$ applied to the just-realized control variable $w(t^-)$ or $w(t - \epsilon)$ as:

$$\mu \in (0,1], \mu >> 0 \qquad (9)$$

for the ideal, real, and high-gain cases of natural tracking control. For the high-gain case specifically:

$$k = (1-\mu)^{-1} \qquad (10)$$

The time delay $\epsilon$ in adding (and calculating for the digital case) the just-realized control variable $w(t^-)$ or $w(t-\epsilon)$ is as before:

$$\epsilon \in [0,1), \epsilon << 1. \qquad (11)$$

The controlling output variable, $u(t)$ must be solved from the following equation:

$$b(u, \ldots, u^{(\eta)}) = w(t). \qquad (12)$$

In our robot example, since $b(u) = u(t)$, then $u(t)$ is $w(t)$. This conclusion would not follow in the general case, however.

2.7.3 NATURAL TRACKING CONTROL: IDEAL CASE

For the ideal case of natural tracking control, see section 2.1.3 above, which implies $\epsilon = 0^+$ and $\mu = 1$ in (8).

2.7.4 NATURAL TRACKING CONTROL: REAL CASE

For the real case of natural tracking control, see section 2.1.1.4 above, which implies $0 < \epsilon << 1$ and $\mu = 1$ in (8).

2.7.5 HIGH-GAIN NATURAL TRACKING CONTROL

For the high-gain case of natural tracking control, see section 2.1.1.5 above, which implies $\epsilon = 0$ and $0 << \mu < 1$ in (8).

2.7.6 REAL HIGH-GAIN NATURAL TRACKING CONTROL

For the real, high-gain case of natural tracking control, see section 2.1.1.6 above, which implies $0 < \epsilon << 1$ and $0 << \mu < 1$ in (8).

Figure 24:
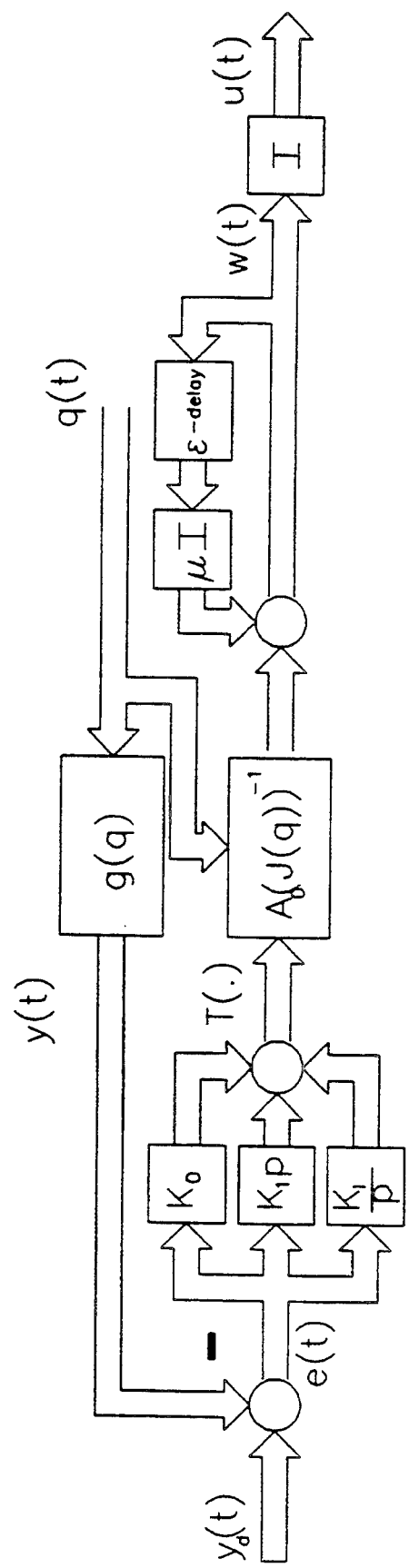
FIG. 24 illustrates a complete natural tracking controller for a robot simulation.

Simulation of an Nonlinear System (a Robot) with a High-Gain PID Natural Tracking Controller A complete natural tracking controller for an input-output differential equation system for the robot simulation is illustrated in FIG. 24. The tracking property is PID, and is formed from a proportional gain of the tracking error, a scaled derivative of the tracking error, and a scaled integral of the tracking error as $T(p) = [K_0 + K_1 p + K_2 p^{-1}]$. The output $y(t)$ is a function of the joint angle vector $q(t)$. The function $g(q(t))$ is formed prior to forming the tracking error. The tracking property is multiplied (or scaled) by the time-varying, nonlinear gain $A_2 J^{-1}$, which is known for this particular system's properties.

The controller variable $w(t) = \mu w(t-\epsilon) + A_2 J^{-1} T(t)$, $\mu = 0.9999$ is illustrated functionally by the unit positive feedback of the variable $w(t)$ through the time delay $\epsilon$, with high-gain $\mu I$, in combination with the product $A_2 J^{-1} T(p)$. Finally, the output of the controller $u(t)$ is formed from the product as $u(t) = w(t)$. The control variable $u(t)$ is then fed to the plant to be controlled.

Figure 25:
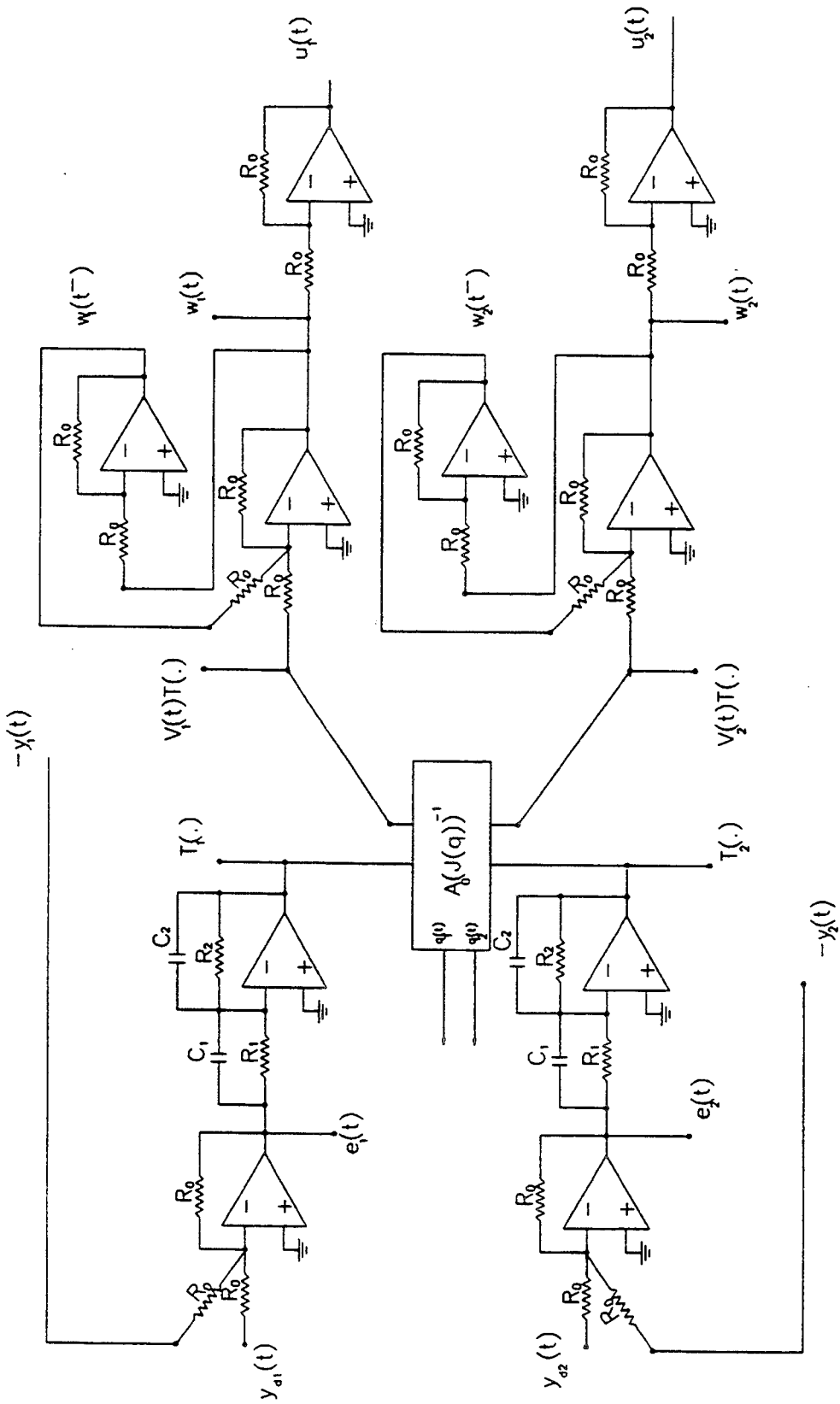
FIG. 25 illustrates an implementation of a natural tracking controller for a robot simulation.

An op amp implementation of this controller is illustrated in FIG. 25. The tracking errors $e_1(t)$ and $e_2(t)$ are created as before with summing (and inverting) amplifiers by the subtraction of the system outputs $y_1(t)$ and $y_2(t)$ from the respective desired outputs $y_{d1}(t)$ and $y_{d2}(t)$. The PID tracking property may be implemented by op amps as before. The p-operator form of the PID function in op amp form is $$T(.) = \frac{(R_1 C_1 p + 1)(R_2 C_2 p + 1)}{R_1 C_2 p}.$$

Resistors $R_1$ and $R_2$ may be chosen to limit the current in the op amps; and then $C_1$, $C_2$, $R_{;2}$, and $R_1$ may be chosen to implement the particular PID tracking property. Since in this example $T(.) = (p^2 = 2p+1)/p$, if $R_1 = 10$ k$\Omega$, then $C_2 = 100$ $\mu$F and $R_1 C_1 = 1$. Thus $R_2 C_1$ must equal 1 sec. and $R_1 C_1 + R_2 C_2$ must equal 2 sec. In fact, if $R_2 C_1 = R_1 C_2 = 1.0$ sec, then $R_1 = R_2 = 10$ k$\Omega$ and $C_1 = C_2 = 100$ $\mu$F.

The multiplication of the tracking property $T(.)$ by $A_2 J^{-1}$ is preformed by the multiplier circuits with summing (and inverting) amplifiers. This function is shown in block form.

The unit positive feedback of the controller variable $w_i(t)$, $i = 1, 2$ is implemented by two inverting op amps, one to sum the voltages $V_i(t) T_i(t)$, $i = 1, 2$, with the just previously created $w_i(t-\epsilon)$, $i = 1, 2$; and one to form the voltage $w_i(t-\epsilon)$, $i = 1, 2$, from $w_i(t)$, $i = 1, 2$. Since inverting operational amplifiers are shown in this implementation, the second op amp is required to invert the voltage $-w_i(t)$. There is no scaling of $u(t)$ from $w(t)$ since $W = I$ for this robot example.

Figure 26:
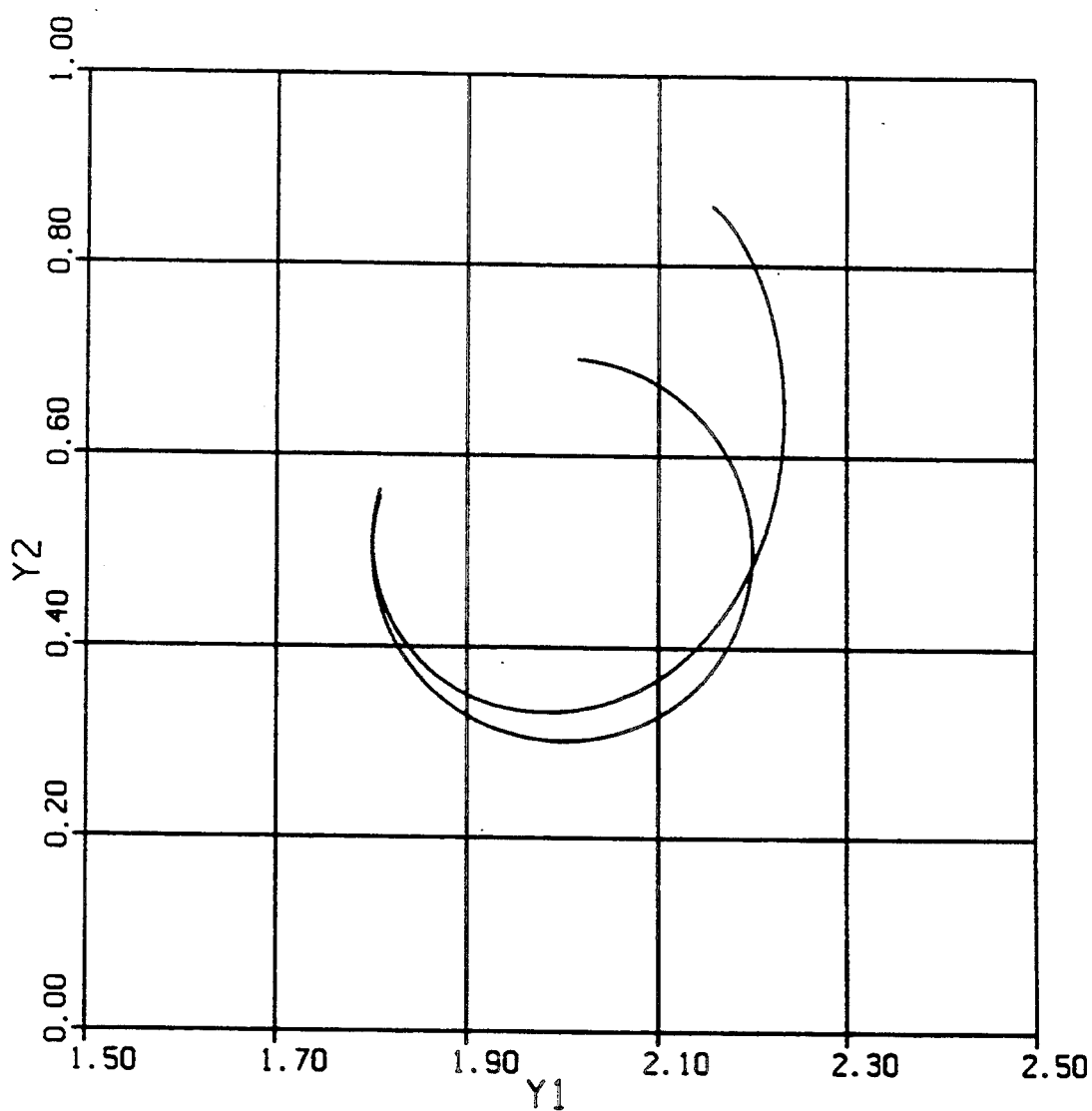
FIG. 26 illustrates a simulation of a robot controlled by a natural tracking controller.
Figure 27:
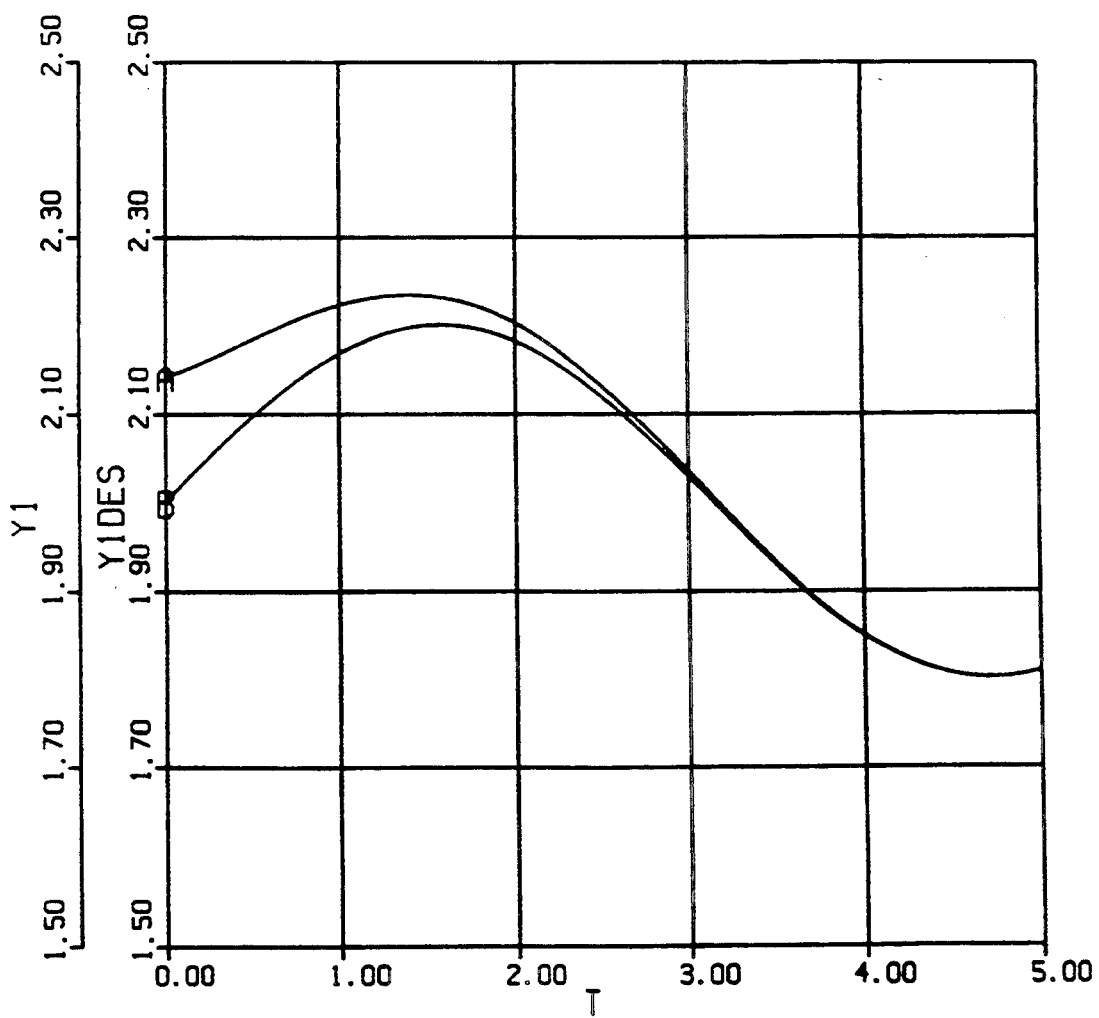
FIG. 27 illustrates the behavior of one component of a simulated robot controlled by a natural tracking controller.
Figure 28:
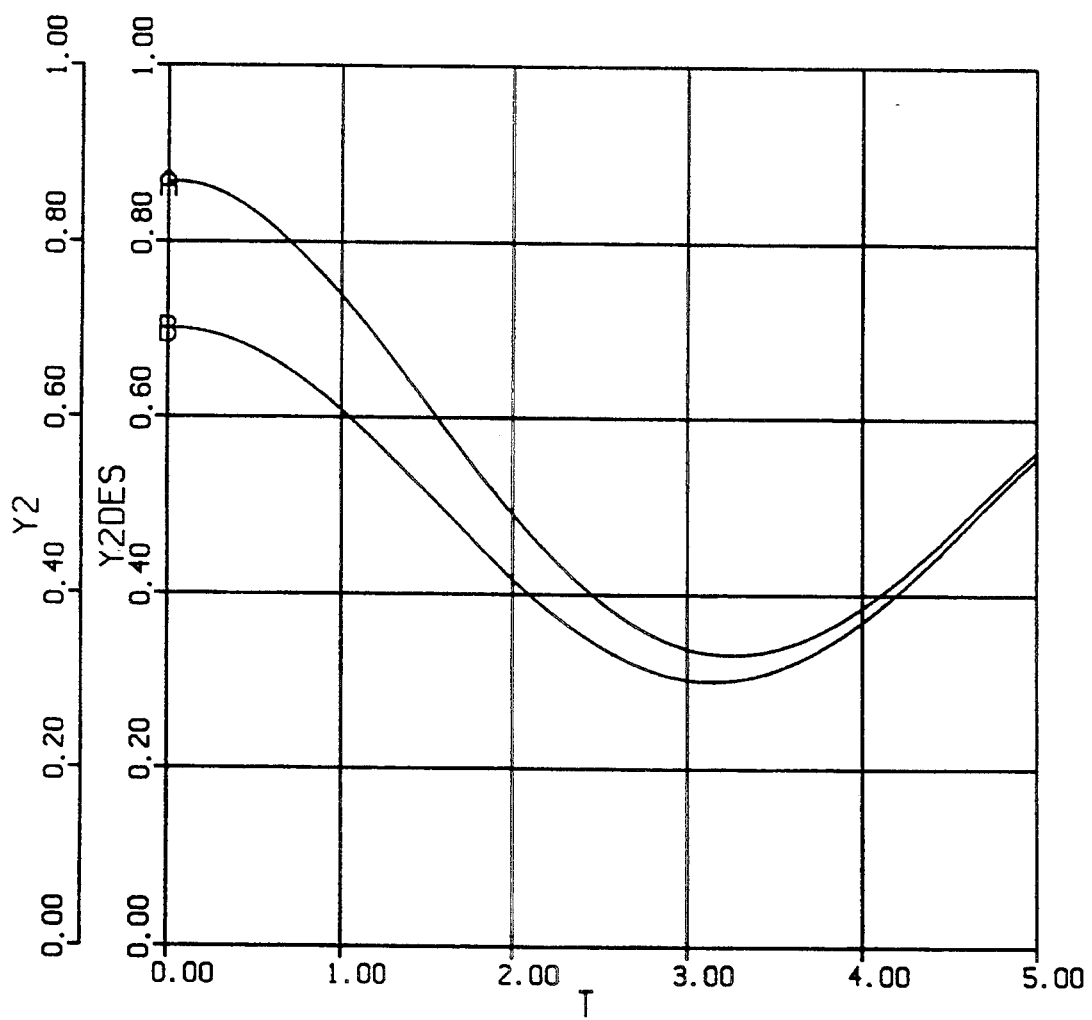
FIG. 28 illustrates the behavior of one component of a simulated robot controlled by a natural tracking controller.
Figure 29A:
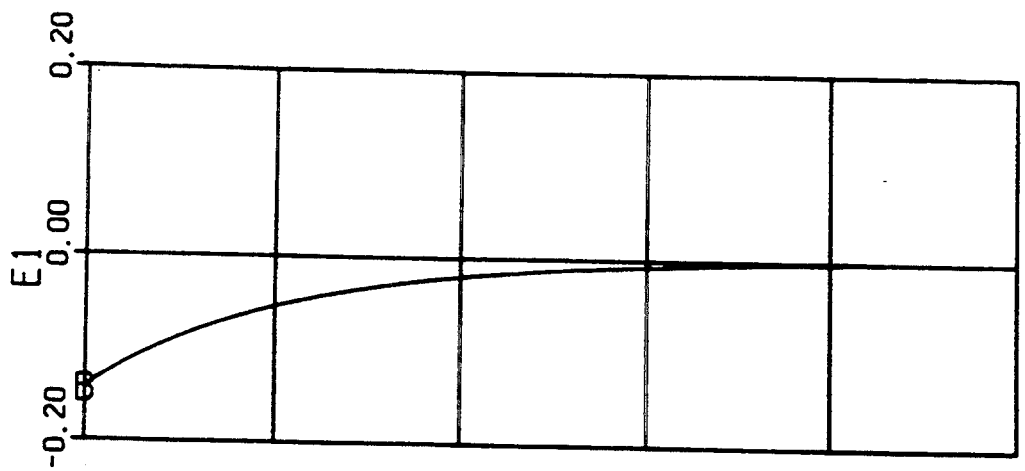
FIGS. 29(A) and 29(B) illustrate the convergence of the errors in FIGS. 27 and 28 to zero.
Figure 29B:
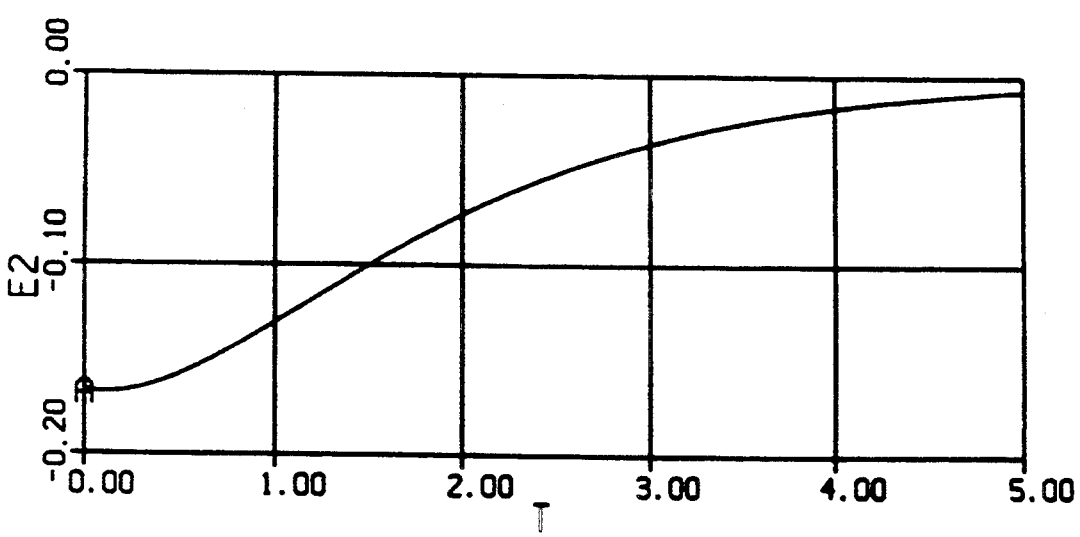

A simulation of the robot system with a PID natural tracking controller is shown in FIGS. 26 through 28. The robot is simulated with link lengths $l_1 = 1.5$ m, $l_2 = 1.0$ m, and link masses $m_1 = 2.0$ kg, $m_2 = 1.0$ kg. The initial position of the end of the robot was arbitrarily set at $q(0) = (q_1(0)\ q_2(0))^T = (0.7\ \text{rad}, -0.8\ \text{rad})^T$. The initial desired output was $y_d(0) = [(y_{d1}(0)\ y_{d2}(0)]^T = (2.0\ \text{m}, 0.5\ \text{m})^T$. The desired path of the robot in Cartesian space is an arc of radius 0.2 meters. In FIG. 26 the actual output and desired output $y_{d1}(t) = y_{d1}(0) + 0.2\sin(t)$ and $y_{d2}(t) = y_{d2}(0) + 0.2\cos(t)$ are plotted as Cartesian coordinates (the latter is the true circular arc in the figure). The real outputs $y_1(t)$ and $y_2(t)$ exponentially converge to the desired system outputs, as illustrated in FIGS. 27 and 28, which give the desired and real outputs as function of time. FIGS. 29(A) and 29(B) illustrate the exponential reduction of the tracking errors $e_1(t)$ [E1] and $e_2(t)$ [E2]. The natural tracking control forces the nonlinear robot to track, even though no knowledge of the internal dynamics is used.

3 DEFINITIONS

For convenience, listings of many of the various parameters which are used in the specification follow, along with their definitions. These definitions generally apply, but may be superseded in some cases where context indicates otherwise, either in the specification or in the claims. Not all parameters are listed; but the meaning of those not listed can generally be inferred from those listed, e.g., from a change in subscripts. Also, some symbols have different meanings in different contexts. (Some symbols had to be re-used because of the limited number of letters available in the Greek and Roman alphabets. The meaning of such dual-meaning symbols can be inferred from context.)

$A \in \Re^{N \times N}$ a matrix describing the internal dynamics of a state-space system, which may be completely unknown $A_k$ a k-th matrix of coefficients multiplying the k-derivative of system dynamics variables, which may be completely unknown $A_\zeta(.)$ a matrix function of the $(\zeta-1)$ derivatives of a variable, describing the system dynamics in nonlinear systems $A_\nu(.)$ a matrix multiplying the $\nu$ derivatives of an output variable, y, describing the system dynamics in linear systems b(.) a nonlinear vector function relating the control u to the input of the dynamic system $B \in \Re^{N \times r}$ a matrix expressing characteristics of the system-controlling components, for example controlling valves; B may be completely unknown B(.) a matrix function expressing characteristics of the system-controlling components, and depending on system internal variables $C$ $^{n \times N}$ a matrix usually expressing characteristics of measuring devices (sensors); C may be unknown.

C(.) a nonlinear vector function relating the transmission of dynamic variables to the output $C_i$, i=1,2 ... capacitor values in Farads $\mathbb{C}$ the set of all complex numbers det(.) the determinant of a square matrix $D \in \Re^{N \times p}$ a matrix describing the transmission of external disturbance actions to the system dynamics; D may be completely unknown $D_k$ the k-th matrix of coefficients relating the transmission of disturbance action to the system internal dynamics, which may be completely unknown $d(.): \Re \to f^p$ a vector function of external disturbances, which may be completely unknown or unmeasurable $d \in \Re^p$ the vector of external disturbances, which may be completely unknown or unmeasurable $E \in \Re^{n \times r}$ a matrix describing the transmission of the control directly to the system output; E may be completely unknown $e(.): \Re \times \Re^n \to f^n$ system output-error (vector) function, $e(t)=y_d(t)-y(t)$, $e(t;e_0) \equiv e(t)$, $e(0;e_0) \equiv e_0$ $e \in \Re^n$ the output error vector or tracking error, $e=(e_1\ e_2\ \ldots\ e_n)^T$, $e=y_d-y$ $|e| \in \Re_+^n$ $|e|=(|e_1|\ |e_2|\ \ldots\ |e_n|)^T$ $e^k \in \Re^{(k-1)n}$ a matrix of kth-order derivatives of the output error, k=0, 1, ...

E(s) Laplace transform of error vector function e(t): $E(s) = \{e(t)\}$ $e^{(t)}$ exponential function of independent variable t (time)

$F \in \Re^{n \times p}$ a matrix describing the transmission of disturbance actions directly to the system output; F may be completely unknown $f^k$ a k-dimensional functional space (k-dimensional space of functions)

g(.) a nonlinear vector function of dynamic variables relating their transmission directly to the system output g gravitational force constant $G_u(.)$ the transfer matrix function relating the control input of the system to the output h maximum number of derivatives of error function e(.) in the control h(.) a nonlinear vector function of system dynamic variables and external disturbances which are completely unknown H(s) a matrix polynomial which defines an internal filter of the controller $i \in [0,1, \ldots +\infty)$ index variable $I \in \Re^{n \times n}$ the identity matrix $J \in [0,1, \ldots +\infty)$ index variable j the imaginary unit: $j=\sqrt{-1}$ $$J = \left( \frac{\partial g_i}{\partial q_j} \right)$$

the Jacobian matrix function of partial derivatives of the relationship of the system variables q(.) to the output function g(.)

k an index variable k $(0,+\infty]$ a high gain of the controller $K_i$ $[0,+\infty I)$ non-negative diagonal matrices for the controller's ith-order derivatives. i=1, 2, ...

$K_I$ $[0,+\infty I)$ non-negative diagonal matrices for the controller's integrator constants l number of dynamic system variables for nonlinear systems L diagonal matrix of non-negative numbers
  Laplace transform operator M diagonal matrix of non-negative numbers num det(.) the numerator of det(.)
  set of all natural numbers, $\{1, 2, \ldots n, \ldots\}$ n number of outputs y of the system, i=1, 2, ..., n; $(y_1\ y_2 \ldots y_n)^T=y$ (i.e., the dimension of the output vector y)

$N_0$ diagonal matrix of non-negative numbers p number of disturbances acting on the system $p^k$ symbol for $d^{(k)}(.)/dt^{(k)}$ p symbol for $$\int_0^t (.) d\tau$$

$q(.): \Re \to f^l$ vector function of dynamic system variables $Q_0^\zeta$ the set of allowable initial $q_0$'s for nonlinear systems $Q^\zeta$ the set of all permitted motions q for nonlinear systems r the number of control variables u, $r \in \mathbb{N}$, $r \geq n$ $R_i$, i=1,2 ... resistor values in ohms ($\Omega$)

$\Re^n$ n-dimensional real vector space $S_d \subset f^p$ the set of all permitted d(.)

$S_y \subset f^n$ the set of all accepted realizable $y_d(.)$ $S_u \subset f^r$ the set of all accepted realizable u(.)

s Laplace complex variable, $s=(\sigma+j\omega)$, $\sigma \in \Re$, $\omega \in \Re$ sign(.): $\Re \to \Re$ signum function: $\text{sign}\xi|\xi|^{-1}$ for $\xi \neq 0$, sign 0=0 s(e) vector of sign(e), $s(e)=[\text{sign}(e_1)\ \text{sign}(e_2) \ldots \text{sign}(e_n)]^T$ S(e) diagonal matrix of sign(e), $S(e)=\text{diag}[\text{sign}(e_1)\ \text{sign}(e_2) \ldots \text{sign}(e_n)]$ T(.) tracking property function T(s) symbolic Laplace transform of tracking property, T(.), $T(s)E(s) = \mathcal{L}\{T[e(t), \ldots ]\}$ $T_s \in (0, +\infty)$ digital sampling period $\mathfrak{R}_T \subset \mathfrak{R}$ a time interval: $\mathfrak{R}_T = [0,T)$, $T \in (0, +\infty)$ $t \in \mathfrak{R}$ time, $t_0 = 0$ is the initial time $T \in (0, +\infty)$ a time T after which $e = 0$ $u(.): \mathfrak{R} \to f^r$ a control (vector) function $u \in \mathfrak{R}^r$ a control vector V(.) a matrix function relating the tracking property T(.) to the internal controller variable w(.)

$W_q S_d$) the real joint q-working space with respect to $s_d$ $W_x$ the state working space $W_y$ the output working space $W_q(S_d)$ the real joint q-working space with respect to $S_d$ W(.) an internal, control matrix function, either $W = I$ or $W = (.)^T$ $w(t-\epsilon)|_{\epsilon = 0+} = w(t^-)$ a signal at the output of the local controller positive feedback on the control vector of the just realized control variable w at time t $x \in \mathfrak{R}^N$ the system state vector $\underline{x}(.): \mathfrak{R} \times \mathfrak{R}^N \times f^p \times f^r \to f^N$ the system motion, $\underline{x}[t;x_0;d(.),u(.)] \equiv x(t)$, $\underline{x}[0;x_0;d(0),u(0)] \equiv x_0$ $y(.): \mathfrak{R} \to \mathfrak{R}^n$ a system output response function $y \in \mathfrak{R}^n$ the system output vector Y(s) the Laplace transform of the output vector $y_d(.): \mathfrak{R} \to f^n$ a desired output response of the system $y_d \in \mathfrak{R}^n$ a desired output vector $Y_d(s)$ the Laplace transform of the desired output vector Z(s) a transfer matrix function (to be determined) which forces the product $G_u(s)Z(s)$ to be square and nonsingular Z(.) a vector function of disturbance transmissions on the output for nonlinear systems $\alpha, \beta \in \mathbb{N}$ natural number exponents for a nonlinear tracking function of the absolute value of the tracking error $\gamma$ index of the number of derivatives of the error vector function e(.) in T(.)

$\delta$ a non-negative real number $\epsilon \in [0, +\infty)$ time delay of the signal passing through the local positive feedback; $\epsilon = 0$ means no time delay $\zeta$ the highest derivative of the system dynamic variable for nonlinear systems $\eta$ the maximum index of matrix (function) $B_\eta$, also the maximum number of derivatives in the control u $\mu$ the gain of the internal positive feedback in the controller, $\mu$ (0,1]

$\nu$ the maximum number of derivatives that describe the system dynamics for linear input-output and linear general systems $\tau \in \mathfrak{R}_+$ integration variable $\rho$ the maximum index of derivative (function) D and the highest number of derivatives in the derivative variable d

4 MISCELLANEOUS

The following papers by the inventors (by authors Mounfield and Grujić, or Grujić and Mounfield) are not prior art to the present application. The entire disclosures of all these papers are incorporated by reference: "High-Gain PI natural control for exponential tracking of linear single-output systems with state-space description," *Theorie de la commande*, Vol. 26, No. 2, pp 125–46 (1992); "Natural Tracking PID Process Control for Exponential Tracking," *AIChE Journal*, Vol. 38, No. 4, pp 555–562 (1992); "High-Gain Natural Tracking Control of Time-Invariant Systems Described by IO Differential Equations," *Proceedings of the 30th Conference on Decision and Control*, pp. 2447–52 (1991); "Natural Tracking Control of Time Invariant Linear Systems Described by IO Differential Equations," *Proceedings of the 30th Conference on Decision and Control*, pp. 2441–46 (1991); "High-Gain PI Natural Tracking Control for Exponential Tracking of Linear MIMO Systems with State-Space Description," (unpublished preprint); "Natural PD Tracking Control for Exponential Tracking: Linear Continuous-Time MIMO Systems with State-Space Description," (unpublished preprint); "PD-Control for Stablewise Tracking with Finite Reachability Time: Linear Continuous-Time MIMO Systems with State-Space Description," (unpublished preprint); "Natural Tracking Control of Time Invariant Linear Systems Described by IO Differential Equations," (unpublished preprint); "High-Gain Natural Tracking Control of Time Invariant Linear Systems Described by IO Differential Equations." (unpublished preprint); "Stablewise Tracking with Finite Reachability Time: Linear Time-Invariant Continuous-Time MIMO Systems," (unpublished preprint); "Natural PD Tracking Control for Exponential Tracking: Linear Continuous-Time Single-Output Systems with State-Space Description," (unpublished preprint); "Natural Tracking Control for Exponential Tracking: Lateral High-Gain PI Control of an Aircraft System with State-Space Description," (unpublished preprint); "Natural Tracking PID Control for Exponential Tracking of an Air-to-Air Missile System with Unknown Internal Dynamics," (unpublished preprint); "Elementwise Exponential Tracking: PD Natural Tracking Control of an Unstable Chemical Reaction," (unpublished preprint); "High-Gain Natural Tracking Control of Linear Systems," Proceedings of the 13th IMACS World Congress on Computation and Applied Mathematics, Vol. 3, pp. 1271–72 (1991); "Natural Tracking Control of Linear Systems," Proceedings of the 13th IMACS World Congress on Computation and Applied Mathematics, Vol. 3. pp. 1269–70 (1991); "High-Gain Natural Tracking Control of Linear Systems," (in print); "Natural Tracking Control of Linear Systems," (in print).

While this specification presents extensive discussions of the underlying theory, it should be kept in mind that the inventions claimed below are all physical apparatus, and not abstract algorithms. Signals representing physical properties of a physical system are transformed by a physical controller into control signals, which then act upon physical actuators within the system, causing the actuators to effect physical changes within the system, followed by repetitions of these steps sufficient to force one or more physical outputs of the system to converge to desired outputs as part of an intimate feedback cycle. Examples of particular, physical embodiments of these inventions are illustrated above, using readily available electronic components. Of course, the inventions are not limited to the specific embodiments or hardware illustrated in these examples.

We claim:

1. An apparatus for physically forcing a physical vector output y of a physical system to converge to a selected physical output vector $y_d$ in accordance with a selected vector tracking property T; in which the output vector y is affected by the internal physical dynamics of the system, external physical disturbances, and the physical responses of physical actuators in the system to an external physical control vector u; and in which the internal dynamics of the system are not necessarily known, and in which the values and effects of the external disturbances are not necessarily known; comprising:

(a) means for measuring the difference vector e between the selected output vector $y_d$ and the output vector y;

(b) means for determining the vector tracking property T as a selected function of the difference vector e;

(c) means for determining an internal control vector w(t), where w(t) is expressible in a form substantially equivalent to $$w(t) = \mu w(t-\epsilon) + VT$$

or to $$w(t) = kVT$$

$\mu$ is the internal control gain, where $0 < < \mu \leq 1$;
$k = (1-\mu)^{-1}$, whereby k is a high gain;
t is the time;
$\epsilon$ is a small, non-negative interval of time;
w(t) is a function of t;
$V = V(q^\zeta, d) = W(q^\zeta)[J(q,d)A_\zeta^{-1}(q^\zeta)B(q)W(q^\zeta)]^{-1}$;
q is a minimal-order vector of dynamic variables that completely describe the dynamics of the system, insofar as those dynamics affect the output vector y;
$q^\zeta$ is a matrix $q^\zeta = (q\ q^{(1)} \ldots q^{(i)} \ldots q^{(\zeta-1)})$, wherein $q^{(i)}$ is the ith derivative of q with respect to time, and $\zeta \geq 0$ is the highest order derivative of q needed to describe the system;
$y = g(q,d)$ is expressible as an algebraic function g of q and d;
d is a vector or vector function of the external disturbances affecting the system;
J is the Jacobian matrix $(\partial g/\partial q)$;
$A_\zeta = (\partial f_1/\partial q^{(\zeta)})$, a matrix or matrix function determined by the dynamics of the system;
$f_1 = f_1(q, q^{(1)}, \ldots, q^{(\zeta)})$, a $\zeta$-th order differential vector function of q which represents the dynamic properties of the system;
$B = (\partial f_2/\partial b)$, a matrix or matrix function determined by the dynamics of the actuators:
$f_2 = f_2(u, u^{(1)}, \ldots, u^{(i)}, \ldots, u^{(\eta)})$, an $\eta$-th order differential vector function of u, wherein $u^{(i)}$ is the ith derivative of u with respect to time, and $\eta \geq 0$ is the highest order derivative of u needed to described the control input;
$b = b(u, u^{(1)}, \ldots, u^{(\eta)})$ is a vector function of u and its derivatives describing the effect of u on the actuators;
is the dimension of vector u;
n is the dimension of vector y;
$W(q^\zeta) = [J(q,d)A_\zeta^{-1}(q^\zeta)B(q)]^T$ if $r > n$;
$W(q^\zeta) = I$, the identity matrix, if $r = n$;

(d) means for deriving the external control vector u from the internal control vector w from a relationship which is expressible in a form substantially equivalent to $$b(u, u^{(1)}, \ldots, u^{(\eta)}) = w(t);$$

(e) transmitting the external physical control vector u to the actuators, whereby a physical response in the actuators is induced, physically causing the physical output vector y to converge toward the selected physical output vector $y_d$; and (f) repeating steps (a) through (e) sufficiently to physically force the physical output vector y to converge to the selected physical output vector $y_d$ in accordance with the selected vector tracking property T.

2. An apparatus as recited in claim 1, wherein w(t) is expressible in a form substantially equivalent to $w(t) = \mu w(t-\epsilon) + VT$.

3. An apparatus as recited in claim 1, wherein w(t), is expressible in a form substantially equivalent to $w(t) = kVT$.

4. An apparatus as recited in claim 1, wherein each of the entries of the matrix $A_0$ does not vary as a function of q, and wherein each of the entries of the matrix $B_0$ does not vary as a function of u, and wherein each of the entries of J does not vary as a function of q, and wherein each of the entries of E does not vary as a function of u, wherein
$A_0 = (\partial f_1/\partial q)$;
$B_0 = (\partial f_2/\partial q)$;
$y = f_4(q, u)$ is expressible as an algebraic function $f_4$ of q and u; and
$E = \partial f_4/\partial u$;
whereby the system is linear.

5. An apparatus as recited in claim 1, wherein at least one of the entries of the matrix $A_0$ is a function of q, or wherein at least one of the entries of the matrix $B_0$ is a function of u, or wherein at least one of the entries of J is a function of q, or wherein at least one of the entries of E is a function of u, wherein
$A_0 = (\partial f_1/\partial q)$;
$B_0 = (\partial f_2/\partial q)$;
$y = f_4(q, u)$ is expressible as an algebraic function $f_4$ of q and u; and
$E = \partial f_4/\partial u$; whereby the system is nonlinear.

6. An apparatus as recited in claim 1, wherein T is a linear function of e.

7. An apparatus as recited in claim 1, wherein T is a nonlinear function of e.

8. An apparatus as recited in claim 1, wherein said difference vector e measuring means comprises at least one analog circuit element, and wherein said internal control vector w(t) determining means comprises at least one digital circuit element.

9. An apparatus as recited in claim 1, wherein said external control vector u deriving means comprises means for deriving u from a relationship which is expressible in a form substantially equivalent to $u = w(t)$; or in which the external control vector u comprises the internal control vector w.

10. An apparatus as recited in claim 4, wherein said external control vector u deriving means comprises means for deriving u from a relationship which is expressible in a form substantially equivalent to
$U(s) = Z(s)[G_u(s)Z(s)]^{-1}H(s)W(s)$; wherein
$U(s) = \mathcal{L}(u(t))$;
$\mathcal{L}$ is the Laplace transform;
s is the Laplace domain variable;
$W(s) = \mathcal{L}(w(t))$;
$G_u(s) = (\partial f_3/\partial u)$ is the transfer matrix function of the system with respect to u;
H(s) is a selected matrix function; and
Z(s) is a selected matrix function such that $\det[-G_u(s)Z(s)] \neq 0$.

11. An apparatus as recited in claim 4, wherein V is expressible in a form substantially equivalent to
$V(s) = \mathcal{L}(V(t))$; wherein
$\mathcal{L}$ is the Laplace transform;
s is the Laplace domain variable;
H(s) is a selected diagonal matrix function;

$$H_o = \lim_{s \to 0} H(s); \text{ and}$$

$V(s) = H_0^{-1}$ if $\det(H_0) \neq 0$.

12. An apparatus as recited in claim 4, wherein V is expressible in a form substantially equivalent to
$V(s) = \mathcal{L}(V(t))$; wherein
$\mathcal{L}$ is the Laplace transform;
s is the Laplace domain variable;
H(s) is a selected matrix function;

$$H_o = \lim_{s \to 0} H(s);$$

$$H_\infty = \lim_{s \to \infty} [s[H(s) - H(\infty)]]$$

$$H(\infty) = \lim_{s \to \infty} H(s); \text{ and}$$

$V(s) = [sH(\infty) + H_\infty]^{-1}$ if $\det(H_0) \equiv 0$ and $\det(H_\infty) \neq 0$.

13. An apparatus as recited in claim 4, wherein V is expressible in a form substantially equivalent to
$V = I$, the identity matrix.

14. An apparatus as recited in claim 4, wherein q is a vector comprised of variables representing states of the system, and wherein V is expressible in a form substantially equivalent to
$V = [E - CA^{-1}B]^{-1}$; wherein
$A = A_\zeta|_{\zeta=0}$, that is, $A_\zeta$ evaluated at $\zeta = 0$;
$C = J$;
$E = G_u(\infty)$;
$G_u(s) = (\partial f_3/\partial u)$ is the transfer matrix function of the system with respect to u:

$$G_u(\infty) = \lim_{s \to \infty} G_u(s);$$

$\mathcal{L}$ is the Laplace transform; and
s is the Laplace domain variable.

15. An apparatus as recited in claim 4, wherein q is a vector comprised of variables representing states of the system, and wherein V is expressible in a form substantially equivalent to
$V = (CB)^{-1}$ wherein
$C = J$.

16. An apparatus as recited in claim 4, wherein q is a vector comprised of variables representing states of the system, and wherein V is expressible in a form substantially equivalent to
$V = W(G_0W)^{-1}$ if rank $G_\infty < n$, det $(G_0W) \neq 0$, and rank $G_0 = n$;
$V = V(s) = W\{[sG_u(\infty) + G_\infty]W\}^{-1}$ if rank $G_\infty = n$, det $[G_\infty W] \neq 0$, and det $[G_0W] = 0$ for any W;
$G_\infty = CB$;
$G_0 = E - CA^{-1}B$;
$G_u(\infty) = E$;
$C = J$;
$W = G_\infty^T$ if $r > n$ and rank $G_\infty = n$;
$W = G_0^T$ if $r > n$, rank $G_\infty < n$, and rank $G_0 = n$;
$W = I$ if $r = n$ and either $\det(G_\infty) \neq 0$ or det $(G_0) \neq 0$.

17. An apparatus as recited in claim 4, wherein q is a vector comprised of variables representing outputs of the system, and wherein V is expressible in a form substantially equivalent to
$V = W(G_0W)^{-1}$ if rank $G_0 = n$, rank $G_\infty < n$, and det $[G_0W] \neq 0$;
$V = W(G_\infty W)^{-1}$ if rank $G_\infty = n$ and det $[G_\infty W] \neq 0$;
$W = G_\infty^T$ if $r > n$ and rank $G_\infty = n$;
$W = G_0^T$ if $r > n$, rank $G_\infty < n$, and rank $G_0 = n$;
$W = I$ if $r = n$ and either $\det(G_\infty) \neq 0$ or det $(G_0) \neq 0$.
$G_0 = A_0^{-1}B_0$;
$G_\infty = A_\zeta^{-1}B_\eta$;
$A_0 = (\partial f_1/\partial q)$;
$B_0 = (\partial f_2/\partial u)$; and
$B_\eta = (\partial f_2/\partial u^{(\eta)})$.

18. An apparatus as recited in claim 4, wherein V is expressible in a form substantially equivalent to
$V = W(G_0W)^{-1}$ if rank $G_0 = n$, rank $G_\infty < n$, and det $[G_0W] \neq 0$;
$V = W(G_\infty W)^{-1}$ if rank $G_\infty = n$ and det $[G_\infty W] \neq 0$;
$W = G_\infty^T$ if $r > n$ and rank $G_\infty = n$;
$W = G_0^T$ if $r > n$, rank $G_\infty < n$, and rank $G_0 = n$;
$W = I$ if $r = n$ and either $\det(G_\infty) \neq 0$ or det $(G_0) \neq 0$.
$G_0 = CA_0^{-1}B_0 + E$;
$G_\infty = CA_\zeta^{-1}B_\eta$;
$A_0 = (\partial f_1/\partial q)$;
$B_0 = (\partial f_2/\partial u)$;
$B_\eta = (\partial f_2/fu^{(f)})$; and
$C = J$.

19. An apparatus as recited in claim 5, wherein q is a vector comprised of variables representing outputs of the system, and wherein V is expressible in a form substantially equivalent to
$V = W(BW)^{-1}A_\zeta$.

20. An apparatus as recited in claim 19, wherein W is expressible in a form substantially equivalent to
$W = B^T$ if $r > n$;
$W = I$ if $r = n$.

21. An apparatus as recited in claim 5, wherein q is a vector comprised of variables representing states of the system, and wherein V is expressible in a form substantially equivalent to
$V = W[J(q,d) B W]^{-1}$; and
$W = W(q) = [J(q,d) B]^T$.

22. An apparatus as recited in claim 21, wherein $W = I$ if $r = n$.

* * * * *